US011506043B2

(12) United States Patent
Rodney

(10) Patent No.: US 11,506,043 B2
(45) Date of Patent: Nov. 22, 2022

(54) APPARATUS AND METHODS USING ACOUSTIC AND ELECTROMAGNETIC EMISSIONS

(71) Applicant: Halliburton Energy Services, Inc., Houston, TX (US)

(72) Inventor: Paul F. Rodney, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 384 days.

(21) Appl. No.: 15/739,007

(22) PCT Filed: Jun. 29, 2015

(86) PCT No.: PCT/US2015/038354
§ 371 (c)(1),
(2) Date: Dec. 21, 2017

(87) PCT Pub. No.: WO2017/003434
PCT Pub. Date: Jan. 5, 2017

(65) Prior Publication Data
US 2018/0171772 A1  Jun. 21, 2018

(51) Int. Cl.
E21B 44/00 (2006.01)
G01V 11/00 (2006.01)
E21B 49/00 (2006.01)
E21B 10/56 (2006.01)
E21B 12/02 (2006.01)
(Continued)

(52) U.S. Cl.
CPC ............ E21B 44/00 (2013.01); E21B 10/56 (2013.01); E21B 12/02 (2013.01); E21B 21/08 (2013.01);
(Continued)

(58) Field of Classification Search
CPC .......... E21B 44/00; E21B 49/00; E21B 10/56; E21B 12/02; E21B 21/08; E21B 49/003;
(Continued)

(56) References Cited

U.S. PATENT DOCUMENTS 4,332,161 A * 6/1982 Kakino .................... G01N 3/58
73/104
5,881,310 A 3/1999 Airhart et al.
(Continued)

FOREIGN PATENT DOCUMENTS

| EP | 0865612 B1 | 6/2002 |
| WO | 2014035426 A1 | 3/2014 |
| WO | 2015057099 A1 | 4/2015 |

OTHER PUBLICATIONS

Seppänen, Aleksi. "Utilizing acoustic measurements in equipment condition monitoring." (2016).*
(Continued)

Primary Examiner — Steven W Crabb
(74) Attorney, Agent, or Firm — K&L Gates LLP

(57) ABSTRACT

Various embodiments include apparatus and methods to estimate properties of rock, drill bit, or a combination thereof associated with a drilling operation. The properties can include, but are not limited to, rock chip size, drill bit dullness, drilling efficiency, or a combination selected from rock chip size, drill bit dullness, and drilling efficiency. The estimate may be accomplished from correlating detected acoustic emission with detected electromagnetic emissions. In various embodiments, formation brittleness may be determined. The various estimates may be used to direct a drilling operation. Additional apparatus, systems, and methods are disclosed.

30 Claims, 39 Drawing Sheets

(51) Int. Cl.
*E21B 21/08* (2006.01)
*E21B 4/02* (2006.01)
*E21B 45/00* (2006.01)
*E21B 47/18* (2012.01)

(52) U.S. Cl.
CPC ............ *E21B 49/00* (2013.01); *E21B 49/003* (2013.01); *E21B 49/005* (2013.01); *G01V 11/00* (2013.01); *G01V 11/002* (2013.01); *E21B 4/02* (2013.01); *E21B 45/00* (2013.01); *E21B 47/18* (2013.01); *G01V 2210/1216* (2013.01)

(58) Field of Classification Search
CPC .......... E21B 49/005; E21B 4/02; E21B 45/00; E21B 47/18; E21B 21/082; E21B 21/085; G01V 11/00; G01V 11/002; G01V 2210/1216
See application file for complete search history.

(56) References Cited

U.S. PATENT DOCUMENTS

| | | | |
|---|---|---|---|
| 5,899,958 A | 5/1999 | Dowell et al. | |
| 6,151,554 A * | 11/2000 | Rodney | G01V 1/42 |
| | | | 702/17 |
| 6,781,520 B1 * | 8/2004 | Smith | G01V 11/00 |
| | | | 340/853.1 |
| 9,766,363 B2 * | 9/2017 | Morys | G01V 11/007 |
| 2010/0305864 A1 * | 12/2010 | Gies | E21B 47/01 |
| | | | 702/9 |
| 2011/0286304 A1 | 11/2011 | Thigpen et al. | |
| 2013/0116926 A1 | 5/2013 | Rodney et al. | |

OTHER PUBLICATIONS

Carpinteri, A., et al. "Electromagnetic and neutron emissions from brittle rocks failure: experimental evidence and geological implications." Sadhana 37.1 (2012): 59-78.*

V. Saitas et al., "A combined complex electrical impedance and acoustic emission study in limestone samples under uniaxial loading," Tectonophysics 637, pp. 198-206 (Year: 2014).*

Yasuhiko Mori, et al., "Acoustic and Electromagnetic Emission From Crack Created in Rock Sample Under Deformation," J. Acoustic Emission 27 pp. 157-166 (Year: 2009).*

PCT International Search Report and Written Opinion dated Mar. 18, 2016, issued in corresponding application No. PCT/US2015/038354 filed on Jun. 29, 2015, 16 pgs.

* cited by examiner

APPARATUS AND METHODS USING ACOUSTIC AND ELECTROMAGNETIC EMISSIONS

TECHNICAL FIELD

The present invention relates generally to apparatus and methods associated with measurements and operations related to oil and gas exploration.

BACKGROUND

In the paper "Acoustic And Electromagnetic Emission From Crack Created In Rock Sample Under Deformation," Yasuhiko Mori, Yoshihiko Obatal, and Josef Sikula, J. Acoustic Emission, 27 (2009), basic information is provided on the acoustic emission as rock is broken up by polycrystalline diamond compact (PDC) bits. In the results reported in this paper, the acoustic emission given off by a drill bit, as measured by a vibration sensor on a rock sample, was directly related to the depth of cut of a drill bit. Above a certain threshold (80 µm for these studies), the bit causes micro-cracking of rock and the emitted signal is erratic. For a depth of cut below this threshold, the acoustic emissions are more regular and have a lower amplitude. Furthermore, for a given force or depth of cut, the signal amplitude was a linearly increasing function of the depth of cut or force and also an increasing function of the sharpness of the drill bit teeth.

The paper, "Experiments to demonstrate piezoelectric and pyroelectric effects," Jeff Erhart, Physics Education, 48(4), 2013 IOP Publishing Ltd., P. 438, reports on measurements of electric and acoustic emission as rock samples are crushed in a controlled environment. As with the paper by Mori et al., the measurements are made on the rock. The authors separate out two effects that are operative in generating an electromagnetic field as a result of breaking rock. First, there is a low frequency electrical potential due to the piezoelectric effect, and, second, an electromagnetic wave is given off due to seismoelectric conversion. Seismoelectric conversion refers to the creation of an electromagnetic wave as an acoustic wave passes through a porous medium. The motion of the fluid against the rock pores creates an electromagnetic field via a streaming potential. The rock samples used in this test were cylindrical with a 1 inch cross section and a length of 4 inches. The samples were progressively crushed with a force orthogonal to the circular faces of the cylinder. An acoustic transducer was mounted at the base of the test apparatus and electrodes were attached along the body of the cylinder. As the rock broke up, potential differences as high as about 1 volt were observed along the electrodes. Fracturing of rock was characterized by electrical spikes followed by spikes in the acoustic output. The spike signatures were on the order of milliseconds. After a delay from the onset of a voltage spike, an acoustic spike was observed with a characteristic exponentially decaying ringing. The delay of the acoustic response can be explained by the difference in wave speed between the acoustic and electromagnetic signals. It was noted that the amplitude and polarization of the observed voltages varied with the observation point.

Tests were carried out with both dry and wet rock. From these tests, the authors were able to separate out the piezoelectric effect from the seismoelectric effect in that the seismoelectric effect cannot be produced in dry rock. The authors noted that "[w]hen a fluid-saturated rock sample is breaking, the moving charges in the fluid induce electromagnetic waves, which propagate independently and can be received near or far from the breaking area. In addition, the electrical signals recorded in wet rock were stronger than those in dry rock and varied little in amplitude, signature or phase at the different measurement points."

Regarding the piezoelectric effect, the authors noted that when the acoustic amplitude is low, before rock breaks, the DC level changes, the polarization and magnitude of change depending on the position along the rock sample. This can be attributed to the piezoelectric effect. The variability of the polarization is due to the variability of the orientation of the piezoelectric material (quartz) within the rock matrix.

The reference "Experimental studies of seismoelectric effects in fluid-saturated porous media," Benchi Chen and Yongguang Mu, J. Geophys. Eng. 2 (2005) 222-230, Nanjing Institute Of Geophysical Prospecting And Institute Of Physics Publishing, presents a kind of hybrid between the experiments of the papers of More et al. and Erhart, but with rock samples about ⅓ that in the paper of More et al. Additionally, in Chen et al. the impulse events were counted as a function of penetration depth and it was noted that the number of such events, correlated between the electric field and acoustic measurements, increases as the depth of penetration increases. It was also noted that the magnetic signal can be detected with a "coil," although no direct magnetometer measurements were reported in Chen et al.

The paper "A Transportable System for Monitoring Ultra Low Frequency Electromagnetic Signals Associated with Earthquakes," Darcy Karakelian, Simon L. Klemperer, Antony C. Fraser-Smith, and Gregory C. Beroza, Seismological Research Letters Volume 71, Number 4, 423-436 July/August 2000, is not directly relevant to drilling, but provides confirmation that the right conclusions about seismoelectric effects in the measurements in the Erhart paper were made. A finding that is common to all of these references is that the electrical and acoustic signal amplitudes increase just prior to rupture.

The papers "Low Frequency Magnetic Field Measurements Near the Epicenter of the $M_s$ 7.1 Loma Prieta Earthquake," A. C. Fraser-Smith, A. Bernardi, P. R. McGill, M. E. Ladd, R. A. Helliwell, O. G. Villard, Jr., Geophysical Research Letters, Vol. 17, No. 9, pp 1465-1468, August 1990; "The results of experimental studies of VLF-ULF electromagnetic emission by rock samples due to mechanical action," A. A. Panfilov, Nat. Hazards Earth Syst. Sci. Discuss., 1, 7821-7842, 2013; and "Performance Drilling— Definition, Benchmarking, Performance Qualifiers, Efficiency and Value," G. Mensa-Wilmot, S. Southland, P. Mays, P. Dumronghthai, D. Hawkins, P. Llavia, SPE/IADC 119826, presented at the SPE/IADC Drilling Conference and Exhibition held in Amsterdam, The Netherlands, 17-19 Mar. 2009 provide further information on rock breakup and the emission of electromagnetic signals and acoustic signals. The results presented in these papers pertain to earthquakes and hence are on a much larger scale than of interest herein. However, they provide further confirmation of the underlying mechanisms. Each of these papers notes a relation to the magnetic field and describes the same underlying mechanisms detailed in the small scale experiments of the Mori et al. and Erhart articles.

DETAILED DESCRIPTION

Figure 1:
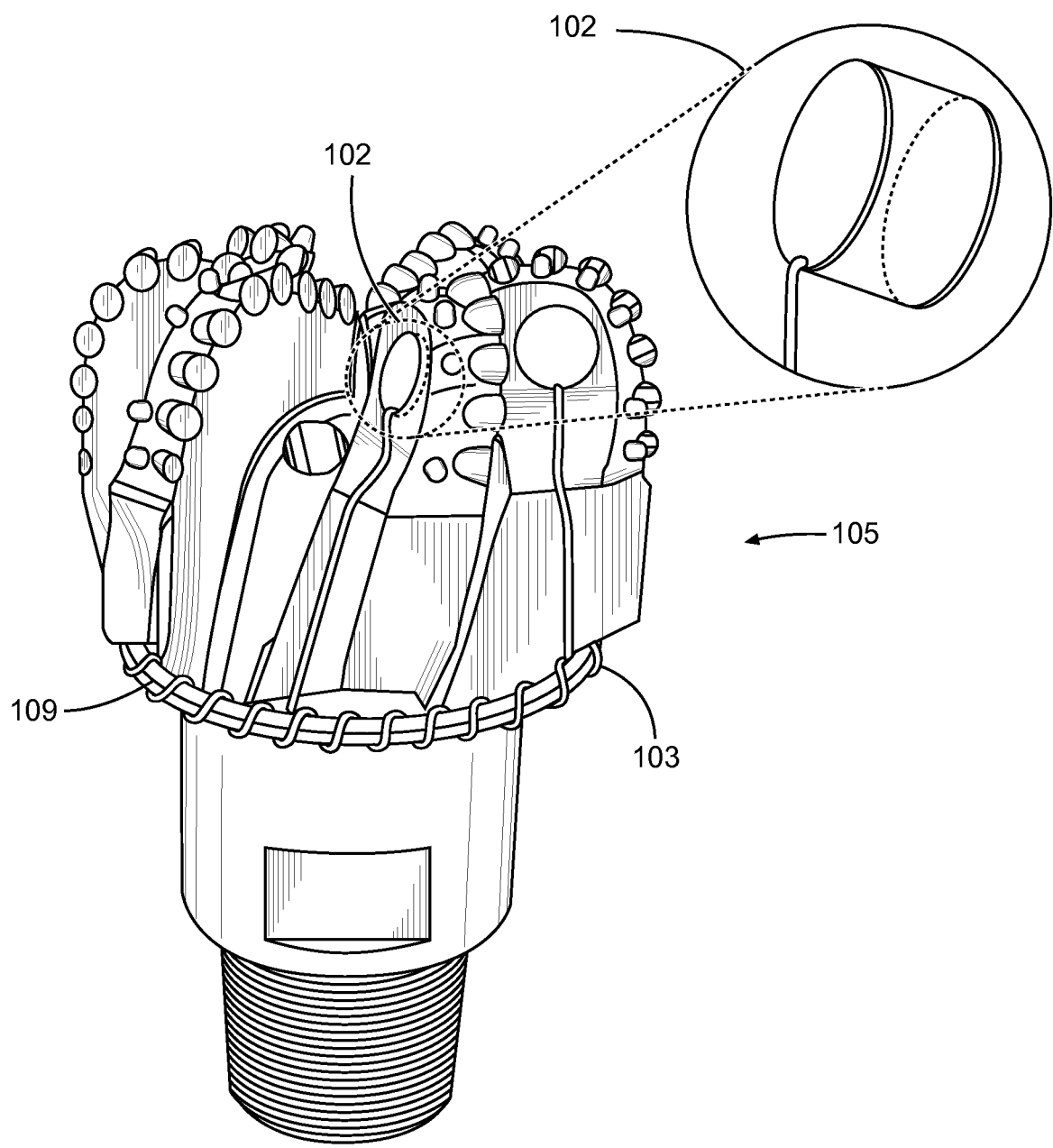
FIG. 1 is a schematic diagram of an example structure of a drill bit having sensors mounted on or within the drill bit, in accordance with various embodiments.

The following detailed description refers to the accompanying drawings that show, by way of illustration and not limitation, various embodiments that may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

It is known that rocks give off acoustic and electromagnetic emissions when they are broken. Several mechanisms are operative in these emissions. Some of these mechanisms also pertain to the wearing of PDC cutters. As taught herein, inference of bit wear, cuttings size, and lithology can be made by making simultaneous measurements of acoustic and electromagnetic emissions from within or on a drill bit and correlating these measurements. The simultaneous measurements of acoustic and electromagnetic emissions can be made near the drill bit, where near the near drill bit means on a measurement tool or drillstring within 10 feet of the drill bit. These measurements can be made with acoustic or vibration sensors, electric field sensors, and dynamic magnetic field sensors. These techniques can be applied to PDC and roller cone bits, although the mechanisms by which these types of bits drill differ. PDC bits drill primarily by shearing, whereas roller cone bits drill primarily by crushing and scraping.

It is desirable to analyze acoustic emissions while drilling in order to provide an estimator of bit wear. In a number of conventional approaches, it is not possible to measure these from the formation, since the measurements are to be made from within, on or near the drill bit. This further complicates matters as the breaking up of rock is not the only source of acoustic emission while drilling. The drill bit is continually impacting against the borehole wall, and may be subject to bouncing off of the bottom of the borehole. Further, the drillstring itself rubs against and impacts against the borehole wall. It is therefore desirable to provide another signal that is correlated with the breaking up of rock and/or bit wear and that is not correlated in the same way with the bit and drillstring dynamics.

In various embodiments, procedures are implemented to provide a measurement of drill bit cutter dullness and measurement of distribution of the size of formation cuttings as a drill bit advances. Statistics can be provided on the distribution of drill cutting sizes as the cuttings are being generated. Such procedures provide a mechanism of measuring drill bit wear downhole. These measurements can pertain directly to assessing the efficiency of a drilling operation and can be used to optimize that efficiency. Apparatus and methods for determining drill bit sharpness and cuttings size distribution provide information that with suitable communications and control can be combined to optimize the efficiency of a drilling operation. A PDC bit is used in the examples discussed herein, although similar embodiments can be carried out with roller cone bits.

FIG. 1 is a schematic diagram of an embodiment of an example structure of a drill bit 105 having sensors 102, 103 mounted on or within the drill bit 105. The sensor 102 and the sensor 103 can be among a set of sensors used to make electromagnetic and vibration measurements. The drill bit 105 may include a solenoid, an accelerometer, and a micro-electro-mechanical system (MEMS) gyro disposed within the drill bit 105, not visible in the view of FIG. 1. Not all of the sensors noted below need to be present. A minimal subset may be realized as a vibration sensor and either an electric field sensor or a magnetic field sensor. The electric or magnetic field sensors may be structured such that the electric or magnetic field sensors do not have static field sensitivity. The sensors can include, but are not limited to, an electric field sensor, a toroid, accelerometer, a solenoid, and a MEMS gyro.

An electric field sensor can be realized as a plurality of electric field sensors. In its simplest form, an electric field sensor 102 can include a dielectric cylinder 108 with a metal disc 106 on one end, which is shown schematically in FIG. 1, but in more detail in FIG. 2. Note that a magnetic field sensor as shown in FIG. 3 can be used. Electric field sensors and magnetic field sensors can be mounted, as shown, in a cavity in the flank of the structures that support the teeth of a drill bit. The back of the sensor makes electrical contact with the body of the bit, which is an electrical conductor. An insulated wire 107 connected to a conductive plate 106 that is floated in a dielectric cylinder 108 can provide a second lead for the electric field sensor 102. Each of these leads can be carried away from the front area of the bit to the back area of the bit, where electronics can be housed, via a channel in the flank of the structure that supports the electric field sensor 102.

Figure 4:
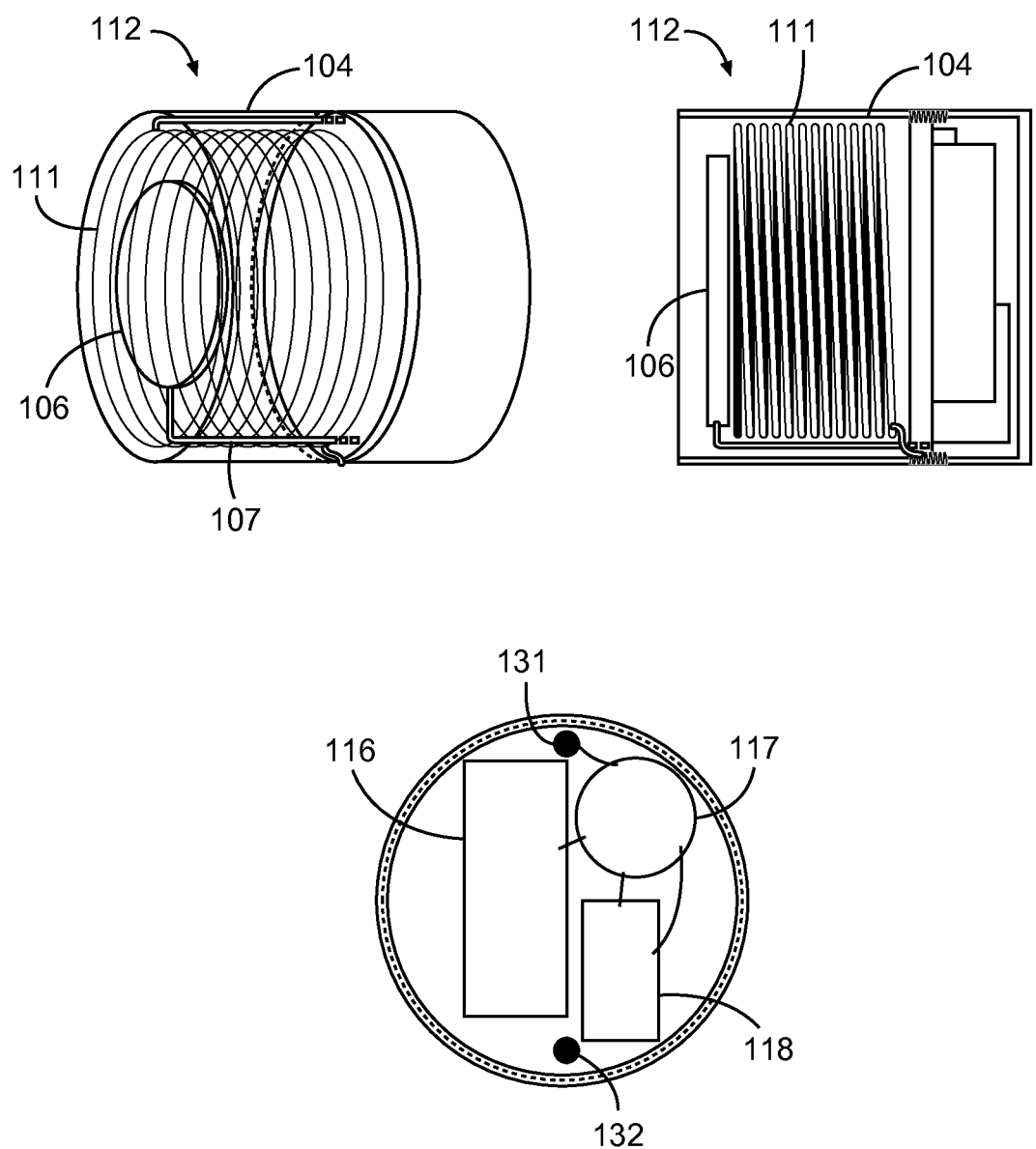
FIG. 4 is a schematic diagram of an example combined electric and magnetic field sensor having a local signal processing and wireless device that can be mounted on or within the drill bit of FIG. 1, in accordance with various embodiments.

Electric field sensors and magnetic field sensors can also be mounted in the face of the drill bit and above the body of the drill bit. In an alternative embodiment, a battery and an IEEE standard 1902.1 (also known as RuBee) wireless device can be mounted with an electric field sensor or a combined electric and magnetic field sensor. Wireless devices of this type are useful for short range communication in magnetic environments, such as that of a drill bit. A modified sensor with this technology is illustrated in FIG. 4.

A toroid 103 can be mounted on a shank of the drill bit 105. The toroid 103 responds to the magnetic field generated by time varying currents flowing along the axis of the drill bit. The time varying currents can be a result of the electric and seismoelectric fields generated in the vicinity of the drill bit as well as rotation of the drill bit in the earth's magnetic field.

One accelerometer can be used or a plurality of accelerometers can be used. The accelerometers can be mounted just below the shank of the bit on the body of the bit, for example in region 109 in FIG. 1. The accelerometers are preferably sensitive only to vibration, that is, they are not responsive to the earth's gravitational field, and so may also be termed vibration sensors. The accelerometers may have sense axes along the axis of the drill bit or orthogonal to the axis of the drill bit. Accelerometers that are orthogonal to the axis of the drill bit may also be orthogonal to each other. These accelerometers can be used to sense cross-axial vibration, but are also responsive to tangential (torsional) vibration.

A solenoid can be disposed around the shank of the drill bit. This sensor can be used to measure the time varying magnetic field component along the axis of the drill bit. This field can be generated by seismoelectric waves or by current induced in the formation via the piezoelectric effect. However, it is anticipated that the latter effect will be small in comparison to the seismoelectric effect.

A MEMS gyro can be used to sense the instantaneous rotation rate of the drill bit. Its use is optional, but it provides additional information about drilling dynamics.

Figure 2:
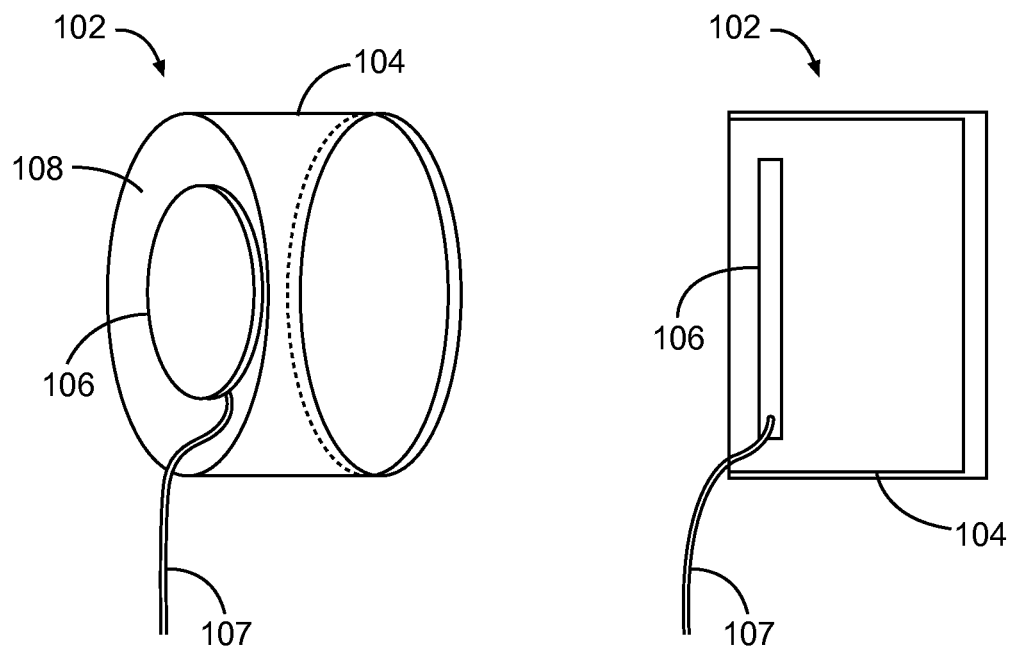
FIG. 2 is a schematic diagram of an example electric field sensor mounted on or within the drill bit of FIG. 1, in accordance with various embodiments.
Figure 3:
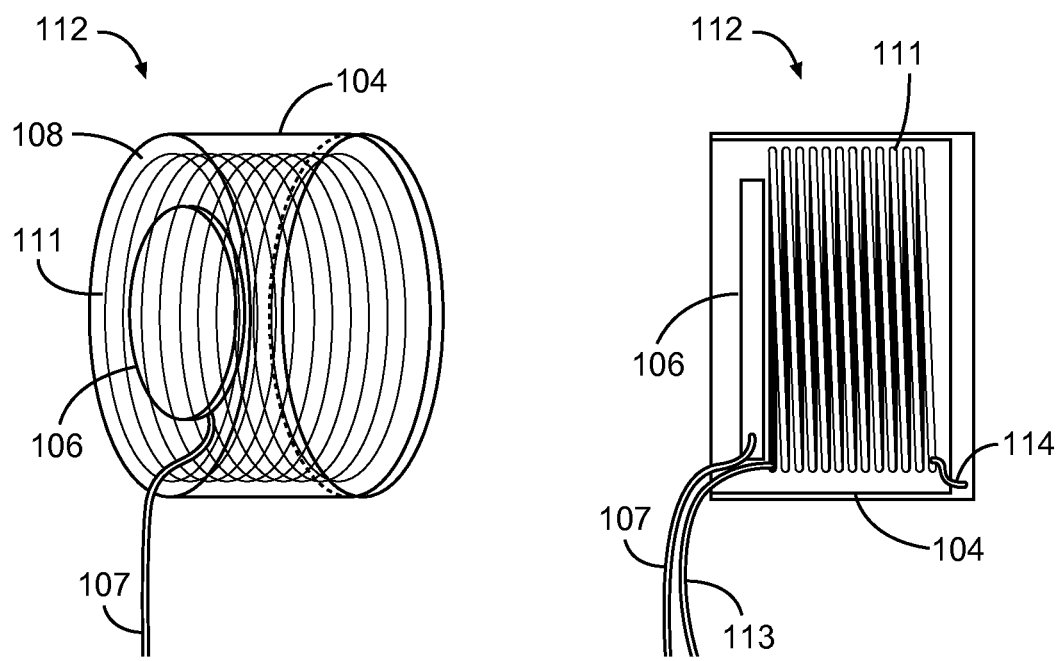
FIG. 3 is a schematic diagram of an example combined electric and magnetic field sensor that can be mounted on or within the drill bit of FIG. 1, in accordance with various embodiments.
Figure 6:
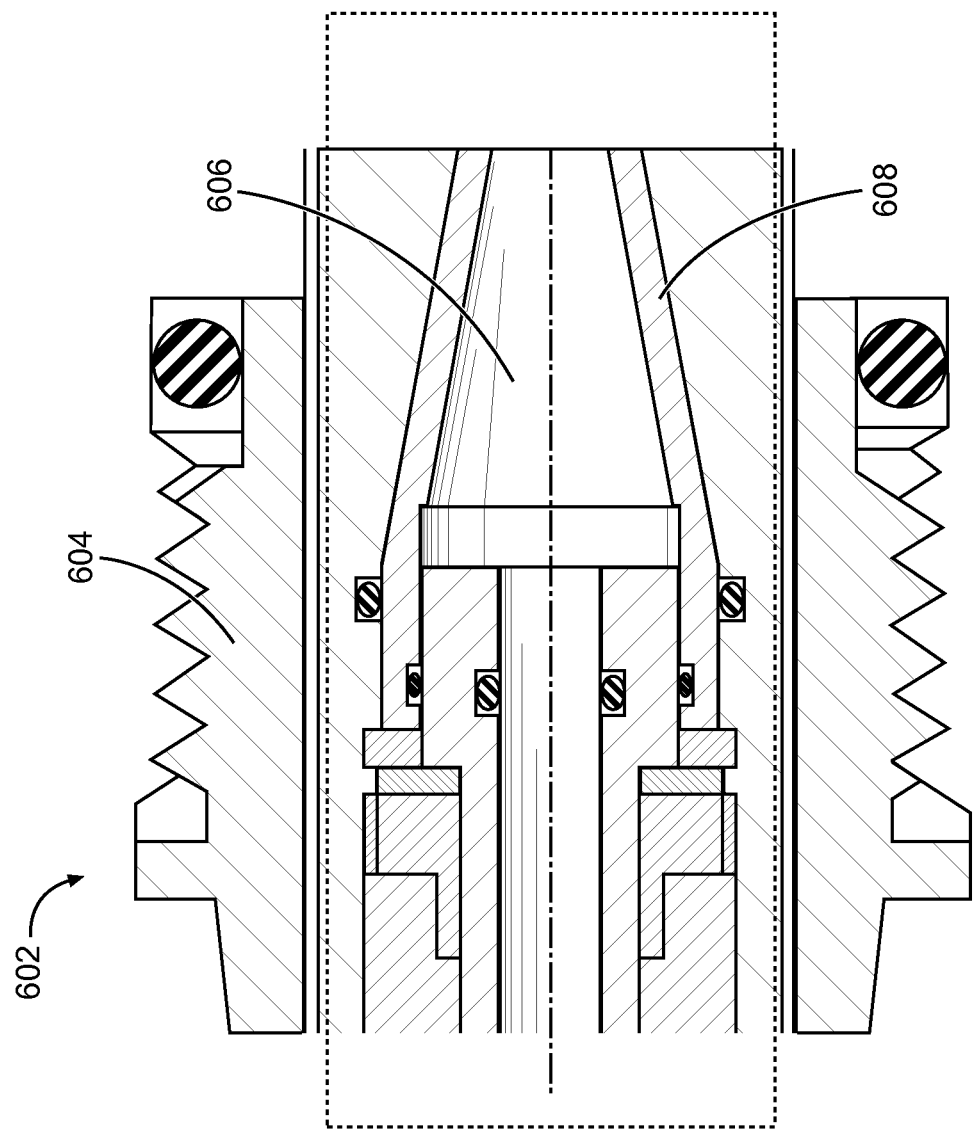
FIG. 6 is a schematic diagram of an example electric field sensor mountable on or within a drill bit, in accordance with various embodiments.

FIG. 2 is a schematic diagram of an example of an electric field sensor 102 that can be implemented on, in, or near a drill bit. The electric field sensor 102 can include a metal can 104 with one end open, filled with a dielectric material 108, and in which a metallic plate 106 can be floated parallel to the back of the can. The base of the can may be inserted into a cavity in the flank of the structure that supports the teeth of the drill bit. Although not necessary, it is beneficial if the surface of the disc 106 facing the open end of the can be covered with dielectric material. The dielectric material should be resistant to abrasion and chemical attack and should have the smallest dielectric constant possible, consistent with the other constraints. The disc 106 can have a diameter that is considerably less than the diameter of the can 104. A design approach can be directed to provide a surface that is responsive to the potential gradient across the dielectric with a minimum capacitance to ground so as to maximize the voltage across the sensor. An alternative electric field sensor is shown in FIG. 6, which can be adapted from U.S. Pat. No. 5,720,355. An insulated lead 107 connected to the disc can be dressed along the flank of the structure that supports the teeth of the drill bit, as described earlier.

FIG. 3 shows a combined electric and magnetic field sensor 112. The sensor 112 can have a configuration basically similar to or identical to the configuration of FIG. 2 with the addition of a magnetic field sensor. In this case, a solenoidal 111 winding of wire, such as copper wire is also floated in the dielectric material 108 along with disc 106 and connection wire 107. Ideally, the dielectric material can also be a ferrite. Available ferrites are good insulators and, in the range of relevant frequencies (for example, frequencies no higher than 10 KHz), have a relative dielectric constant on the order of 40. One lead 114 of the solenoid 111 can be grounded to the can 104 while the other lead 113 can be dressed along the flank of the structure that supports the teeth of the drill bit, where this portion of the solenoid wire 113 is be insulated.

FIG. 4 is a schematic diagram of a combined electric field and magnetic field sensor with an IEEE standard 1902.1 type of device 116. The combined electric field and magnetic field sensor can be realized by the combined electric field and magnetic field sensor 112 of FIG. 3 having solenoid 111 and disc 106 with connecting wire 107 in a can 104. Connection 131 can be arranged as a connection to an ungrounded portion of solenoid 111 and connection 132 can be arranged as a connection to an ungrounded portion of metallic disc 106. The IEEE standard 1902.1 type of device 116 can be coupled to a battery 117 that may also provide power to signal processing module 118. IEEE standard 1902.1 type of devices, similar or identical to IEEE standard 1902.1 type of device 116 are available, for example, from Visible Assets, Inc. These devices are compact, are capable of communicating up to 50 feet on steel and in liquids, and require minimal amounts of electricity. The battery life is listed as being typically 5 to 15 years. One would anticipate significantly reduced battery life with continual data streaming, but the life should be considerably longer than the typical mission life of a drill bit. The same device can be used with an electric sensor or a magnetic field sensor. In either case, it is desirable to provide some signal conditioning for the outputs of the sensors before transmission with the IEEE standard 1902.1 type of device, which is illustrated in FIG. 5.

Figure 5:
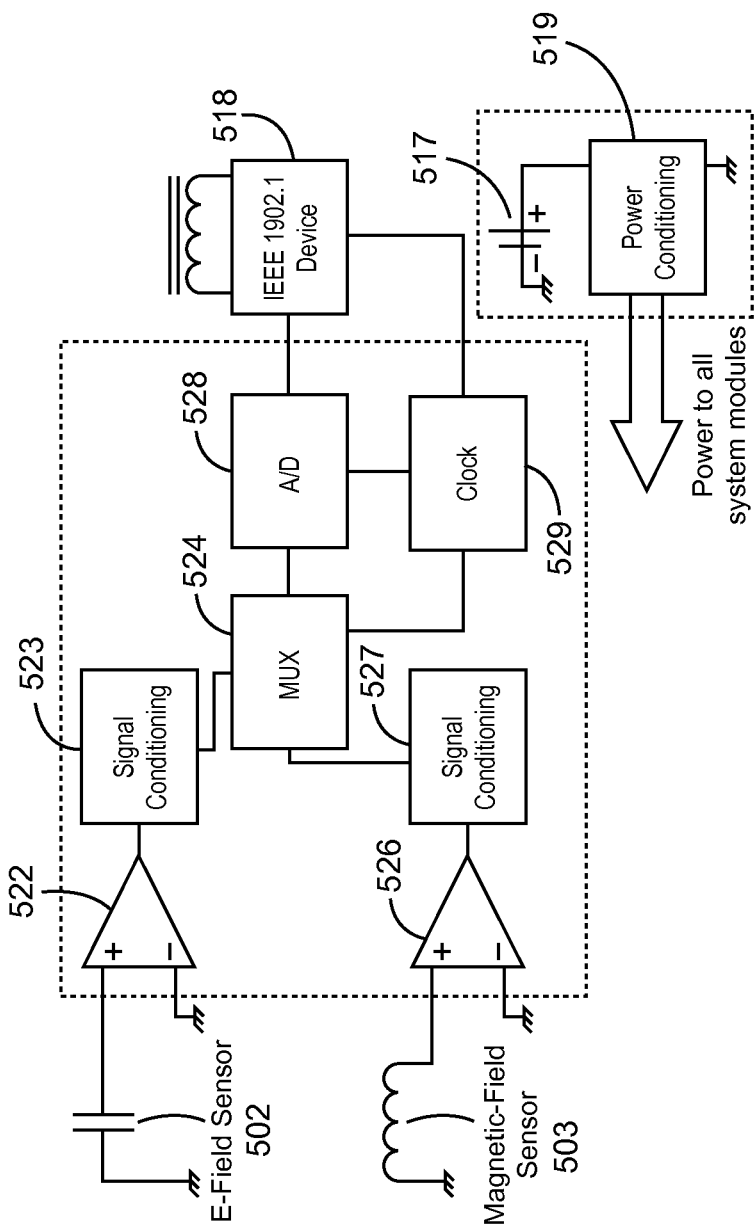
FIG. 5 is a block diagram of example electronics with a wireless device that can be structured within the arrangement of components of FIG. 4, in accordance with various embodiments.

FIG. 5 is a schematic diagram of elements of a circuit of a system to provide some signal conditioning for the outputs of sensors disposed at, in, or near a drill bit. Many of these elements are optional. The circuit can be powered by a battery 517, such as a silver cell battery. The power from battery 517 may be provided to all system modules from a power conditioning module 519. Optionally, a power regulator may be added to the circuit to improve efficiency in the case that it is necessary to operate other modules in the system at different voltages. The output from an electric field sensor 502, which is signified by a capacitor in FIG. 5, can be first passed to an operational amplifier 522 prior to signal conditioning module 523. The operational amplifier 522 can have as high an input impedance as is practicable, since the electric field sensor 502 can be a high-impedance device. In most cases, it is desirable that this also provide amplification of the electric field signal.

An operational amplifier 526 is also shown connected to the output of a magnetic field sensor 503, which is signified by an inductor in FIG. 5, prior to signal conditioning module 527. This operational amplifier need not have a high impedance, is optional and if present, should have sufficient gain to boost the signal amplitude. An IEEE standard 1902.1 type of device 518 can communicate by generating a signal that is out of the frequency band that is relevant to various measurement related frequencies as taught herein. For example, the IEEE standard 1902.1 type of device 518 may communicate at a frequency of approximately 100 KHz that is out of the relevant frequency band. Nevertheless, depending on the anticipated signal to noise ratio, it may be desirable to provide additional isolation via low or bandpass filters for the electric and magnetic field signals. Accordingly, a number of ways can be implemented to providing an electric field signal and a magnetic field signal, either conditioned or raw. Optionally, these signals can be passed to a multiplexer 524. The multiplexer 524 can reduce the component count in the system as it makes it possible to use a single analog to digital converter 528 to sample the electric and magnetic field signals. Alternatively, two analog to digital converters can be included in the system. A clock 529 can be used to synchronize the operation of the multiplexer 524, analog to digital converter 528, and transfer of data to the IEEE.1902.1 device 518.

Figure 7:
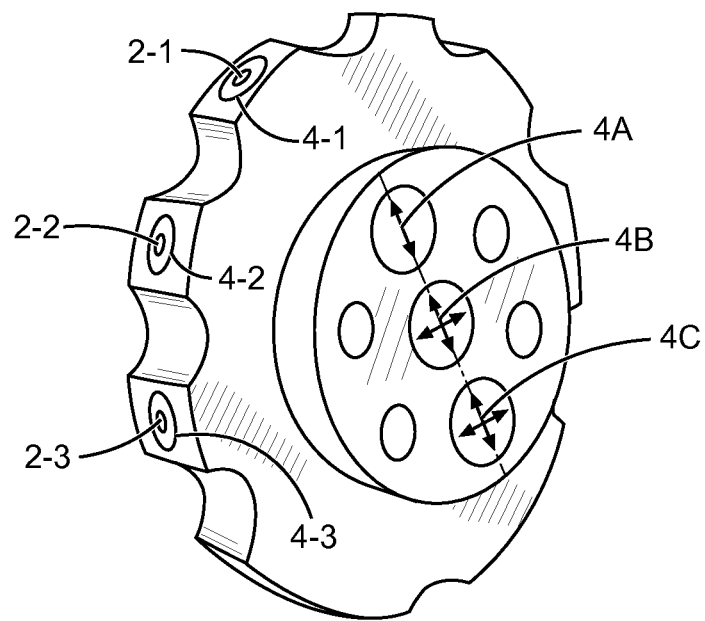
FIG. 7 is a schematic diagram of an example mounting of electric field sensors of FIG. 6 along with vibration sensors, in accordance with various embodiments.

FIG. 6 is a schematic diagram of an alternative electric field sensor 602. This sensor can be mounted differently than the electric field sensor of FIGS. 1-4. This design can be adapted from U.S. Pat. No. 5,720,355. The sensor 602 can include a conducting shaft 606 surrounded by an insulator 608 and housed in a pressure housing 604 that can be inserted into a cavity in a drill bit or in a module that serves as an extension to a drill bit. The electric field can be measured via measuring the potential difference between the conducting shaft 606 of the device 602 and the body of the drill bit. As with the previous electric field sensing device, an alternative embodiment (not illustrated) can include a magnetic field sensor in the form of a solenoid wound around the center electrode. In this case, it is desirable, but not necessary, for the conducting shaft to be made of a magnetic material. The signals from these sensors can be carried on conductors to a central signal processing module, or they can be subjected to signal conditioning and possibly transmission via an IEEE-1902.1 type of device as before. Sensors of this type can be mounted in a module such as shown in FIG. 7, which can also be adopted from U.S. Pat. No. 5,720,355. In FIG. 7, items 4-1, 4-2, and 4-3 refer to the whole of the sensors of FIG. 6, whose conductive centers are at items 2-1, 2-2, and 2-3, respectively. In addition, vibration sensors 4A, 4B, and 4C are shown FIG. 7. The vibration sensors can be mounted such that their axes of sensitivity are orthogonal or nearly orthogonal.

Figure 8:
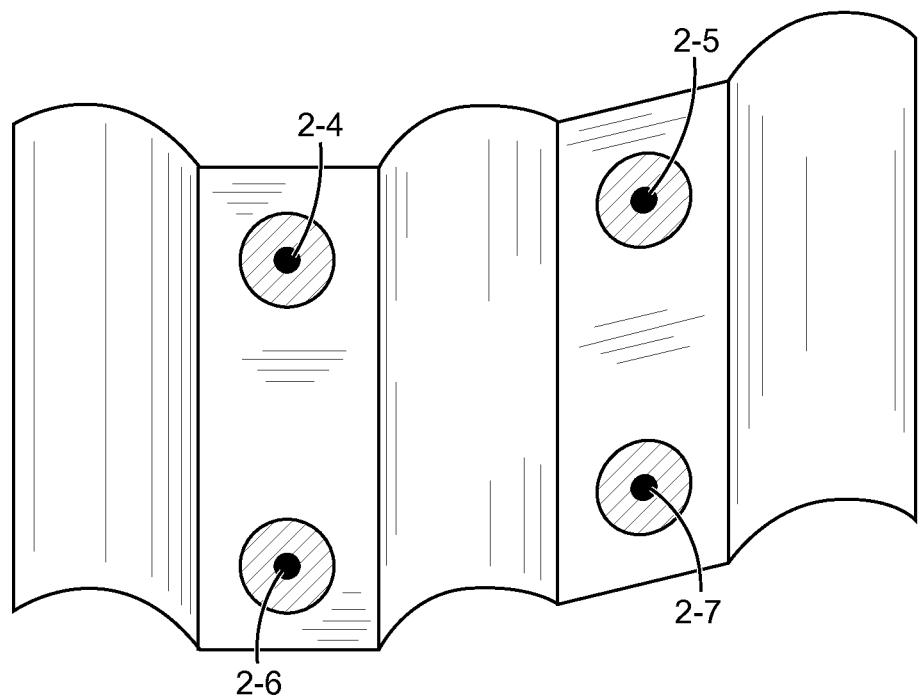
FIG. 8 is a schematic diagram of an example alternative mounting of electric field sensors of FIG. 6, in accordance with various embodiments.
Figure 9:
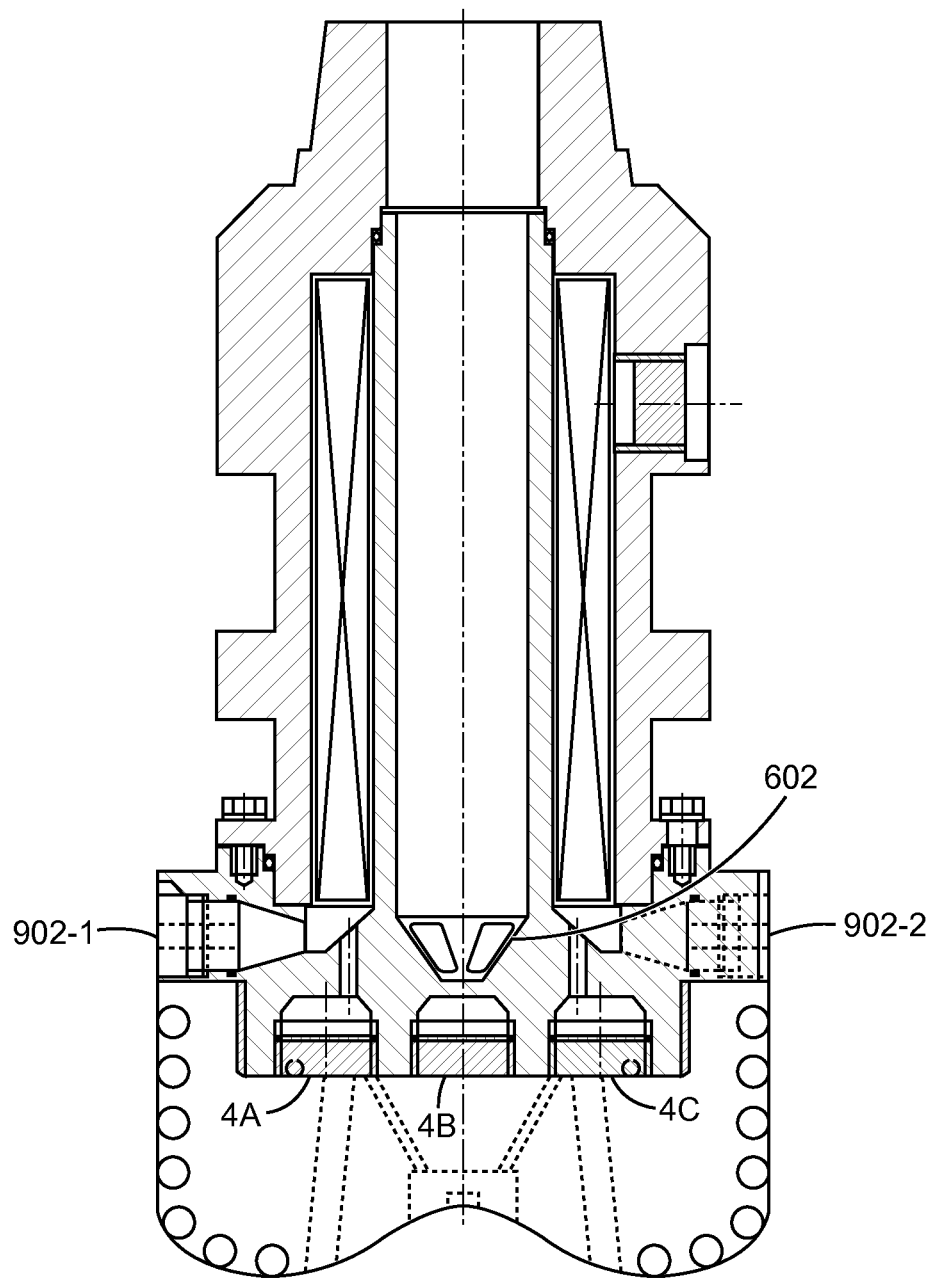
FIG. 9 is a schematic diagram of an example use of the module of FIG. 6 with a polycrystalline diamond compact drill bit, in accordance with various embodiments.

The module of FIG. 7 can be modified as in FIG. 8 so as to provide the ability to measure the potential difference between pairs of electrodes 2-4, 2-5, 2-6, 2-7. The pairs can be taken either along the axis of the bit or orthogonal to the axis of the bit. The module of FIG. 7 can be mounted in a drill bit as shown in FIG. 9, which can also be adopted from U.S. Pat. No. 5,720,355. The mounting of the associated electronic module can be similar to that in U.S. Pat. No. 5,720,355. FIG. 9 can include the electric sensors 902-1, 902-2, module 602 of FIG. 6, and the vibration sensors 4A, 4B, and 4C shown in FIG. 7.

Figure 10:
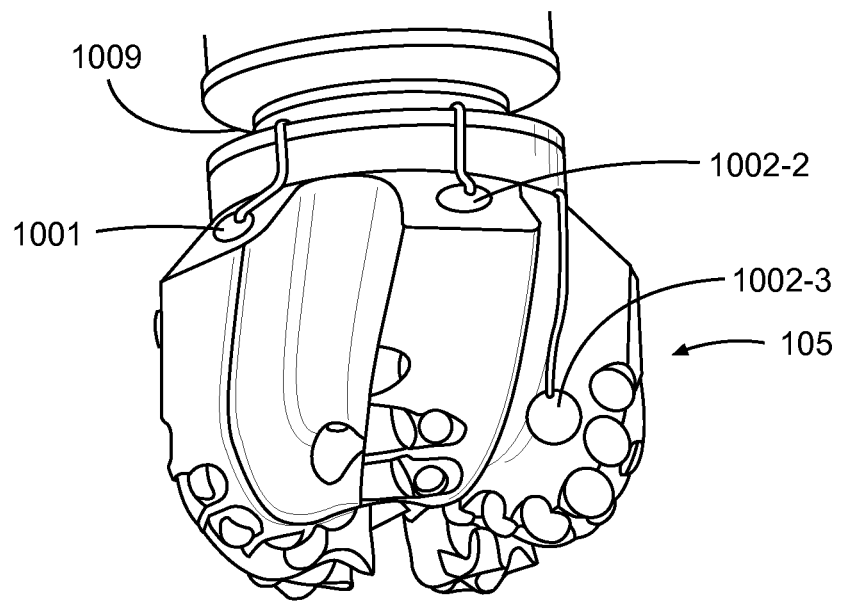
FIG. 10 is a schematic diagram illustrating a different perspective of FIG. 1 showing additional locations for mounting sensors, in accordance with various embodiments.

FIG. 10 is another view of the instrumented drill bit 105 of FIG. 1. In this view, only electric field sensors 1002-1, 1002-2, 1002-3 are shown. This view illustrates the placement of electric field sensors 1002-1 and 1002-2 above the ribs of the drill bit 105, with electric field sensor 1002-3 located similar to sensor 102 of FIG. 1. The electric field sensors 1002-1, 1002-2, 1002-3 may be realized in a manner similar or identical to sensors of FIGS. 1-4 that can measure electric properties. The space 1009 in which the toroid and solenoid referenced with respect to, but not shown, in FIG. 1 is also shown.

Figure 11:
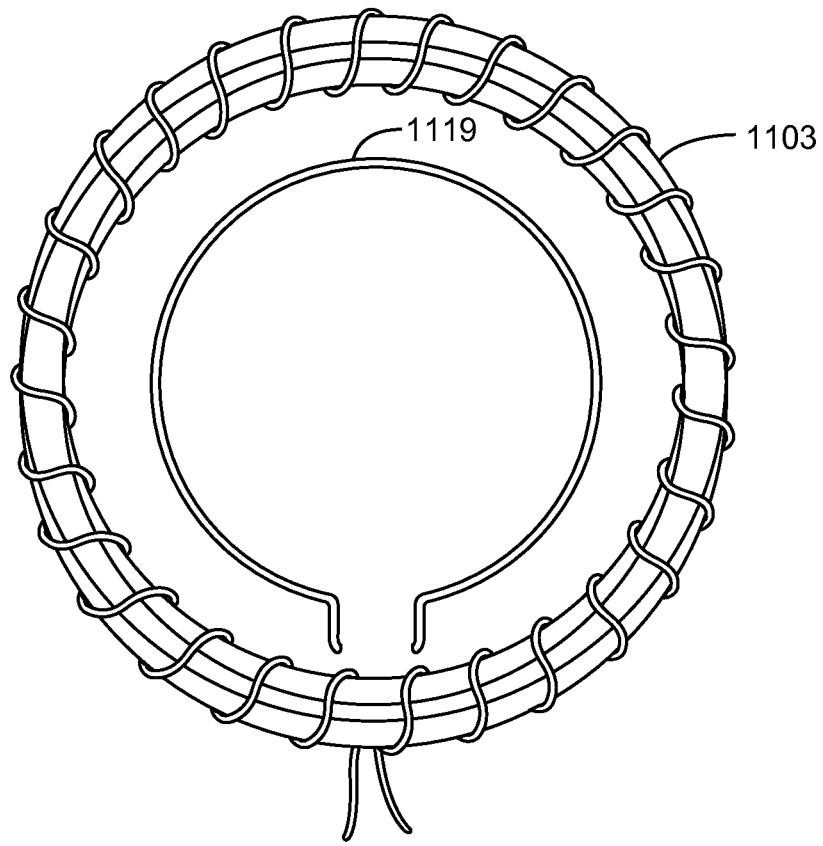
FIG. 11 is a schematic diagram of example toroid and solenoid sensors that can be coupled on a drill bit, in accordance with various embodiments.

FIG. 11 illustrates the construction of a toroid 1103 for sensing of induced current along the axis of the drill bit. The toroid 1103 may be wound on soft iron or a ferrite core. Such current is induced by electric fields and by rotation in the earth's magnetic field, but dominantly from the seismoelectric field arising from the fracture of rock and the flow of drilling fluid into the fracture. Any component induced in the toroid by rotation in the earth's magnetic field can be synchronized with the instantaneous rotation rate of the drill bit as determined using a MEMS gyro. Also shown in FIG. 11 is a solenoid 1119. The solenoid 1119 may typically have more than a single turn and may consist of a hundred or so turns of copper wire. The solenoid 1119 can be responsive to the time varying magnetic field along the axis of the drill bit. This field arises dominantly from the seismoelectric effect. Toroid 1103 and solenoid 1119 can be used, respectively, as electric field sensors and magnetic field (electric current) sensors together on a structure.

Figure 12:
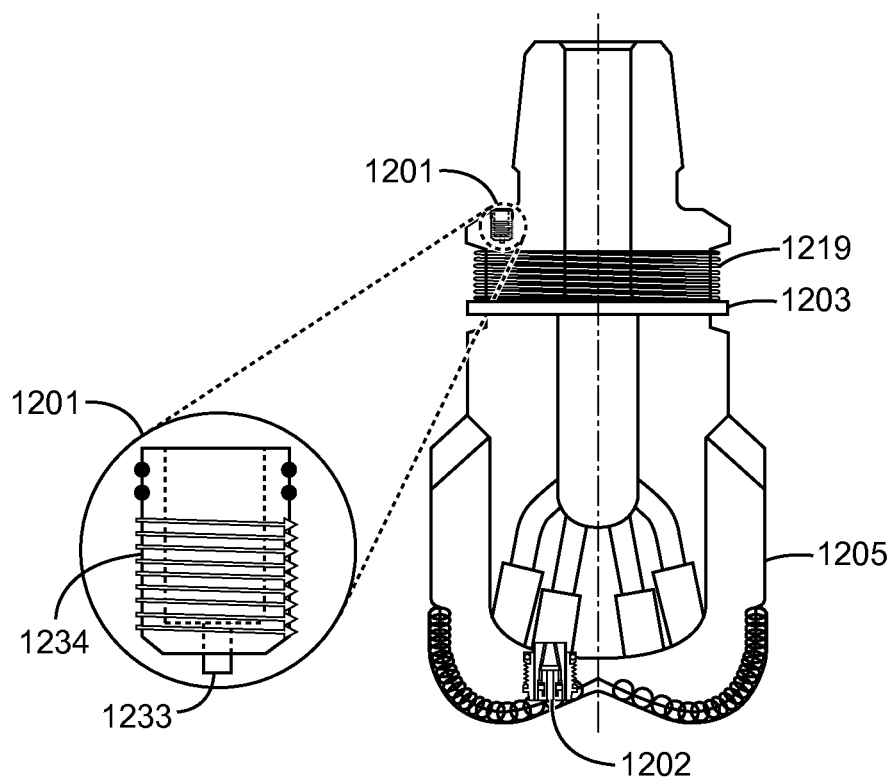
FIG. 12 is a schematic diagram of toroid and solenoid sensors that can be coupled on a drill bit, in accordance with various embodiments.

FIG. 12 illustrates another embodiment in which an electric field sensor 1202 is installed in the face of a drill bit 1205, similar to but not limited to drill bit 105 of FIG. 1. In this case, a sensor such as that in FIG. 6 can be used. This sensor 1202 can respond to a combination of the electric field generated via the piezoelectric effect and the field due to the seismoelectric effect. In a typical installation, a bit nozzle is clogged and replaced with the sensor 1202. The sensor 1202 may make use of a signal conditioning electronics and an IEEE-1902.1 telemetry device to convey the signal from the drill bit 1205 to a module where the signal can be analyzed. Alternatively, one or more wires can be fed through the body of the drill bit 1205 and connected between the sensor 1202 and the electronics module.

Also illustrated in FIG. 12 are a toroid 1203 and solenoid 1219, as in FIGS. 1, 10, and 11, installed in the shank of the drill bit 1205. The solenoid 1219 can be arranged to sense an AC magnetic field along axis of the drill bit 1205. The toroid 1203 can be arranged to sense AC current on the pipe resulting from time varying electric fields.

Figure 13:
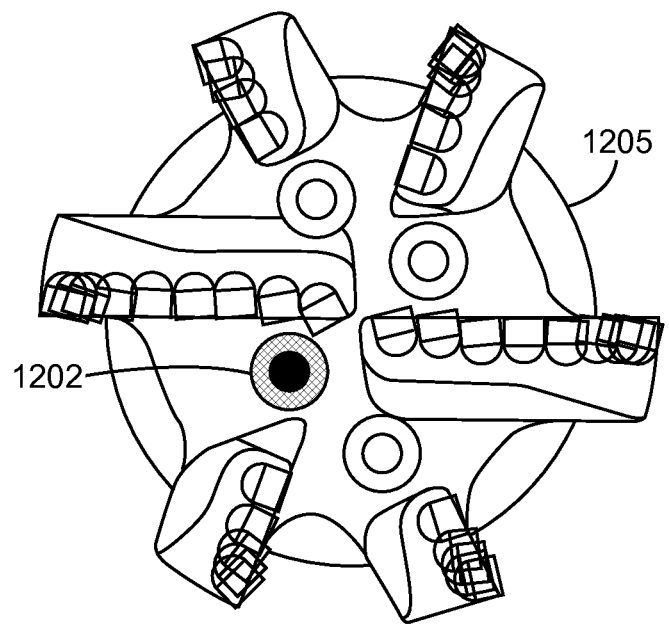
FIG. 13 is a schematic diagram of a view from the face of an example drill bit having a blocked nozzle with an electric field sensor installed, in accordance with various embodiments.

FIG. 12 also shows another mounting location for vibration sensors 1201 installed in the shank of the drill bit 1205. Three of these vibration sensors 1201 may be implemented to respond to vibrations in orthogonal directions. Such sensors 1201 are less prone to damage in this position and can be serviced with a minimum of difficulty. Shown with the illustrated sensor 1201 is a connector 1233 at the base of the sensor housing 1234. When the sensor 1201 with housing 1234 is fully threaded into the cavity in the drill bit 1205 designed to receive it, it mates with an electrical connector that is used to convey signal from and power (if needed) to the sensor 1201. FIG. 13 shows the face of the drill bit 1205 of FIG. 12 with the electric field sensor 1202 installed in a blocked nozzle.

Before discussing control aspects, the signals that the apparatus described herein are designed to receive can be discussed. Various signal levels are quoted in the literature cited for the electric field arising from the crushing or breaking of rock and of drill bits. Limited information is available about the magnetic field in these references. Before proceeding, some simple calculations can be performed to estimate the order of magnitude of the effects and their distribution in the vicinity of the drill bit.

If there are no external electric fields, the piezoelectric effect can be simply described by the relation $\vec{D} = \vec{d} \cdot \vec{T}$ where $\vec{D}$ is the displacement vector, $\vec{d}$ is a vector of piezoelectric constants (more generally, this is a tensor), and $\vec{T}$ is the stress tensor. Assuming that the matrix being drilled is dominantly quartz, the principle value of the piezoelectric constant is $2.3 \times 10^{-12}$ C/N. (See "Experiments to demonstrate piezoelectric and pyroelectric effects," Jeff Erhart, Physics Education, 48(4), 2013 IOP Publishing Ltd., Table 1.)

The weight on bit can vary considerably. A value of 25,000 pounds is a reasonable, if not low number for this analysis. With a bit diameter of 8.5 inches and using a scaler form of the equation, $$T = \frac{8500 * \text{lb} * 4.44822162 * N * \text{lb}^{-1}}{\pi * (4.25 * .0254)^2 * \text{m}^2}.$$

The electric field is given by $E = D/\varepsilon_0$ where $\varepsilon_0$ is the permittivity of free space, $10^{-9}/(36\pi)$ Farads/m. From this, the electric field strength is estimated to be approximately 270,000 V/m. However, as was noted in the introductory comments, the matrix is not a pure crystal of quartz. The individual grains are oriented at random. Consistent with the experimental results referenced in the literature, it is anticipated that, on average, the orientation of the crystals will not cancel out; there will be some net preferred direction, as is also consistent with most geological situations. Even if there is an excess of only 0.01% of the grains in that preferred orientation, this would result in a field of 27 V/m. This also is not the entire story.

To a good approximation, the field falls off inversely as the cube of the distance from the source. In addition, the only signal that can be detected is the dynamic component, which is probably no more than 10% of the static component in good drilling conditions. This brings the signal down to ~2.7 V/m at the source. Because of the high electrical conductivity of the drill bit and a design requirement to protect the E-field sensors from abrasion and shock, a significant portion of an E-field sensor is shielded. With an overall sensor length of 2 cm, the voltage appearing across these sensors can be expected to be on the order of a few millivolts for sensors in the immediate vicity of the teeth of the bit, such as those shown in FIG. 1, the base of FIG. 10, and FIGS. 12 and 13. The other electric field sensors described herein will not respond significantly to the piezoelectric component of the signal.

The electric field sensors in the vicinity of the bit will respond to the piezoelectric field from rock breakup, the piezoelectric field from breaking of bit teeth, and the seismoelectric field. An acoustic correlation can be expected with each of these. As rock or tooth failure becomes imminent, the piezoelectric signature rises abruptly. Once failure has occurred, the rush of conductive fluid into the failure zone results in a seismoelectric field, with a longer decay rate. In the reported findings, the seismoelectric field is significantly stronger than the piezoelectric field (depending on the location, by orders of magnitude). From the piezoelectric field estimates, it is reasonable to expect the observed seismoelectric signatures to be on the order of 27 V/m (peak).

A crude estimate can be made of the magnetic field to be expected using the impedance relation between the magnetic and electric fields, which is given by H=E/Z, where H is the magnetic field strength in amperes/meter and E is the electric field strength in volts/meter and Z is known as the characteristic impedance of the medium in which electromagnetic waves propagate. This relation is true only for plane waves, but can serve to give an estimate of expected field strengths. For free space, Z=377 Ohms. For most borehole materials, the magnitude of Z is considerably less (and the value of Z is complex). Hence, by using the free space value of Z, the estimate will tend to be pessimistic. Assuming that the seismoelectric effect is an order of magnitude greater than the piezoelectric effect at a distance of one source radius from the point of field generation, and multiplying the magnetic field strength by the magnetic permeability of free space (which is typical for downhole formations), one obtains a magnetic field of 90 nT. Hence, magnetic signals in the range of about 1 to 100 nT can be expected, depending on the distance from the bottom of the borehole.

Correlation of the acoustic signatures with the electric and magnetic signatures serves to distinguish against sources of noise. Comparing the correlations of acoustic signatures with the electric and/or magnetic signatures close to the face of the bit with the correlations of acoustic signatures and electric and/or magnetic signatures far from the bit, the piezoelectric effect can be identified because it will only be present in the signals near the bit. (Further teachings are provided herein with respect to the piezoelectric effect in shale and with respect to a mechanism to improve the detection of the piezoelectric effect.) A piezoelectric impulse without a corresponding seismoelectric burst of radiation (or with a very weak seismoelectric component) is due to the breaking of bit teeth. This is because the seismoelectric effect is not operative when this happens, and even if the teeth only crack, the high electrical conductivity of the bits and teeth will suppress any seismoelectric signal. A piezoelectric signal with a seismoelectric signal is an indication of the breaking of rock. Note that since the piezoelectric and seismoelectric signals have different characteristic spectra, it is not strictly necessary to compare signals near the face of the bit with those near the tail of the bit, but improved signal to noise rejection can be expected in the latter case. Likewise, it is not strictly necessary to correlate the electric or magnetic signals with acoustic signals, but the signal to noise ratio, and hence the estimate of bit performance, is enhanced by doing this.

The amplitudes of the piezoelectric and seismoelectric events are an indicator of bit wear: the higher the amplitude (and the sharper the rise of the signal), the sharper the bit. In addition, the statistics of the piezoelectric or seismoelectric events serves as a key to bit performance. If the statistics are quite regular with little variation, the bit is not performing well. High performance occurs at a threshold between regular and somewhat erratic statistics in the rock breakup signatures.

Analysis of the Signals and Optimization of Drilling Performance, Cross Spectrum and Power Spectrum, Cross Spectrum, Autocorrelation and Cross-Correlation.

In various embodiments, the outputs of the various sensors as described earlier can be correlated to provide indicators of bit wear and drilling efficiency. Power and cross-power spectra are also very powerful indicators of bit wear and drilling efficiency. The power spectrum, that is, the power spectral density (PSD), of a process is defined as the Fourier transform of the expected value of the autocorrelation of that process. Similarly, the cross spectrum of two processes, that is, the cross power spectral density, is defined as the Fourier transform of the expected value of the cross-correlation of those processes. Although useful information can be gained by analyzing the auto-correlations and cross-correlations, power spectra and cross power spectra are very powerful tools for the analyses of the kinds of processes described herein. From the literature, a general approximate expression for the acoustic or electromagnetic signature of an individual breakup of rock or of a drill bit at a time t=0 can be given by $$f[t] = A * e^{\frac{t}{\tau}} t \le 0$$

$$f[t] = A * e^{\frac{-t}{\upsilon}} * \text{Cos}[\omega_0 * t] t > 0$$

In this expression, A is an amplitude which varies from break-up event to break-up event, $\tau$ and $\upsilon$ are characteristic time periods, which are also random variables, and $\omega_0$ is a characteristic frequency for the process, which is also a random variable. The parameter $\tau$ is associated with the buildup of stress in the rock (or bit), while the parameter $\upsilon$ is a characteristic time scale for the duration of ringing after the rock (or bit) is broken. The parameters vary significantly according as to whether the material broken is rock or the material out of which drill bit teeth is constructed (PDC diamond). In the case of drill bit teeth, based on the literature, it is sufficient to assume that $\upsilon=0$ and so there is no characteristic frequency. Although ringing cannot be completely ruled out, it is expected to be at a significantly higher frequency than the ringing observed in rock.

Figure 14:
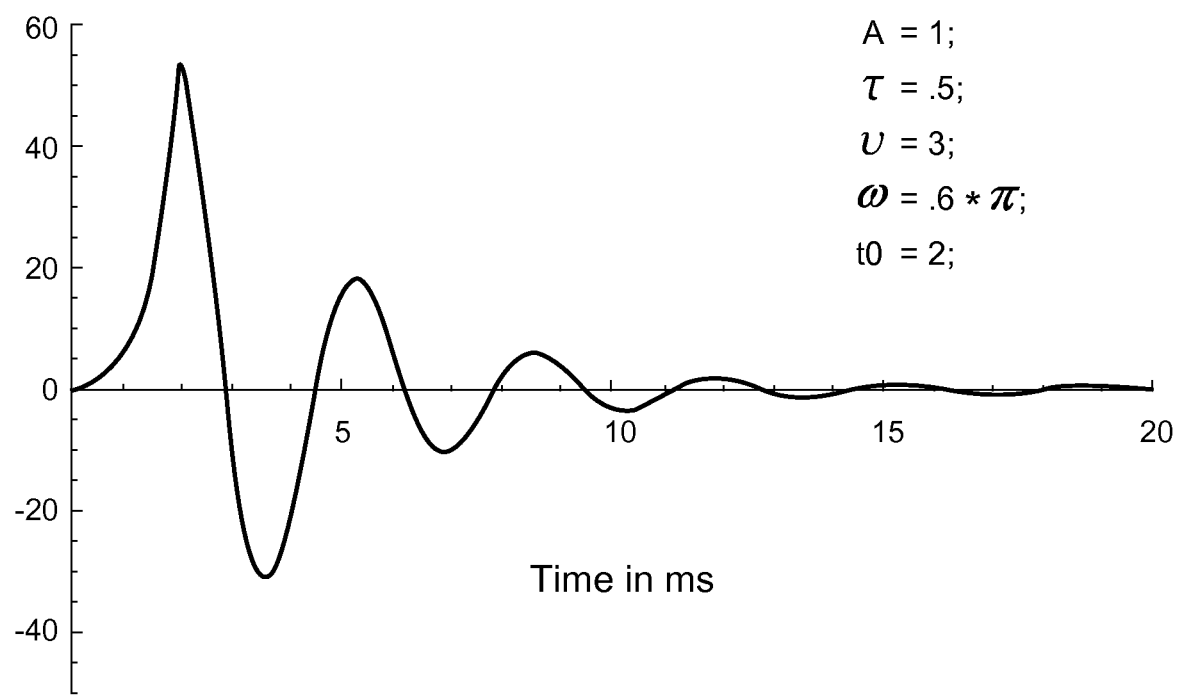
FIG. 14 is a representation of an example of an oscillating impulse from rock breakup, in accordance with various embodiments.

FIG. 14 is a representation of an example of an oscillating impulse, acoustic or EM waveform, due to the breakup of a fragment of rock. The parameters are based on values published in "Experimental Studies of Electrical Fields on a Breaking Rock Sample," Zhenya Zhu, F. Dale Morgan, Chris J. Marone, and M. Nafi Toksöz, Earth Resources Laboratory Department of Earth, Atmospheric, and Planetary Sciences Massachusetts Institute of Technology, Cambridge, Mass. 02139. In FIG. 14, the characteristic frequency is 300 Hz, where amplitude units are arbitrary.

Figure 15:
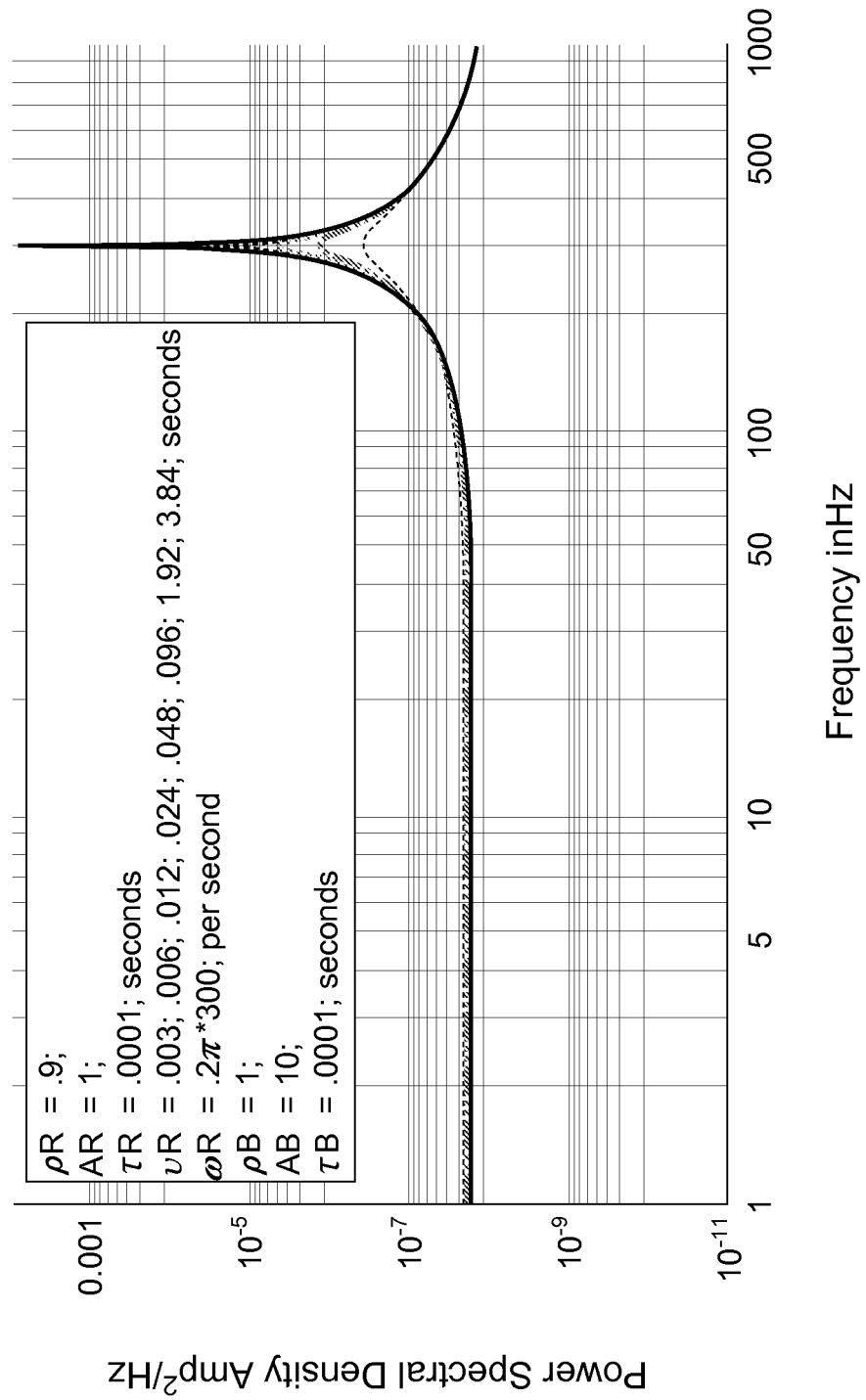
FIG. 15 is a set of plots of example power spectral density for different values of a characteristic time for decay of ringing after rock fracture, in accordance with various embodiments.
Figure 16:
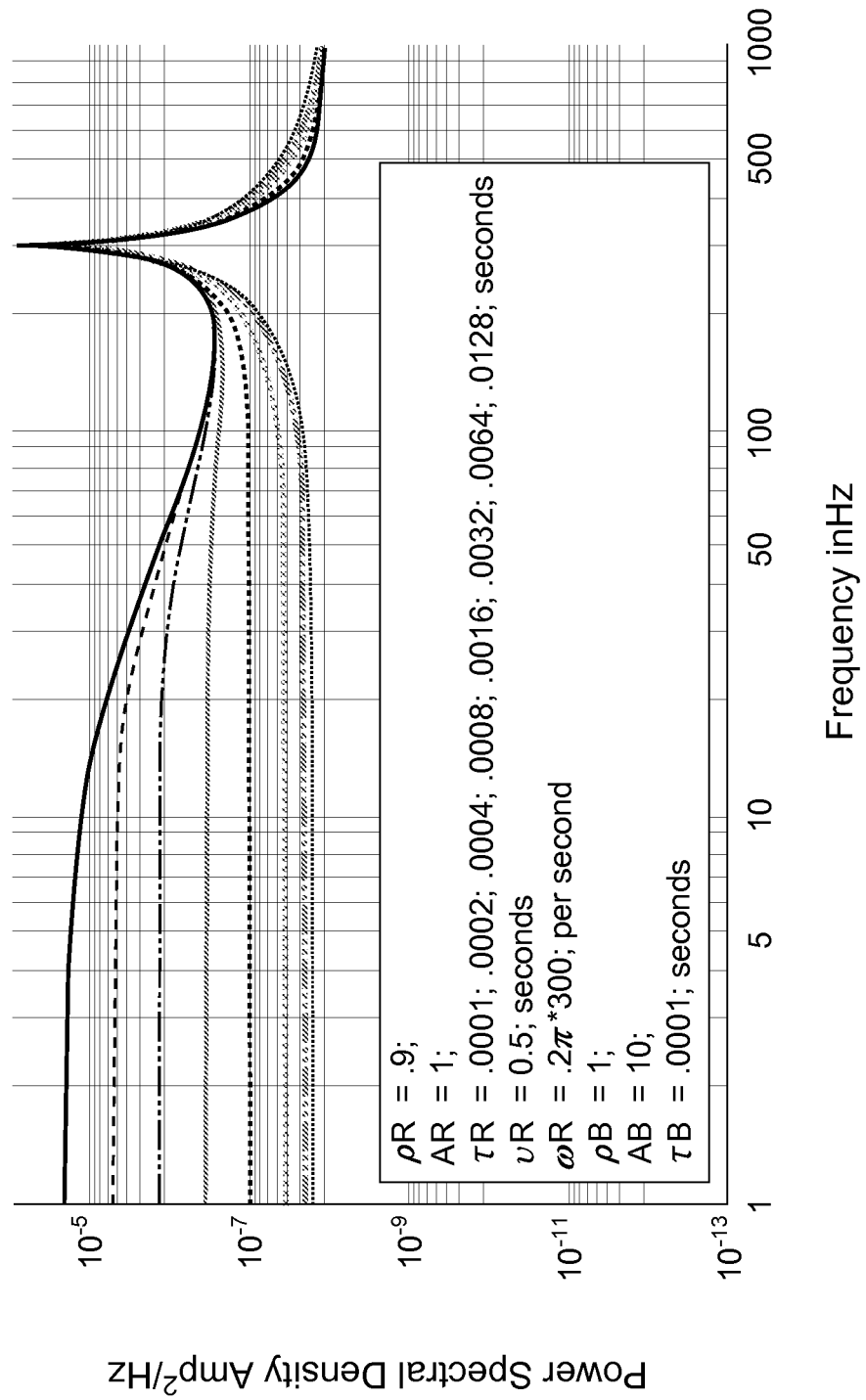
FIG. 16 is a set of plots of example power spectral density for different values of a parameter that is a characteristic time for buildup of stress with respect to a rock, in accordance with various embodiments.
Figure 17:
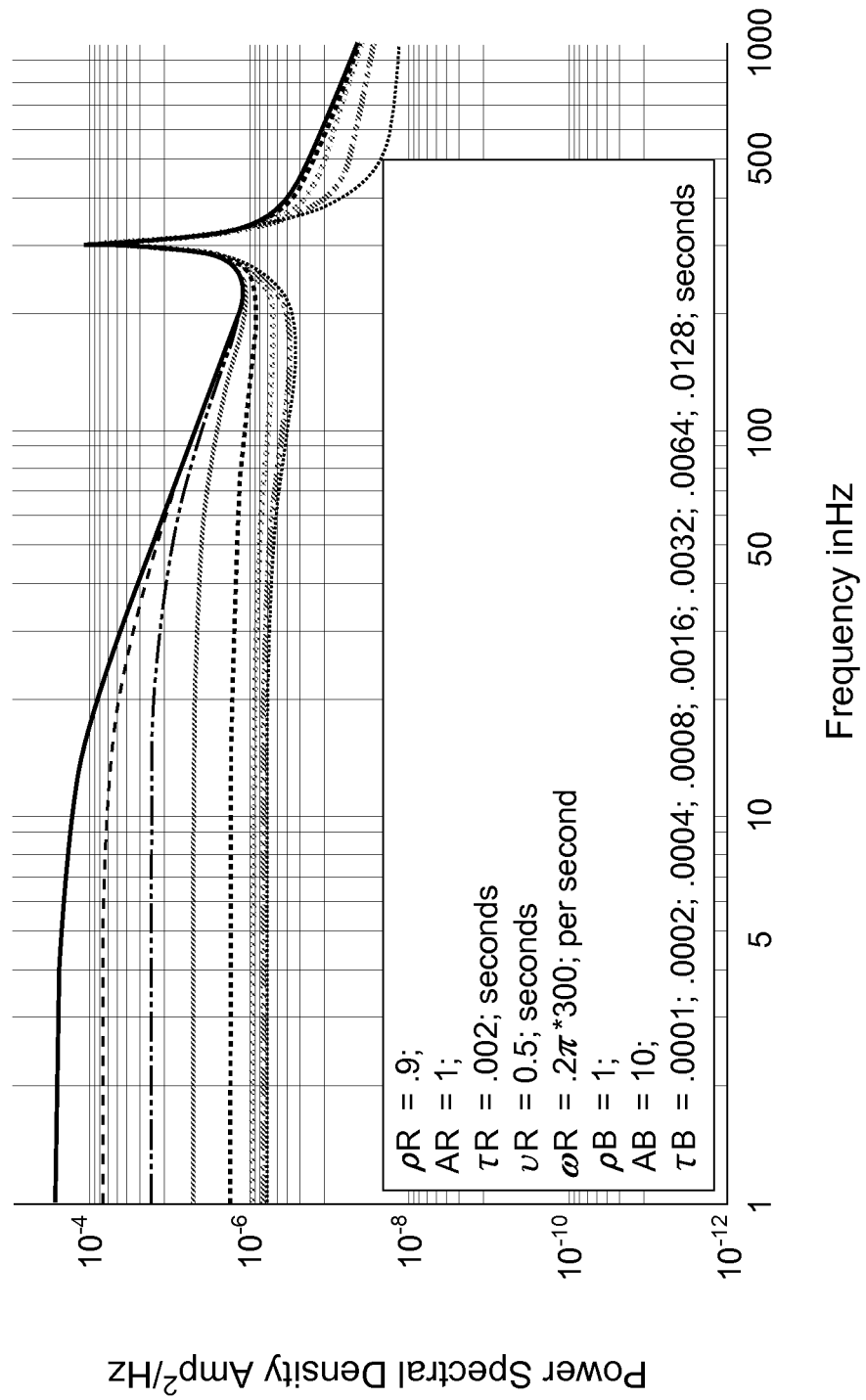
FIG. 17 is a set of plots of example power spectral density for different values of a parameter that is a characteristic time for buildup of stress with respect to a drill bit, in accordance with various embodiments.

The importance of the PSD and of the cross power spectral densities in analyzing data obtained using the instrumentation described herein will be explained after the properties of these spectral densities are explained. (A summary derivation of the power spectral density of a process consisting of a superposition of impulses from the breakup of rock and impulses from bit breakup is given in the section referred to as Appendix I.) If only the breakup times are random, the PSD for such a process is given by $$PSD[\omega] = \frac{\rho_R * A_R^2}{2\pi} * \frac{\begin{array}{c}(v_R^2 + v_R^4 \omega^2 + 2\tau_R v_R(1 + v_R^2(\omega^2 + \omega_R^2)) + \\ \tau_R^2(1 + v_R^2 \omega_R^4 + v_R^2(\omega^2 + 2\omega_R^2)))\end{array}}{(1 + \tau_R^2 \omega^2)(1 + v_R^4(\omega^2 - \omega_R^2)^2 + 2v_R^2(\omega^2 + \omega_R^2))} + \frac{\rho_B * A_B^2}{2\pi} * \frac{\tau_B^2}{1 + \tau_B^2 * \omega^2}$$

Where the subscript "R" refers to rock, and where the subscript "B" refers to bit. In deriving this expression, it was assumed that the breaking of rock and of bit teeth are independent Poisson distributed processes with rate parameters $\rho_R$ and $\rho_B$. Several PSD plots are shown in FIGS. 15, 16 and 17. All time units in these figures are in seconds, frequencies are in Hz, and the amplitude units are arbitrary.

The sharp spectral peak in FIGS. 15, 16, and 17 is due to breakup of the rock component. The parameters that were not varied in these plots were derived from the Zhu et al reference listed above. FIG. 15 is a set of plots of PSD for different values of a characteristic time, $v_R$, for decay of ringing after rock fracture. In FIG. 15, the spectral peak becomes wider and lower as the value of $v_R$ decreases. This makes sense since a decreasing value of $v_R$ corresponds to a more rapid decay of the characteristic ringing. As the bit dulls, the decay time decreases. This results in a broadening of the spectral peak and a lowering of its amplitude.

FIG. 16 is a set of plots of PSD for different values of a parameter that is a characteristic time, $\tau_R$, for buildup of stress with respect to a rock. FIG. 16 illustrates the variation of the PSD as a function of the parameter $\tau_R$. As the duration of $\tau_R$ increases, the low frequency portion of the PSD increases. Note that the low frequency portion is fairly flat below 10 Hz for all cases studied. It would seem from this that the low frequency characteristic of the PSD provides an indicator of $\tau_R$, and it does, but there is a caveat.

FIG. 17 is a set of plots of PSD for different values of a parameter that is a characteristic time for buildup of stress with respect to a drill bit. FIG. 17 illustrates the variation of the PSD as a function of the parameter $\tau_B$. Clearly, if bit breakup events are present with rock breakup events, the two cannot be distinguished. In addition, one must be careful to understand the statistical nature of the processes before drawing any conclusions. Further teaching will be provided showing how this issue can be addressed.

Figure 18:
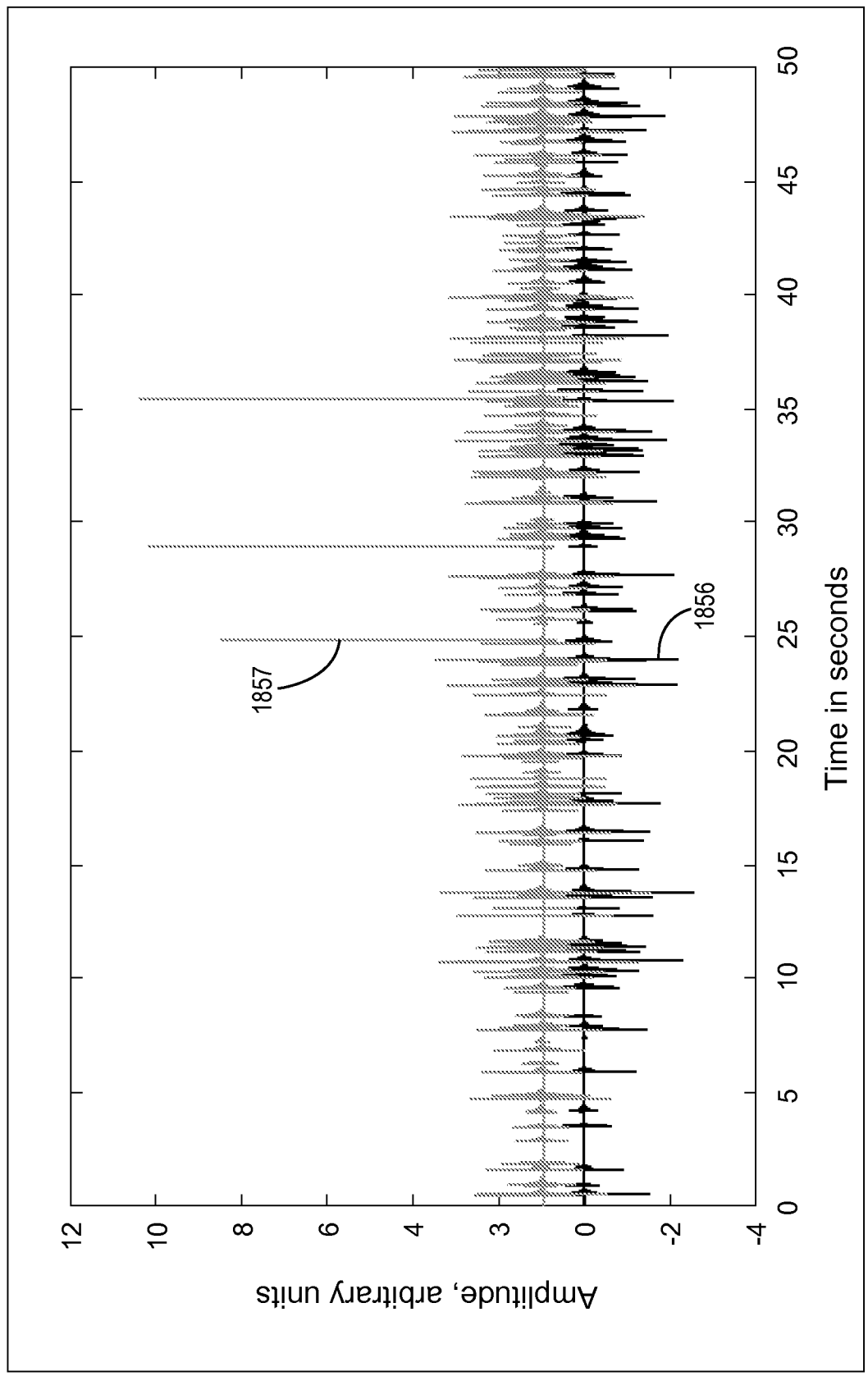
FIG. 18 is a set of example plots in a time segment of a Monte-Carlo simulation, in accordance with various embodiments.

Before discussing the statistical nature of the processes in greater depth, consider the following comments about auto and cross-correlations with respect to FIGS. 18-22. FIG. 18 is a set of plots in a time segment of a Monte-Carlo simulation of the processes described herein. Curve 1856 is representative of a signal that can be received, for example, with a magnetic field sensor. Curve 1857, shown for clarity displaced vertically by one amplitude unit from the curve 1856, is representative, for example, of a signal that can be received with an accelerometer. The curve 1857 contains a time shifted version of the curve 1856 with additive noise from a process very similar to the process that produced the curve 1856.

Figure 19:
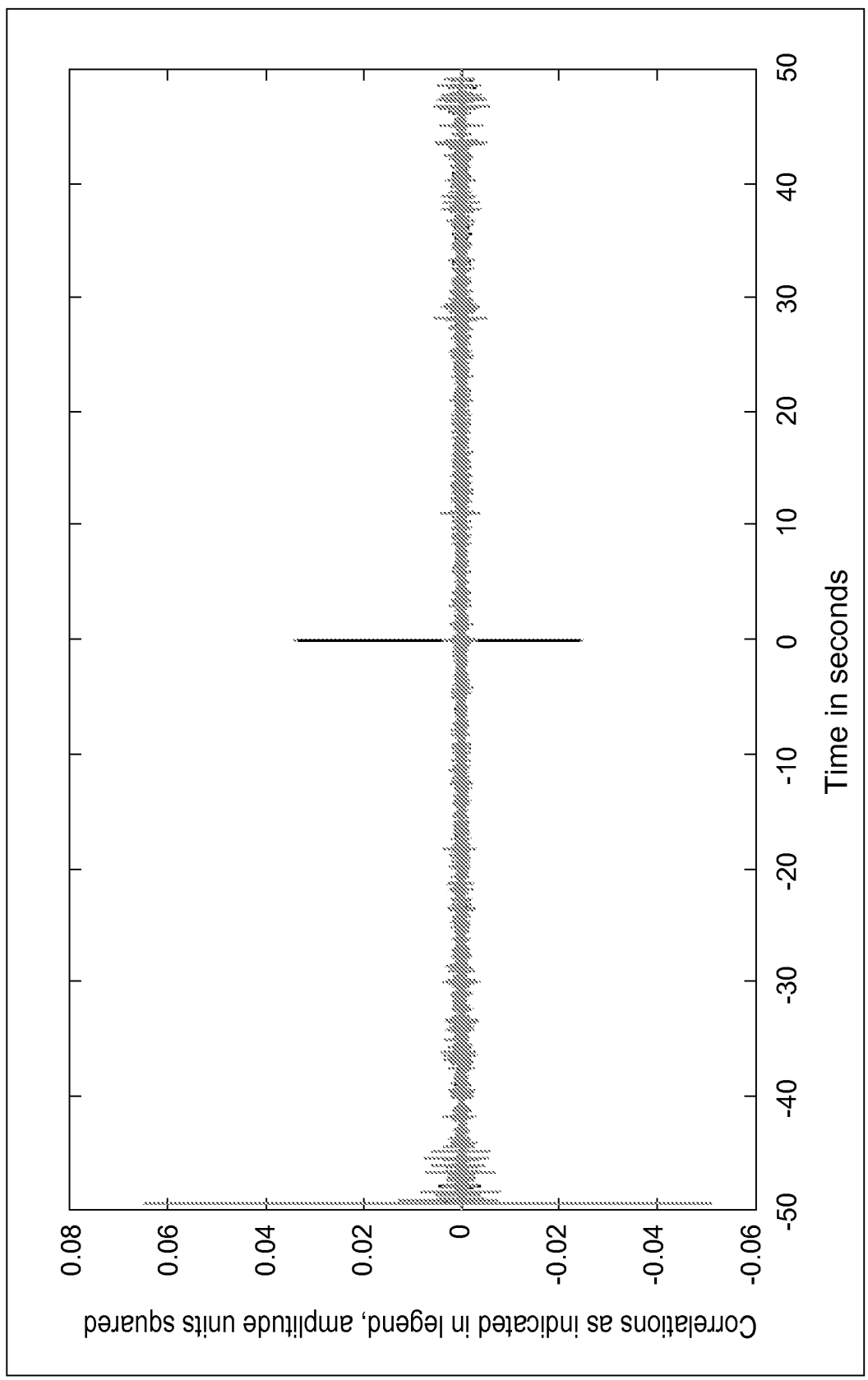
FIG. 19 is a set of example plots of autocorrelations associated with the simulated received signal of FIG. 18, in accordance with various embodiments.

FIG. 19 is a set of plots of autocorrelations associated with the simulated received signal of FIG. 18. FIG. 19 includes a plot of the autocorrelation of the curve 1856 of FIG. 18, the cross-correlation of the curve 1856 with the noise process that was introduced to produce the curve 1857 in FIG. 18, and the cross-correlation between the curves 1856 and 1857 of FIG. 18. An enlarged view of FIG. 19 is presented in FIG. 20.

Figure 20:
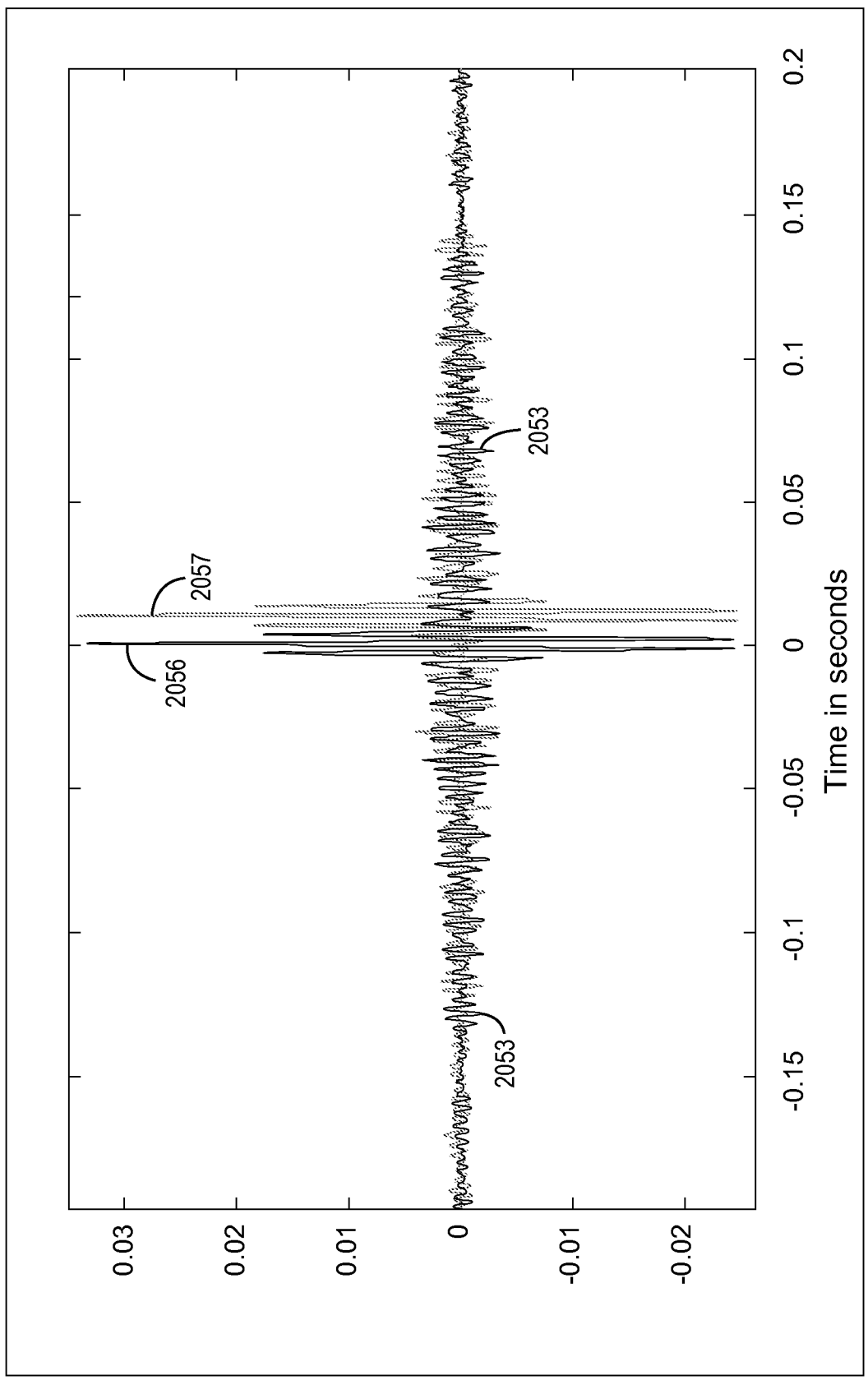
FIG. 20 is an enlarged view of FIG. 19, in accordance with various embodiments.
Figure 21:
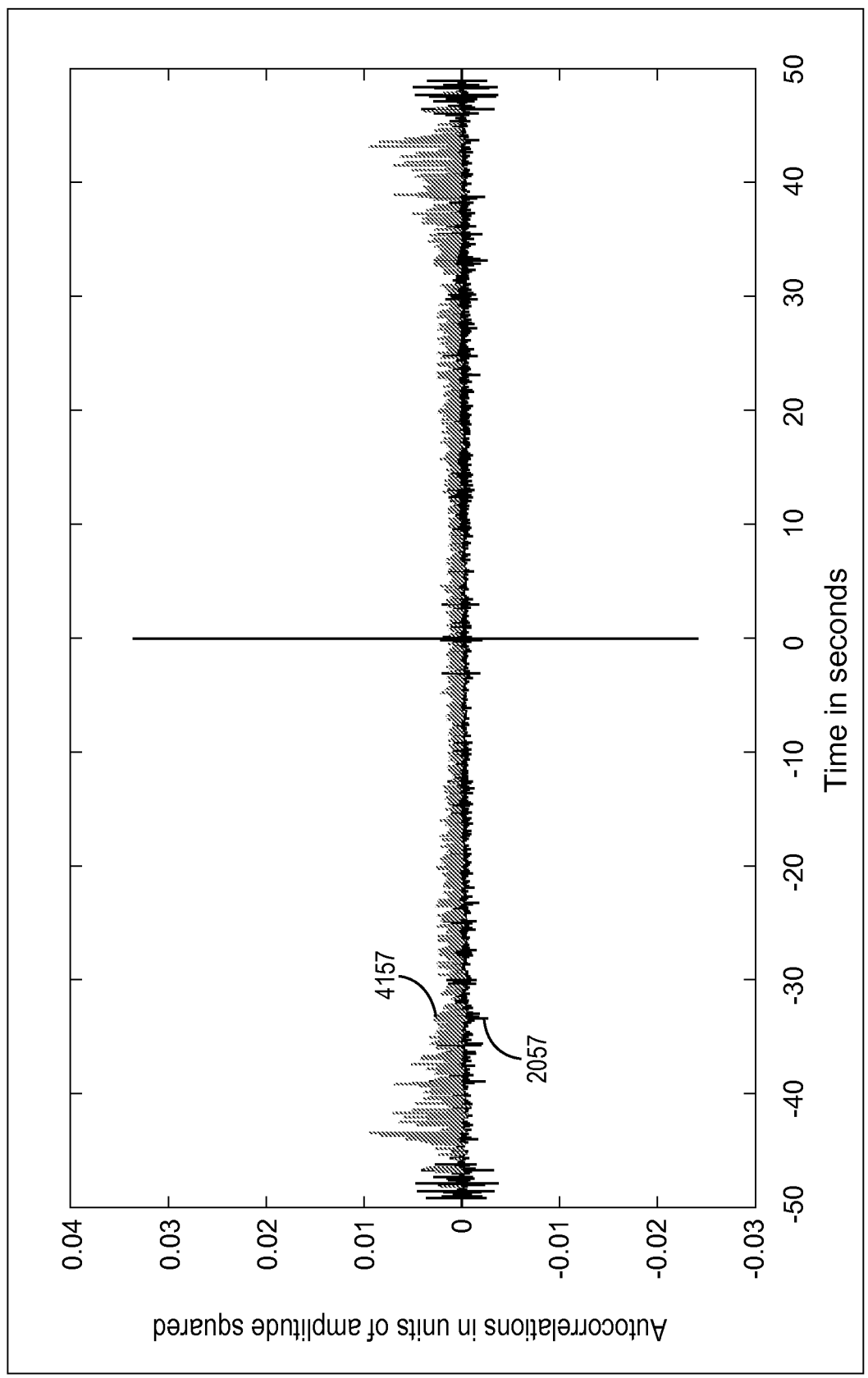
FIG. 21 is an example plot of autocorrelation of FIG. 19 in comparison with the autocorrelation of the last signal shown in FIG. 41, which is characteristic of catastrophic bit failure, in accordance with various embodiments.
Figure 22:
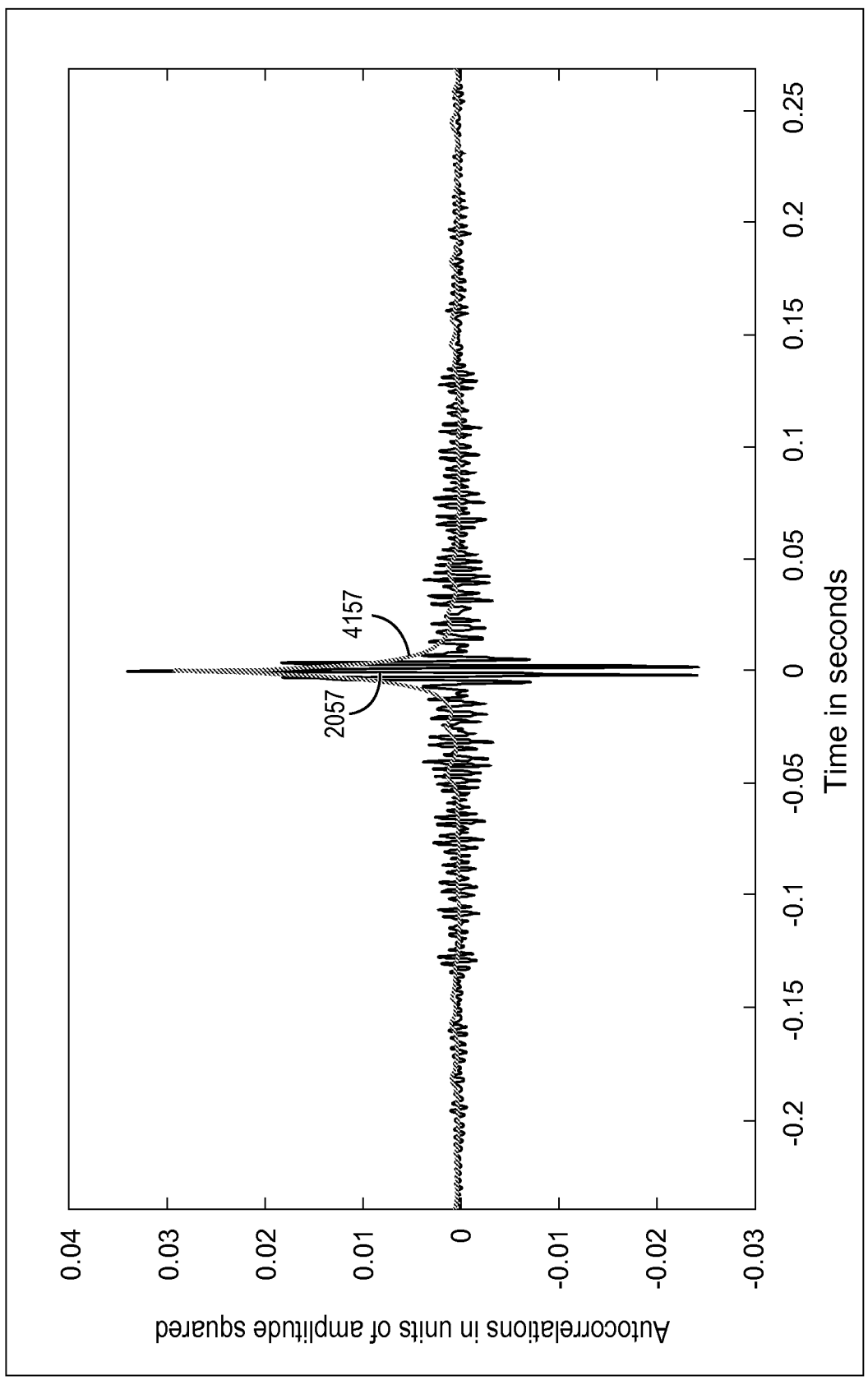
FIG. 22 is an enlarged view of FIG. 21, in accordance with various embodiments.

As expected, the autocorrelation peaks at 0 time lag. The cross correlation exhibits a prominent peak near that of the autocorrelation. It also exhibits a strong peak at the maximum possible lag value, which is an artifact of the manner in which the cross-correlation was calculated. In FIG. 20, it is seen that the peak in the cross-correlation 2056 that is similar to the peak in the autocorrelation 2057 lags it by 10 ms, which is the value introduced in the analysis. There is a curve 2053 along the axis about the value of 0 in FIG. 20 that is the cross-correlation between the signal in the curve 1856 and the noise introduced in producing the curve 1857. As can be seen, the noise is strongly suppressed by the cross-correlation. Similar to the way that spectral plots can be used, plots of this kind can be used to track bit performance. As the bit dulls, the character of the cross-correlation (or of the autocorrelation) changes. This is exemplified in FIGS. 21 and 22. These figures show the autocorrelation 2057 of FIGS. 19 and 20 in comparison to the autocorrelation 4157 of the last signal shown in FIG. 41, which is characteristic of catastrophic bit failure. As can be seen, the long lag components of the autocorrelation have picked up considerably. In addition, from FIG. 22, which is an enlarged view of FIG. 21, the character of the autocorrelation has changed fundamentally in that the oscillations in the central peak have virtually disappeared.

Until the bit is failing catastrophically, it appears that little information can be gained directly about the breakup of bit teeth from examining a PSD, a cross-PSD, an autocorrelation, or a cross-correlation. A great deal can be learned about the rock and the rock/bit interaction (especially from the spectral measures), which is related to the breakup of the bit. Before discussing these matters further, some of the underlying assumptions in the analysis as thus far described should be re-examined and qualified. Further support for this part of the discussion is given below in the sections "Notes on the Statistical Nature of Signature Parameters," Appendix I, and Appendix II.

For a given lithology and bit condition, the parameters $A_R$, $A_B$, $\rho_R$, $\rho_B$, $\tau_R$, $\tau_B$, $\mu_R$, and $\omega_R$ are all random variables. How are the findings of the above analysis affected by this? It is noted that the modulus squared of the Fourier transform of a single signal is often called a "power spectrum," but this is not correct (and a similar statement is also made for cross-spectra). The power spectral density of a process is the expected value of the Fourier transform of its autocorrelation. An underlying concept in the definition of a power spectrum is the notion of an ensemble average. Measurements of the signal being analyzed can be viewed as an ensemble of measurements performed on systems with the same statistical properties as the system of interest. The autocorrelation is taken for each measurement in the ensemble. It is more efficient to calculate the Fourier transform of the autocorrelation of each measurement in the ensemble since this is the modulus squared of the Fourier transform of each measurement. An average is then taken over the ensemble of measurements. For time invariant, that is, ergodic processes, the ensemble average can be replaced by an average over time windows. The windows need not be non-overlapping. This procedure can also be carried out with slowly varying processes. Similar concepts apply to cross power spectral densities.

Because power and cross-power spectral densities take into account the stochastic properties of signals, they can be used as global measures of drilling performance Here, use of the term "global" distinguishes between time domain measures, where the time domain measures are based on individual time series or on cross-correlations of individual time series, which provide comparatively less comprehensive information about the processes underlying the observed time series.

Among other things, Appendix II provides a discussion of the effects of the randomness of the variable $\omega_R$. It is noted there that as the standard deviation of the frequencies $\omega_R$ increases, the spectral distribution broadens about its peak (which is not surprising). There is also some reduction in the amplitude of the peak as the standard deviation of $\omega_R$ increases. The other parameter that has an effect on the width and amplitude of the spectral peak is $\upsilon_R$. As $\upsilon_R$ decreases, the amplitude of the spectral peak decreases, but it never broadens outside of the envelope of the sharpest possible spectral peak. These behaviors are born out both analytically and by Monte-Carlo analysis.

The significance of this is as follows: as $\upsilon_R$ decreases, the drilling efficiency decreases and the size of the cuttings decreases. As drilling efficiency becomes progressively less, the spectral peak drops, but stays within its original envelope. On the other hand, a broadening of the spectral peak with little drop in amplitude corresponds to a condition in which the characteristic frequency varies more as rock is destroyed. As noted earlier, an increase in variation of this frequency is an indication of an improvement in drilling efficiency, and vice/versa. In some literature references, it is also noted that the characteristic frequency increases as the bit efficiency decreases. It is also reasonable to think that the characteristic buildup time to rock failure increases as the bit dulls. Via Monte-Carlo analysis, Appendix II gives consideration to variation of all of the model parameters. This analysis confirms the statements made above.

For a given grade of bit dullness and given mud properties, the drilling efficiency is a function of the weight on bit, the rotary speed, the fluid flow through the bit as well as the mud weight and mud rheology. As is shown, the first three of these parameters can be individually controlled downhole, although electromechanical mechanisms need to be added to some conventional devices in order to use them with respect to various embodiments taught herein. As is also well known, these parameters can be controlled from the drill rig, but with considerable lag in response time and in control accuracy. The methods for determining drilling efficiency and bit wear described herein can be used with a downhole controller, and communication links to downhole means for controlling weight on bit, rotary speed and flow rate to hunt for and maintain optimal drilling efficiency. This architectural scenario is illustrated in FIGS. 23-28, which also include some features appropriate for a more general approach.

Figure 23:
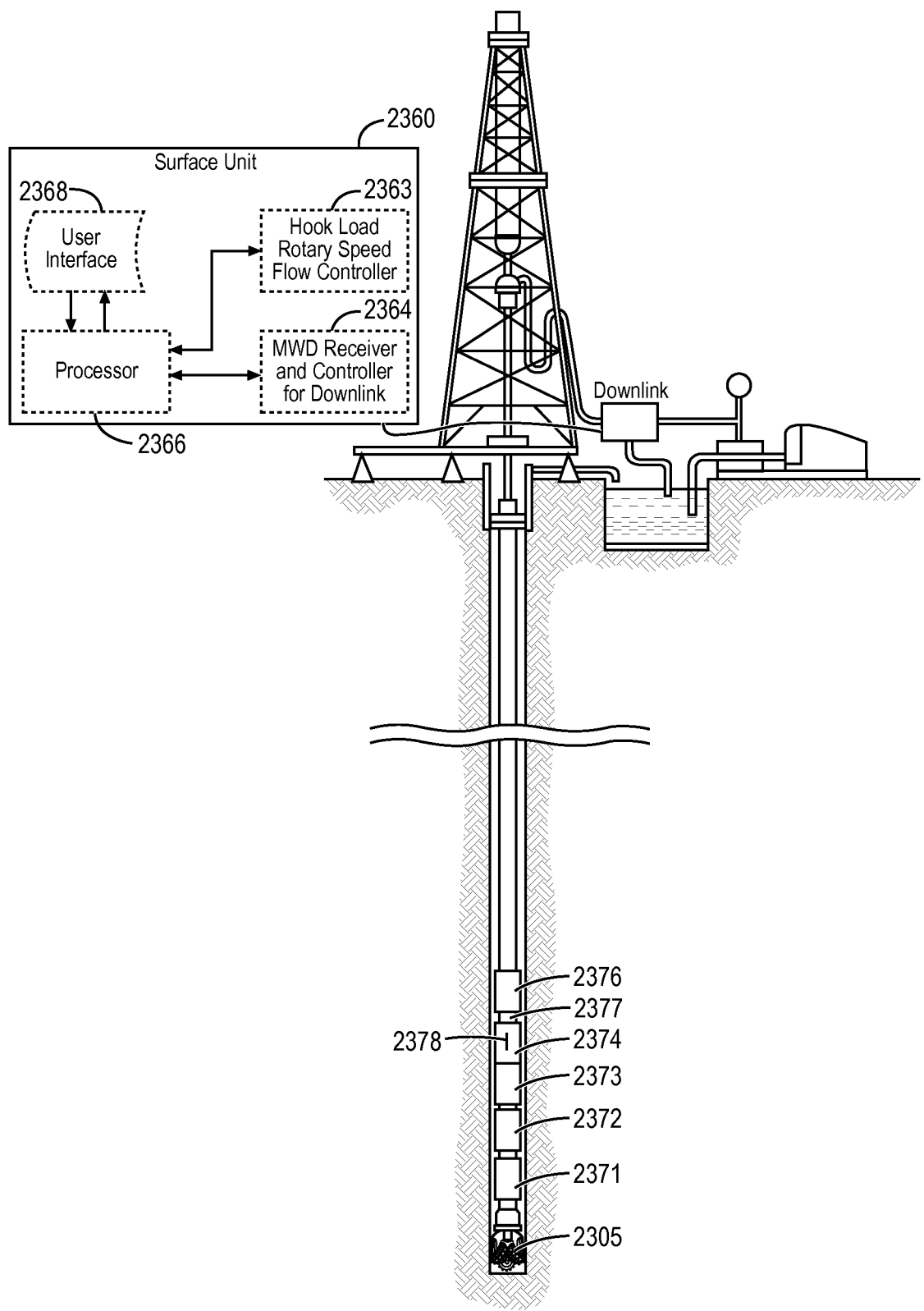
FIG. 23 is a schematic diagram of an example system structured to operate with respect to drilling efficiency optimization, in accordance with various embodiments.

FIG. 23 is a schematic diagram of a system structured to operate with respect to drilling efficiency optimization. The surface equipment 2360 can include an MWD telemetry system 2364, typically with an uplink and a downlink to enable communication between downhole and the surface. It also can include a module 2363 having a hook load sensor, a rotary speed sensor, and a flow controller. The flow controller may typically be realized through controlling the speed of the mud pump(s). The surface equipment 2360 can include a user interface 2368 and a processor 2366. The processor 2366 can be structured to control sensor operation and/or drilling operation and to process data from sensors as taught herein. In some embodiments, information gathered downhole from sensors at the bit, and possibly from other sensors above the bit can be telemetered to the surface unit 2360 and can be used to optimize hook load (for weight on bit control), rotary speed, and flow rate. In other embodiments, these three parameters can be dynamically controlled downhole using the same information.

In implementations where weight on bit (WOB), rotary speed (RS) and flow rate through the bit (Q) are dynamically modified downhole so as to optimize drilling efficiency in real time, the hook load should be first set to a value corresponding to the maximum values of WOB and Q that will be used during time intervals when the downhole system is automatically controlling drilling efficiency. If a positive displacement drilling motor (PDM) is used, the surface and Q should be set so that the maximum anticipated downhole RS can be achieved by the downhole system. If there is no PDM or similar motor, the rotary speed can be controlled by communicating with the surface unit 2360, even when a rotary steerable tool is in the system.

Shown downhole in FIG. 23 is an instrumented drill bit 2305 as described earlier, a mud motor or turbine 2371, an MWD/LWD system with a downhole processing unit 2372, a WOB controller 2373, a Q (flow) controller 2374 that may have a vent 2378, and a rotary speed controller 2376, as described earlier. Also shown in part is a communication bus 2377. The communication bus 2377 may include portions that are common to all elements of the MWD/LWD system 2372, which may be hardwired with connectors between elements. The communication bus 2377 may include portions that are linked either with hardwire and connectors, acoustic communication links, or EM communication links. For example, an EM communication link may be used to link from the instrumented drill bit 2305 to the MWD/LWD system 2372, or this may be hard wired through the mud motor 2371, or it may be hard wired to an acoustic link that transfers data through the mud motor 2371 to the MWD/LWD system 2372. Similarly, the WOB controller 2373, flow controller 2374, and rotary speed controller 2376 may be linked with hardwire, short hop EM, or short hop acoustic links. Note that operation of the flow controller 2374 may be coordinated with operation of the rotary speed controller 2376, depending on the type of rotary speed controller 2376 used. If the rotary speed controller 2376 bypasses flow into the annulus of the well bore, then the bypassed flow is to be accounted for in the setting of the flow controller 2374, otherwise not. The WOB controller 2373, the flow controller 2374, and the MWD/LWD system 2372 may be in a different order than that shown in FIG. 23.

Figure 24:
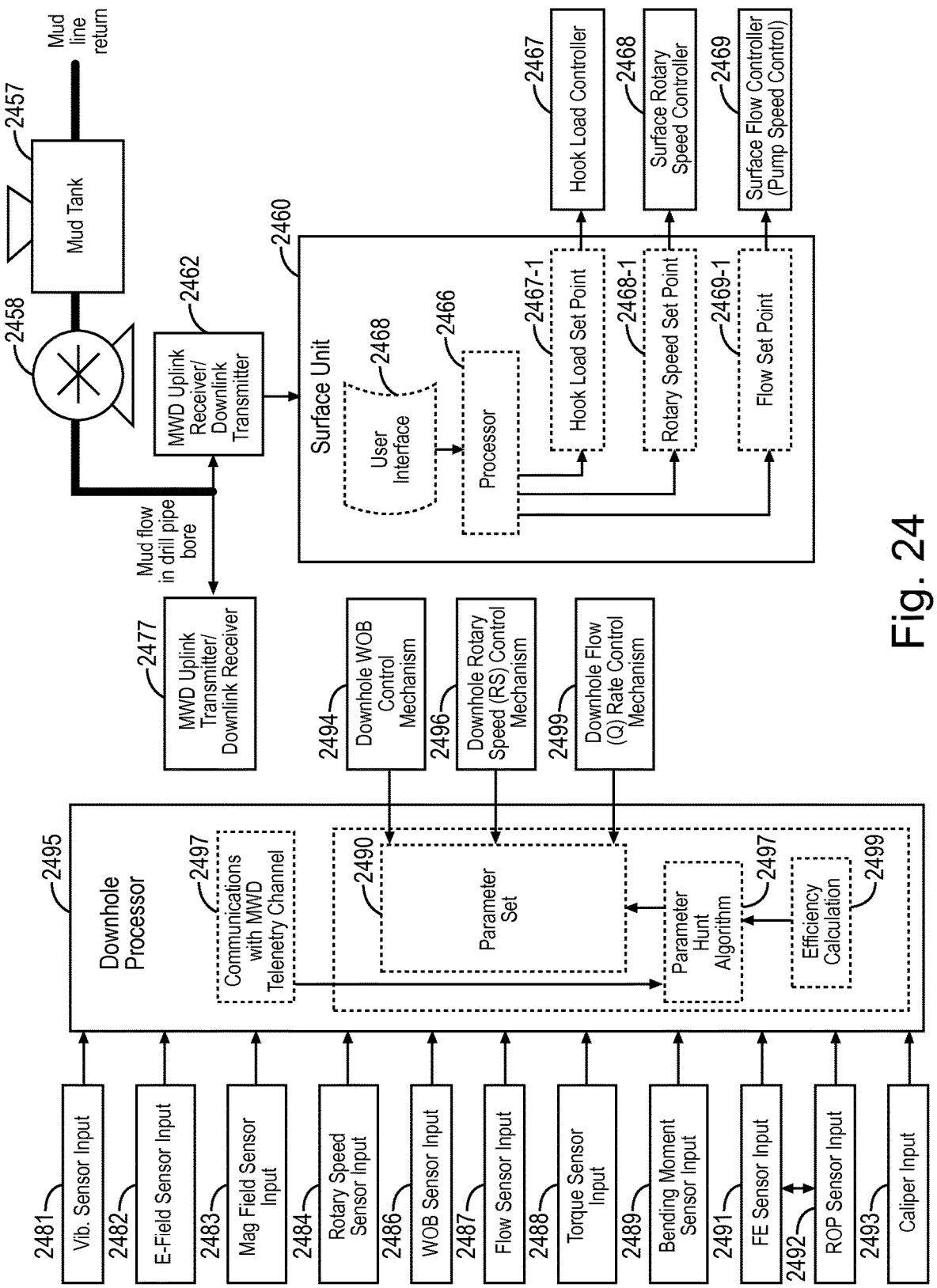
FIG. 24 is a block diagram of an example system structured to operate with respect to drilling efficiency optimization, in accordance with various embodiments.

FIG. 24 is a block diagram of a system structured to operate with respect to drilling efficiency optimization, similar or identical to the example system of FIG. 23 in which components are described in more detail and generality in FIG. 24. Not all elements shown in FIG. 24 must be present in a given embodiment as taught herein. The surface unit may be implemented as described earlier. FIG. 24 shows vibratory sensor input 2481 from the downhole vibration sensors, which may include accelerometers, E-field sensor input 2482 E-field sensors, and magnetic field sensor input 2483 from magnetic field sensors, where these sensors are at or near the drill bit as described earlier. Also shown are WOB input 2486 from a downhole WOB sensor, rotary speed sensor input 2484 from a rotary speed sensor, torque sensor input 2488 from one or more downhole torque sensors, flow sensor input 2487 from a flow sensor, and bending moment sensor input 2489 from downhole bending moment sensors. It is sometimes useful to measure downhole torque at several locations along a drillstring. All of these measurements can be made using commercially available equipment such as the DrillDOC® Drilling Downhole Optimization Collar, available from Halliburton Energy Services, Inc. It is noted that the various inputs may be provided from one or more of the respective type sensors.

Also shown in FIG. 24 are downhole formation evaluation (FE) sensor input 2491 from downhole FE sensors. These may include, for example, any number of types of resistivity, acoustic, nuclear, and NMR based sensors as well. In addition, caliper input 2493 from downhole MWD calipers may be available, such as, but not limited to acoustic calipers. All of these measurements can be used to infer formation lithology, which may be used as a part of the drilling efficiency calculation in a more general embodiment of the teaching herein to be discussed. In addition, rate of penetration (ROP) can be inferred from the correlated output of shallow-reading sensors having a known spacing between the effective centers of their measurement zones, such as taught, for example, in U.S. Pat. No. 5,899,958. ROP can also be estimated by dividing the estimated time between drilling breaks into the estimated length of a section of pipe added to the drillstring. ROP input 2492 can be provided. A drilling break can include when drilling is ceased and a section of pipe is added to the drillstring, where a section of pipe may be usually 30 feet or 90 feet. This procedure does not provide an instantaneous value, however. In addition, estimated ROP can be provided by downlinking values measured at the surface. If this is done, the values should be corrected for WOB, mud weight and friction. As is noted above, the various inputs may be provided from one or more of the respective type sensors.

A downhole processor 2495 can include hardware to communicate with the MWD uplink and downhole receiver 2477; a module to set WOB, RS, and Q; a hunt module 2497 to carry out a hunt for the optimum WOB, RS, and Q; and a calculation module 2498 to either calculate the bit efficiency or sufficient parameters related to the bit efficiency to enable the drilling efficiency to be optimized via the parameter hunt algorithm of the hunt module 2497. A downhole WOB control mechanism 2494, a downhole rotary speed (RS) control mechanism 2496, a downhole flow (Q) rate control mechanism 2499 can provide input to a parameter set 2490 that can be operated on by the downhole processor 2495. The parameter set 2490 may also include input from the hunt module 2497.

The system of FIG. 24 can include a mud tank 2457 with mud flow in the drill pipe bore being provided with a pump 2458. The mud flow in the drill pipe bore may be associated with a downhole MWD uplink transmitter/downlink receiver 2477 and a surface-associated MWD uplink receiver/downlink transmitter 2462. Similar or identical to MWD telemetry system 2362 of FIG. 23, surface-associated MWD uplink receiver/downlink transmitter 2462 can be operable with a surface unit 2460 having a user interface 2468 and processor 2466. The surface unit 2460, the user interface 2468, and the processor 2466 may be similar or identical to the unit 2360, the user interface 2368, and the processor 2366 of FIG. 23. The processor 2466 may operate to provide hook load set point 2467-1 to hook load controller 2467, to provide rotary speed set point 2468-1 to surface rotary speed controller 2468, and to provide flow set point 2469-1 to surface flow controller 2469. Surface flow controller 2469 may be a pump speed controller.

Figure 25:
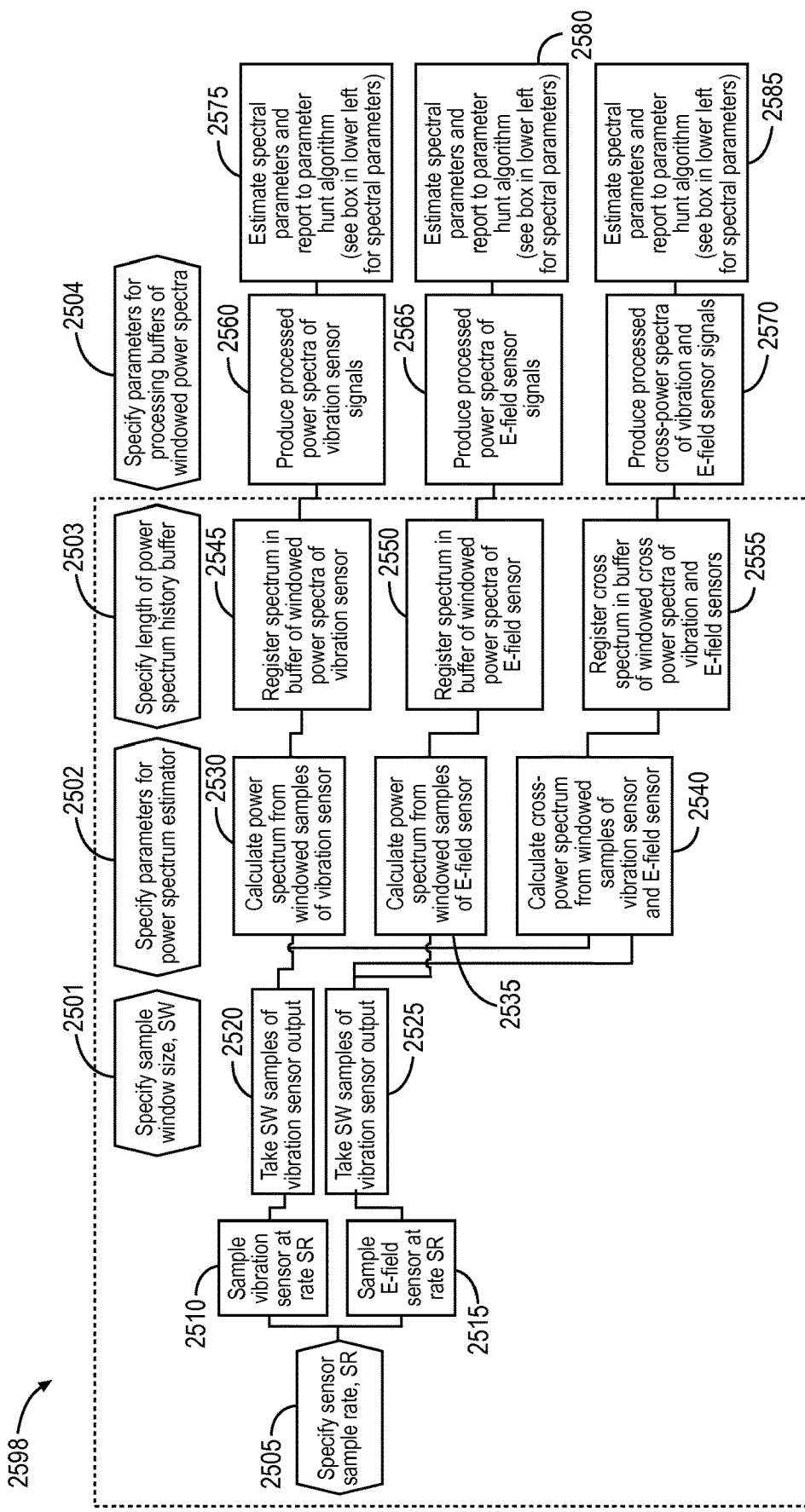
FIG. 25 is a block diagram of an example efficiency calculation module, in accordance with various embodiments.

FIG. 25 is a block diagram of an example efficiency calculation module 2598. The particular example module 2598 shown does not calculate the bit efficiency, but provides sufficient information to the parameter hunt algorithm to allow the efficiency to be optimized. This routine relies on the experimental findings discussed elsewhere herein. Since these findings constitute a limited subset of the possible behavior of rocks and bits upon breakup, it is only one specific example of the more general technique which will be described subsequently. In the specific technique referenced by FIG. 25, it is assumed that the PSD tends to have a prominent spectral peak, which is characteristic of rock breakup. The center frequency of this spectral peak, as well as the width around this center frequency, is assumed to increase as bit efficiency decreases. In addition, it is assumed that the amplitude of the PSD in the low frequency limit increases as drilling efficiency decreases and increases rapidly as a drill bit approaches failure. To keep the diagram simple, only two sensors are used in this analysis, a vibration sensor and an E-field sensor. Additional sensors, as noted earlier, can be included in a manner similar to that shown here.

In addition to the center frequencies of the dominant spectral peak, and the width of these spectral peaks in the power and cross-power spectral densities, it is important to also have an estimate of the standard deviation in these parameters. In addition, if other spectral significant peaks are identifiable, it is important to track these. It is also useful to track the low frequency limit of the power and cross-power spectral densities and the estimated standard deviation of this parameter. Various spectral parameters can be tracked in this module. Such spectral parameters that can be reported are shown in Table 1:

TABLE 1

SPECTRAL PARAMETERS

Center Frequency of the Highest Amplitude Spectral Peak
Low Frequency at Half Width of the Highest Amplitude Spectral Peak
High Frequency at Half Width of the Highest Amplitude Peak
Low Frequency Amplitude Limit
Estimated Standard Deviation of the Amplitude of the Highest Spectral Peak
Estimated Standard Deviation of the Frequency of the Highest Amplitude Peak
Estimated Standard Deviation of Low Frequency at Half Width of the Highest Amplitude Spectral Peak
Estimated Standard Deviation Of High Frequency at Half Width of the Highest Amplitude Spectral Peak
Estimated Standard Deviation of the Low Frequency Amplitude Limit
Amplitudes of the $2^{nd}$, $3^{rd}$ and $4^{th}$ Highest Spectral Peaks
Center Frequencies of the $2^{nd}$, $3^{rd}$ and $4^{th}$ Highest Spectral Peaks
Standard Deviations of the Amplitudes of the $2^{nd}$, $3^{rd}$ and $4^{th}$ Highest Spectral Peaks
Standard Deviations of the Frequencies of the $2^{nd}$, $3^{rd}$ and $4^{th}$ Highest Spectral Peaks
Amplitude of Power Spectral Densities in the Low Frequency Limit
Estimated Standard Deviation in the Amplitude of Power of Spectral Densities in the Low Frequency Limit Power spectral densities and cross-power spectral densities can be estimated by any number of methods, including but not limited to one or more of the Burg, multi-taper method (MTM), multiple signal classification (MUSIC), Welch, or Yule-Walker autoregressive techniques. It is important to understand that these densities are never fully "measured," but only estimated as they are statistical parameters. The estimates can be obtained using a range of sample rates, window lengths, and number of overlapping samples in successive windows. From these, it is possible to develop series of spectral and cross-spectral estimates from which the standard deviation can be estimated at any particular frequency. Thus, as shown in FIG. 25, a sampling rate is to set. This should be at least twice the frequency of the highest frequency component that is expected to be present in the signals that are to be processed. After this, the window size should be specified, and then the particular algorithm selected for power spectral estimation, along with any parameters required by the algorithm (such as number of overlapping samples).

Over successive frames, series of power spectra and cross-power spectra can be created for the vibration and E-field sensors. These successive spectral estimates are stored in a buffer. A pre-specified number of spectral peaks are then located in each of the buffered estimated power spectra. For the example of FIG. 25, up to four spectral peaks are identified for each estimated power spectra in the buffer. Some details are left to the implementation or can be determined by well-established experimental techniques, such as the technique for identifying spectral peaks, and for determining if there are, in fact, at least as many spectral peaks as the specified maximum (and if not, noting that the maximum number was not observed). An analysis is then carried out of the spectral peaks in all of the estimated power and cross-power spectra to identify an average center frequency for the specified number of spectral peaks and the standard deviation in frequency around those averages, and the standard deviation in amplitude of those averages. Similarly, the low frequency limit of the amplitude and the standard deviation of this amplitude can be determined for each of the estimated power and cross-power spectra. These parameters can be supplied to a hunting algorithm, for example, the hunting algorithm of FIG. 26.

The flow of operations of FIG. 25 can include specification of sample widow size, SW, at 2501, specification of parameters for power spectrum estimator at 2502, specification length of power spectrum history buffer at 2503, and specification of parameters for processing buffers of windowed power spectra at 2504. These activities can be realized as in FIG. 24 for a vibration sensor and an electric field sensor, where the activities may include, at 2505, the sensor sample rate, SR, specified. At 2510, the vibration sensor sampled at rate SR. At 2515, the electric-field sensor sampled at rate SR. At 2520, SW samples of vibration sensor output are taken. At 2525, SW samples of E-field sensor output are taken. At 2530, a power spectrum from windowed samples of the vibration sensor is calculated. At 2535, a power spectrum from windowed samples of the electric-field sensor is calculated. At 2540, a cross-power spectrum from windowed samples of vibration sensor and the electric-field sensor is calculated.

At 2545, the spectrum is registered in a buffer of windowed power spectra of vibration sensor. At 2550, the spectrum registered in a buffer of windowed power spectra of the electric-field sensor. At 2555, the cross spectrum is registered in the buffer of windowed cross power spectra of vibration and the electric-field sensors. At 2560, processed power spectra of vibration sensor signals are produced. At 2565, processed power spectra of electric-field sensor signals are produced. At 2570, processed cross-power spectra of vibration and E-field sensor signals are produced. At 2575, relative to the processed power spectra of vibration sensor signals, spectral parameters are estimated and reported to a parameter hunt algorithm. At 2580, relative to the processed power spectra of electric-field sensor signals, spectral parameters are estimated and reported to the parameter hunt algorithm. At 2585, relative to the processed cross-power spectra of vibration and E-field sensor signals, spectral parameters are estimated and reported to the parameter hunt algorithm. The types of the various spectral parameters reported to the parameter hunt algorithm can include spectral parameters selected from Table 1.

Figure 26:
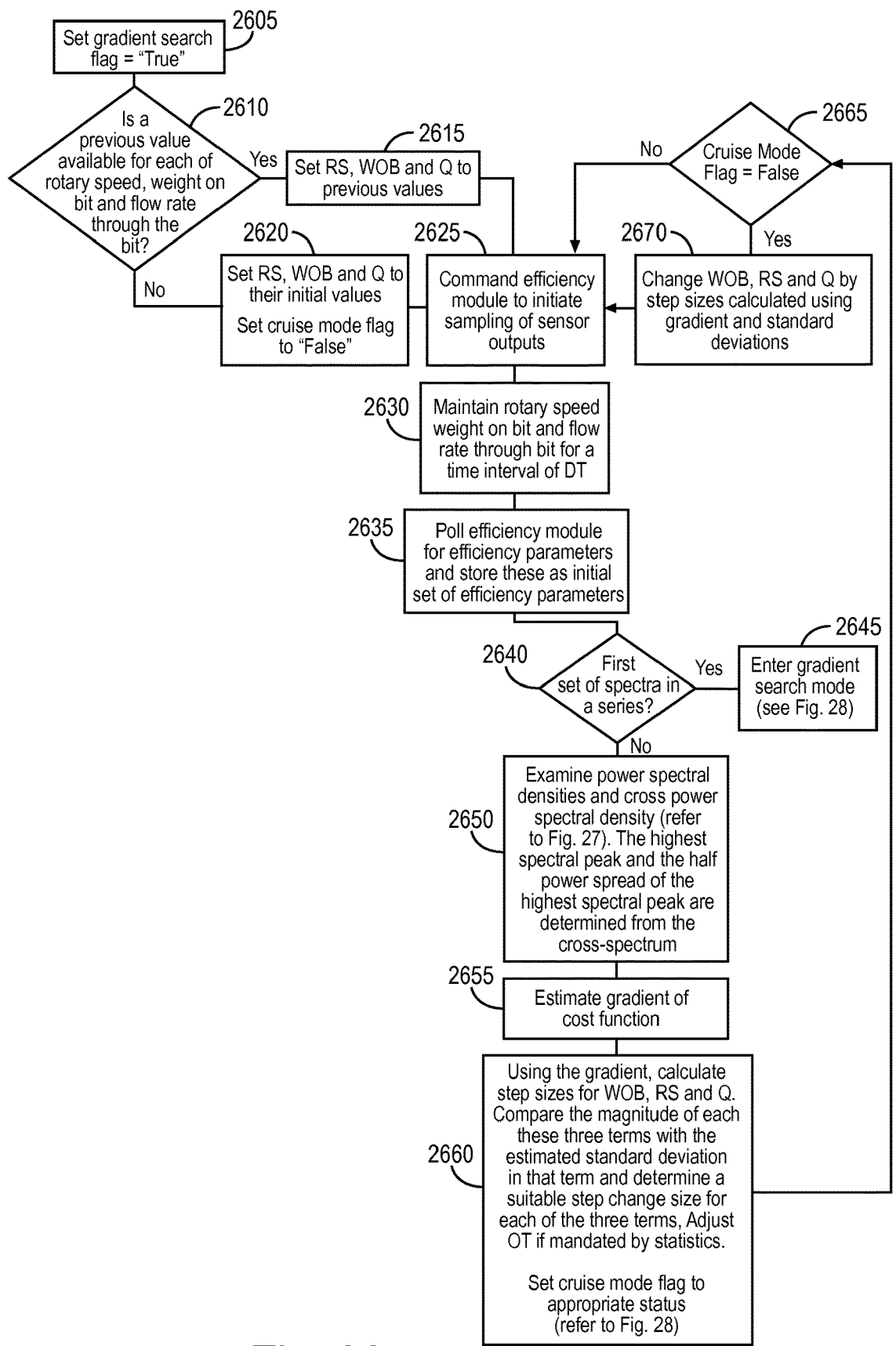
FIG. 26 is a flow diagram of an example hunting routine to set drilling parameters for optimum efficiency using the inputs from the efficiency calculation module of FIG. 25, in accordance with various embodiments.

FIG. 26 is a flow diagram of an example hunting routine 2697 to set drilling parameters for optimum efficiency using the inputs from the efficiency calculation module 2598 of FIG. 25. The hunting algorithm 2597 of FIG. 26 can be designed to determine those settings of WOB, RS and Q that optimize the bit efficiency. Many other ways are possible for hunting these parameters. The routine illustrated is conservative in that it attempts to begin estimating the optimal position in the (WOB, RS, Q) space using an earlier best estimate of the these parameters and taking steps of these parameters having a pre-specified size to determine a gradient of a parameter that increases as the drilling efficiency decreases, following that gradient to an optimal operating point, maintaining operation around that point until it is noted that it is no longer an optimal operating point, and initiating a new search when this happens. The algorithm operates to keep the (WOB, RS, Q) values within specified minima and maxima.

Prior to initiating a hunt, maximum and minimum values can be specified for (WOB, RS, Q). These may be default values in the system or values received via downlink telemetry. In addition, a maximum dwell time DT can be specified. This is a time during which drilling data is acquired without modification of (WOB, RS, Q). The step size for each of (WOB, RW, Q) can be specified, and similarly, an initial value is set for (WOB, RS, Q). The step size may be specified by default, a value from a previous use of the routine, or by telemetry downlink. The hunt for optimal parameters can begin by setting a flag to indicate that a gradient search needs to be carried out. At 2605, a gradient search flag is set to equal "True." This can be the default on entering the routine. At 2610, a decision is made to determine if a previous value is available for each of rotary speed, weight on bit, and flow rate through the bit. After this, if previous values are available for (WOB, RS, Q), the values stored in the hunting routine are set to these values, at 2615. At 2620, If not, WOB, RS, and Q are set to their initial values, which may be default initial values. In addition, a flag for a mode defined as "cruise" mode, in which drilling proceeds without parameter change until it is determined that drilling efficiency is no longer optimal, is set to "False." After this, the sensor outputs are sampled and input provided. At 2625, efficiency module is commanded to initiate sampling of sensor outputs. The input may be provided from the processing routines and hardware similar to or identical to such entities described with respect to FIGS. 24 and 25.

Drilling is then maintained at the set value of (WOB, RS, Q) for a time period of DT, at 2630. Following this, efficiency parameters can be calculated as described with respect to FIG. 25, in this case, or using a more general procedure described below. At 2635, efficiency module is polled for efficiency parameters and these are stored as an initial set of efficiency parameters. The inputs may be spectral parameters that may be reported from the drilling efficiency module of FIG. 25, which can include the parameters listed above in Table 1 with respect to FIG. 25. At 2640, a determination is made as to whether this is first set of spectra in a series. If this is the first time spectra have been calculated, the gradient search mode can be entered at 2645, for example, as described in more detail with respect to FIG. 28. The purpose of the gradient search is to find the direction in (WOB, RS, Q) space in which the rate of increase of drilling efficiency is maximum. Once the gradient search is complete, the power and cross-power spectral densities can be analyzed, in a manner such as associated with FIG. 27, where the spectral peak of highest amplitude is determined, along with the width of that peak. The width of a peak is the separation in frequency between the two half power points on either side of the peak. At 2650, power spectral densities and cross power spectral density are examined (refer to FIG. 27), and the highest spectral peak and the half power spread of the highest spectral peak are determined from the cross-spectrum. The next setting of the drilling parameters can be defined by taking or estimating the gradient of a cost function at 2655.

This cost function is typically pre-specified prior to drilling, but could be downloaded via telemetry downlink or even learned in situ. In the specific example being described, the cost function is given by $$C(WOB,RS,Q)=\lambda \cdot fc(WOB,RS,Q)+\mu \cdot \Delta fc(WOB,RS,Q),$$

where $\lambda>0$ and $\mu>0$ are weighting factors in the cost function and fc is an empirically derived function of WOB, RS and Q (for example, FC could be a center frequency in a spectral peak). Nominally, $\lambda$ and $\mu$ can be set equal, but experience with a given lithology may make it possible to determine better values for these parameters. A more general form of the cost function is $$C'(WOB,RS,Q)=\lambda' \cdot fc^{\alpha}(WOB,RS,Q)+\mu' \cdot \Delta fc^{\beta}(WOB,RS,Q),$$

where $\lambda>0$ and $\mu>0$ are weighting factors in the cost function and $\alpha>0$ and $\beta>0$. In general, the cost function should be designed such that it increases as drilling efficiency decreases so as to provide a penalty for inefficient operation. The strategy is to vary the drilling parameters so as to minimize the cost function, and this can be carried out via a gradient search. Clearly, it would also be possible to set up a "cost function" that increases with bit efficiency, in which case, a maximum of the cost function is sought.

The cost function can be specified as above, for example, $$C[WOB,RS,Q]=\lambda^{*}fc[WOB,RS,Q]+\mu^{*}\Delta fc[WOB,RS,Q]$$

where $\mu,\lambda>0$
WOB≡Weight on Bit
RS≡Rotary Speed
Q≡Flow rate through bit
fc≡Center frequency of highest spectral peak
$\Delta fc$≡Half power spread of spectral peak about fc Calculate a modified gradient of the cost function that always points in the direction of increase in cost function (some other cost functions may be specified such that the direction of decrease should be used).

$$\nabla C = \left(\lambda * \frac{\partial}{\partial WOB}fc + \mu * \frac{\partial}{\partial WOB}\Delta fc\right)\widehat{WOB} + \left(\lambda * \frac{\partial}{\partial RS}fc + \mu * \frac{\partial}{\partial RS}\Delta fc\right)\widehat{RS} + \left(\lambda * \frac{\partial}{\partial Q}fc + \mu * \frac{\partial}{\partial Q}\Delta fc\right)\hat{Q}$$

$\widehat{WOB}$ is a unit vector along the weight on bit axis
$\widehat{RS}$ is a unit vector along the rotary speed axis
$\hat{Q}$ is a unit vector on the flow rate through bit axis.

At 2660, using the gradient, step sizes for WOB, RS and Q are calculated. The magnitude of each of these three terms are compared with the estimated standard deviation in that term and a suitable step change size for each of the three terms is determined. The value of DT is adjusted, if mandated by statistics. The cruise mode flag is set to appropriate status (refer to FIG. 28).

From the estimated gradient of the cost function, step sizes (with appropriate algebraic sign) can be calculated in WOB, RS, and Q such that the cost function should decrease when the (WOB, RS, Q) are changed by these values. Depending on the step size and complexity of the functional variation of the central peaks and spread in the central peaks with the parameters (WOB, RS, Q), this may or may not happen. In addition, errors can be estimated in the sizes of the steps in WOB, RS, and Q. Since it is potentially counter-productive to make a step in the wrong direction, the step sizes can be compared to their errors prior to making a step. In one approach, if the magnitude of the error is less than 0.5 of the magnitude of the calculated step size, the calculated step size can be used. No change will be made in a parameter not meeting this criterion, that is, the calculated step size in that parameter will be set to 0. The choice of 0.5 is somewhat arbitrary and may be chosen anywhere between 0.1 and 1. The system can continue to operate in gradient search mode until all of the step sizes have been set to 0. At this point, the system is put in a cruise mode.

In cruise mode, the value of (WOB, RS, Q) is not changed, but the efficiency is monitored and estimates of the gradient and proposed step sizes are calculated. Cruise mode is exited if the step size of any of the (WOB, RS, Q) parameters is non-zero and is statistically significant in comparison to its estimated error. In a sense, then, the system is always in gradient mode, but the mode is suppressed when the information available is insufficient to warrant a change in the operating parameters. This can happen if the measurement noise is high, the formation is not following the model assumed in the cost function with sufficient fidelity to allow the control of efficiency via that cost function, or optimal performance has been achieved and is being maintained.

At 2665, a determination is made as to whether the cruise mode flag equals false. If no, the procedure returns to 2625. If yes, WOB, RS and Q are changed by step sizes calculated using gradient and standard deviations, and then the procedure returns to 2625, where the efficiency module is commanded to initiate sampling of sensor outputs.

Figure 27:
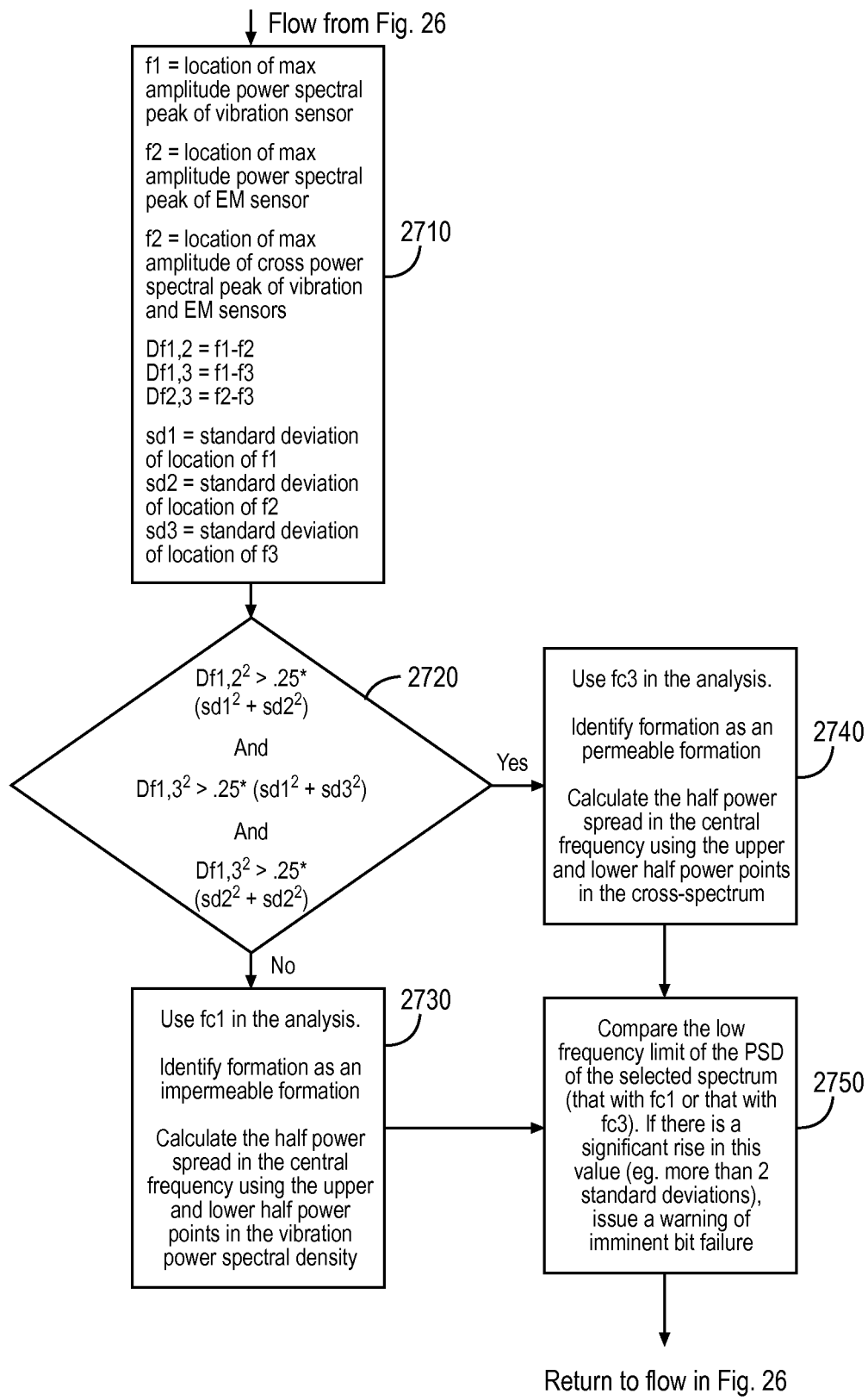
FIG. 27 is a flow diagram of an example method of examination of power spectral densities and of cross power spectral density, in accordance with various embodiments.

FIG. 27 is a flow diagram of an embodiment of an example procedure for examination of power spectral densities and of cross power spectral density. This procedure can flow from the procedure of FIG. 26. The highest spectral peak and the half power spread of the highest spectral peak are determined from the cross-spectrum. In particular, three frequencies are determined: f1, f2 and f3, at 2710. Respectively, these are the locations of the maximum amplitude of the power spectra of the vibration sensor, the E-field sensor, and in the cross power spectrum of these two sensors, where f1 is the location of maximum amplitude power spectral peak of the vibration sensor, f2 is the location of maximum amplitude of the power spectral peak of the EM sensor, and f3 is the location of maximum amplitude of the cross power spectral peak of vibration and EM sensors. Three frequency differences can be determined from these frequencies:

$$Df1,2=f1-f2$$

$$Df1,3=f1-f3$$

$$Df2,3=f2-f3.$$

As determined at 2710, the standard deviation of the location of f1 is sd1; the standard deviation of the location of f2, sd3; and the standard deviation of the location of f3, sd3.

Each of these frequency differences can be compared with an estimate of its standard deviation. If the estimated standard deviation in all of the differences is greater than 0.5 of their estimated standard deviations, then the frequency peak fc3 corresponding to the cross-spectrum can be used in the analysis and the frequency spread can be taken to be the half power spread around fc3. When fc3 is selected, there is an indication that the vibration spectral densities and the E-field spectral densities have a common and dominant spectral peak, and so the correlation should be less affected by noise than either of the separate spectra. In addition, it is an indication that the formation is permeable, and so a flag can be set to provide this information. If a common spectral peak is not identified, then the system makes use of f1, the most prominent peak in the PSD of the vibration, and the half power spread around this peak is calculated and used in the efficiency calculation. Note that in the process associated with FIG. 27, variances can be used in the comparison rather than standard deviations. This simply avoids taking a square root. In addition, the low frequency limit of the appropriate PSD can be examined to see if there has been a significant rise in its magnitude. If there has, this is a sign of imminent bit failure, and a flag is set issuing a warning.

In an embodiment, at 2720, a determination is made as to whether $Df1,2^2 > 0.25*(sd1^2+sd2^2)$ and $Df1,3^2 > 0.25*(sd1^2+sd3^2)$ and $Df2,3^2 > 0.25*(sd2^2+sd2^2)$. If yes, at 2740, use the current f3, fc3, in the analysis; identify the formation as a permeable formation; and calculate the half power spread in the central frequency using the upper and lower half power points of the cross-spectrum. If no, at 2730, use the current f1, fc1, in the analysis; identify the formation as an impermeable formation; and calculate the half power spread in the central frequency using the upper and lower half power points in the vibration power spectral density. At 2750 from 2740 or 2730, the low frequency limit of the PSD of the selected spectrum (that with fc1 or that with fc3) is compared. If there is a significant rise in this value, for example, more than 2 standard deviations, issue a warning of imminent bit failure. The procedure in FIG. 27 may conclude with returning to the flow of the procedure of FIG. 26.

Figure 28:
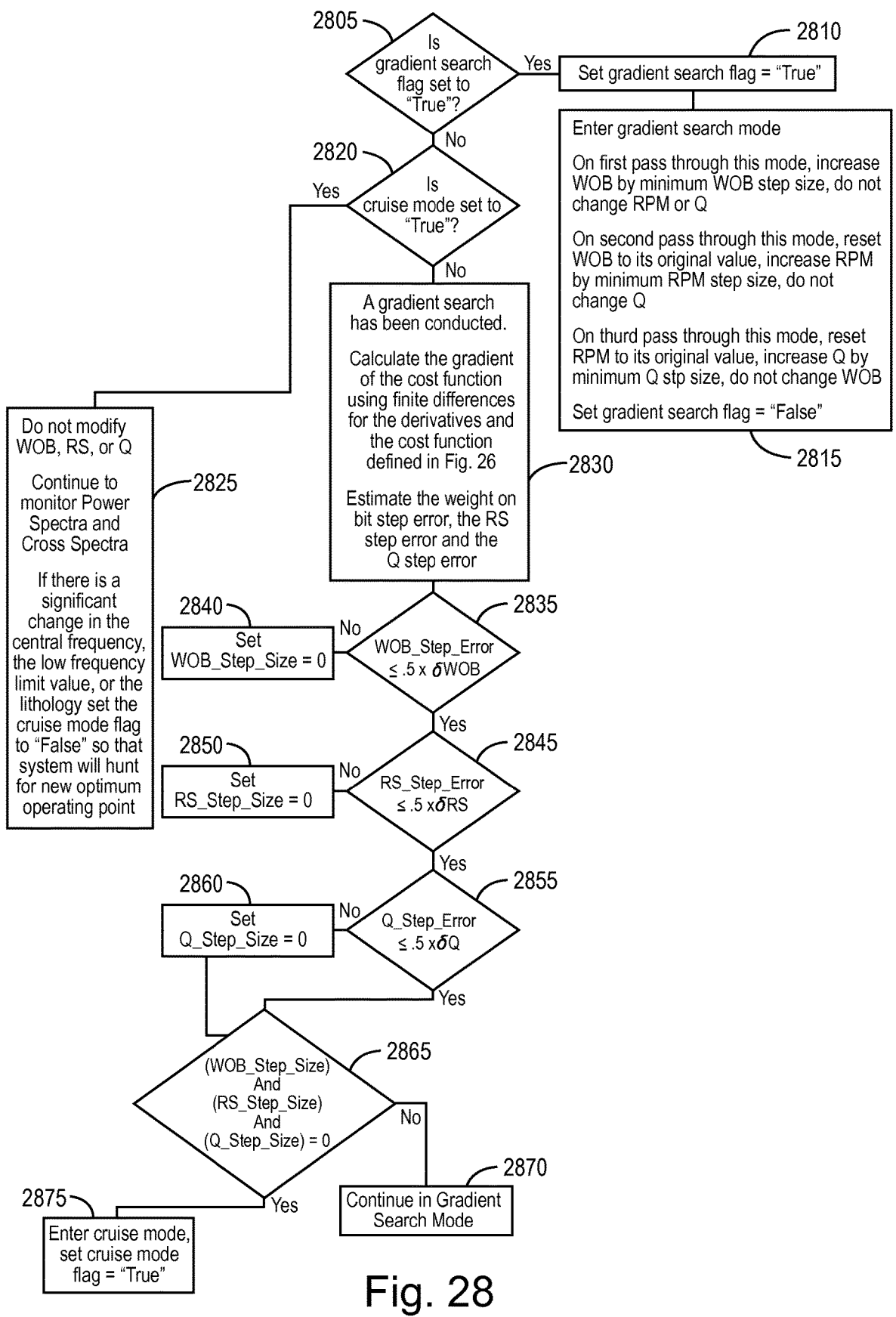
FIG. 28 is a flow diagram of an example method of calculation of step sizes for weight on bit, rotary speed, and flow rate through the bit, in accordance with various embodiments.

FIG. 28 provides the details that have been described on calculation of step sizes for WOB, RS and Q. The example procedure of FIG. 28 provides the setting of the appropriate status for the cruise mode flag of the procedure of FIG. 26 and the gradient search mode referenced in the procedure of FIG. 26. At 2805, a determination is made as whether the gradient search flag set to "True." If yes, at 2810, a gradient search flag is set equal to "True." At 2815, gradient search mode is entered; on a first pass through this mode, WOB is increased by minimum WOB step size, and RPM and Q are not changed; on a second pass through this mode, WOB is reset to its original value, RPM is increased by minimum RPM step size, and Q is not changed; on a third pass through this mode, RPM is reset to its original value, Q is increased by minimum Q step size, WOB is not changed; and gradient search flag is set equal to "False."

If no from 2805, at 2820, a determination is made as to whether the cruise mode set to "True." If yes from 2820, at 2825, WOB, RS, or Q are not modified; power spectra and cross spectra are continued to be monitored; and if there is a significant change in the central frequency, the low frequency limit value, or the lithology, the cruise mode flag is set to "False" so that system will hunt for new optimum operating point. If no from 2820, at 2830, a gradient search has been conducted; the gradient of the cost function is calculated using finite differences for the derivatives and the cost function defined with respect to FIG. 26; and the weight on bit step error, the RS step error and the Q step error are estimated using the formulas:

$\Delta WOB \equiv$ Minimum weight on bit step size $\Delta RS \equiv$ Minimum rotary speed step size $\Delta Q \equiv$ Minimum flow rate through bit step size $\delta WOB \equiv$ Size of $WOB$ step along gradient $\delta RS \equiv$ Size of $RS$ step step along gradient $\delta Q \equiv$ Size of $Q$ step along gradient $$\delta WOB = -\Delta WOB \times \left(\lambda \times \frac{\delta}{\delta WOB} fc + \mu \times \frac{\delta}{\delta WOB} \Delta fc\right)$$

$$\delta RS = -\Delta RS \times \left(\lambda \times \frac{\delta}{\delta RS} fc + \mu \times \frac{\delta}{\delta RS} \Delta fc\right)$$

$$\delta Q = -\Delta Q \times \left(\lambda \times \frac{\delta}{\delta Q} fc + \mu \times \frac{\delta}{\delta Q} \Delta fc\right)$$

$$\text{WOB\_Step\_Error} = \frac{\Delta WOB}{WOB2 - WOB1} \sqrt{\frac{\lambda^2(\sigma fc[WOB1]^2 + \sigma fc[WOB2]^2 +}{\mu^2(\sigma \Delta fc[WOB1]^2 + \sigma \Delta fc[WOB2]^2))}}$$

$$\text{RS\_Step\_Error} = \frac{\Delta RS}{RS2 - RS1} \sqrt{\frac{\lambda^2(\sigma fc[RS1]^2 + \sigma fc[RS2]^2 +}{\mu^2(\sigma \Delta fc[RS1]^2 + \sigma \Delta fc[RS2]^2))}}$$

$$\text{Q\_Step\_Error} = \frac{\Delta Q}{WOB2 - WOB1} \sqrt{\frac{\lambda^2(\sigma fc[Q1]^2 + \sigma fc[Q2]^2 +}{\mu^2(\sigma \Delta fc[Q1]^2 + \sigma \Delta fc[Q2]^2))}}$$

σfc[WOB1] and σfc[WOB2] refer to the standard deviation of fc at WOB settings 1 and 2 while RS and Q are held constant. Similarly,
σfc[RS1] and σfc[RS2] refer to the standard deviation of fc at RS settings 1 and 2 while WOB and Q are held constant, and
σfc[Q1] and σfc[Q2] refer to the standard deviation of fc at Q settings 1 and 2 while WOB and RS are held constant.
σfc[WOB1] and σfc[WOB2] refer to the standard deviation of the width of the spectral peak at frequency fc at WOB settings 1 and 2 while RS and Q are held constant,
σfc[RS1] and σΔfc[RS2] refer to the standard deviation of the width of the spectral peak at frequency fc at RS settings 1 and 2 while WOB and Q are held constant, and
σΔfc[Q1] and σΔfc[Q2] refer to the standard deviation of the width of the spectral peak at frequency fc at Q settings 1 and 2 while WOB and RS are held constant.

WOB_Step_Error≤0.5×|δWOB|

RS_Step_Error≤0.5×|δRS|

$Q$_Step_Error≤0.5×|δ$Q$| where | . . . | designates "absolute value."

At 2835, a determination is made as to whether WOB_Step_Error≤0.5×δWOB. If no from 2835, at 2840, WOB_Step_Size is set equal to 0. If yes from 2835, at 2845, a determination is made as to whether RS_Step_Error≤0.5×δRS. If no from 2845, at 2850, RS_Step_Size is set equal to 0. If yes from 2845, at 2855, a determination is made as to whether Q_Step_Error≤0.5×δQ. If no from 2855, at 2860, Q_Step_Size is set equal to 0. If yes from 2855, at 2865, a determination is made as to whether (WOB_Step_Size) and (RS_Step_Size) and (Q_Step_Size)=0. If no from 2865, at 2870, the gradient search mode is continued. If yes from 2865, at 2875, cruise mode is entered and set cruise mode flag is set equal to "True."

It should be noted that the teaching to this point is based on published test results from a fairly limited number of sources. It is not clear that the characteristics noted in those sources apply to all rock/bit interactions or even if they are characteristic of typical drilling situations. All of these results were obtained using test rigs. There is a significant difference between the dynamic characteristics of a test rig and those of an actual drilling rig. Likewise, none of the analyses or simulations noted above and in the appendices take drillstring dynamics into account. For example, it may not be true in general that when a rock breaks up, there is an acoustic signal characterized by an exponentially decaying oscillation. Nevertheless, the general procedures described herein are applicable. That is, it is well established that acoustic noise generation characterizes the breakup of rock, and it is well established that a piezoelectric signal is generated as a rock is put under stress and that a seismoelectric signal is generated when an acoustic signal is emitted in a porous medium.

In a more general approach, the acoustic and electromagnetic signatures can be monitored in situ and changes in their power spectral densities, cross-power spectral densities, autocorrelations and cross-correlations can be noted as drilling parameters such as weight on bit, rotary speed, flow rate, and mud density are varied. When formation evaluation while drilling (FEWD) sensors are used in the drilling process, for example as shown in FIG. 24, variations in lithology can also be noted from changes, for example, in natural gamma ray activity, resistivity, neutron porosity, acoustic porosity, density obtained from the scattering of gamma rays, porosity/permeability derived using magnetic resonance tools, and azimuthal images based on electromagnetic, acoustic or nuclear measurements. Azimuthal images often provide a clear indication when a boundary between two formation types has been crossed. The rate of penetration can be monitored from the earth's surface. In addition, the rate of penetration can be monitored using shallow-reading FEWD sensors, for example as described in U.S. Pat. No. 5,899,958.

In addition, other parameters can be measured downhole that are related to drilling efficiency. As noted earlier, WOB, torque, and bending moments as well as rotary speed can be measured downhole with various commercially available services. In addition, flow rate can be measured downhole and can be measured implicitly in several designs of downhole controllers. These inputs can be used more generally than has been described to this point. It is well known that input from formation evaluation sensors can be used to determine lithology. In the more general technique, cost functions are constructed for lithologies defined by a range of formation sensor inputs. For example, a certain shale might be characterized by resistivities bounded between values ρ1 and ρ2, natural gamma radioactivity bounded between count rates c1 and c2, compressional wave interval transit times of t1 and t2, shear wave speeds between s1 and s2; a sandstone might be characterized by a different range of parameters, and similarly for limestones, turbidites, etc. Characteristic time domain and power spectral domain characteristics for signals obtained during rock and bit breakup can be compiled for lithology type and for each bit type and related to drilling efficiency. The compilation of these characteristics can be made in situ, or under laboratory conditions. Within a given lithology, inputs need not be limited to vibration sensors and electromagnetic sensors, but may include dynamic values of WOB, dynamic values of torque, bending moments, rotary speed and flow. Here, the phrase "dynamic values" is used to distinguish these values from average values. Suitable cost functions can then be constructed for each lithology/bit combination and stored in a downhole library. While drilling, the appropriate cost function is used to optimize drilling efficiency in a manner similar to that described earlier.

Figure 29:
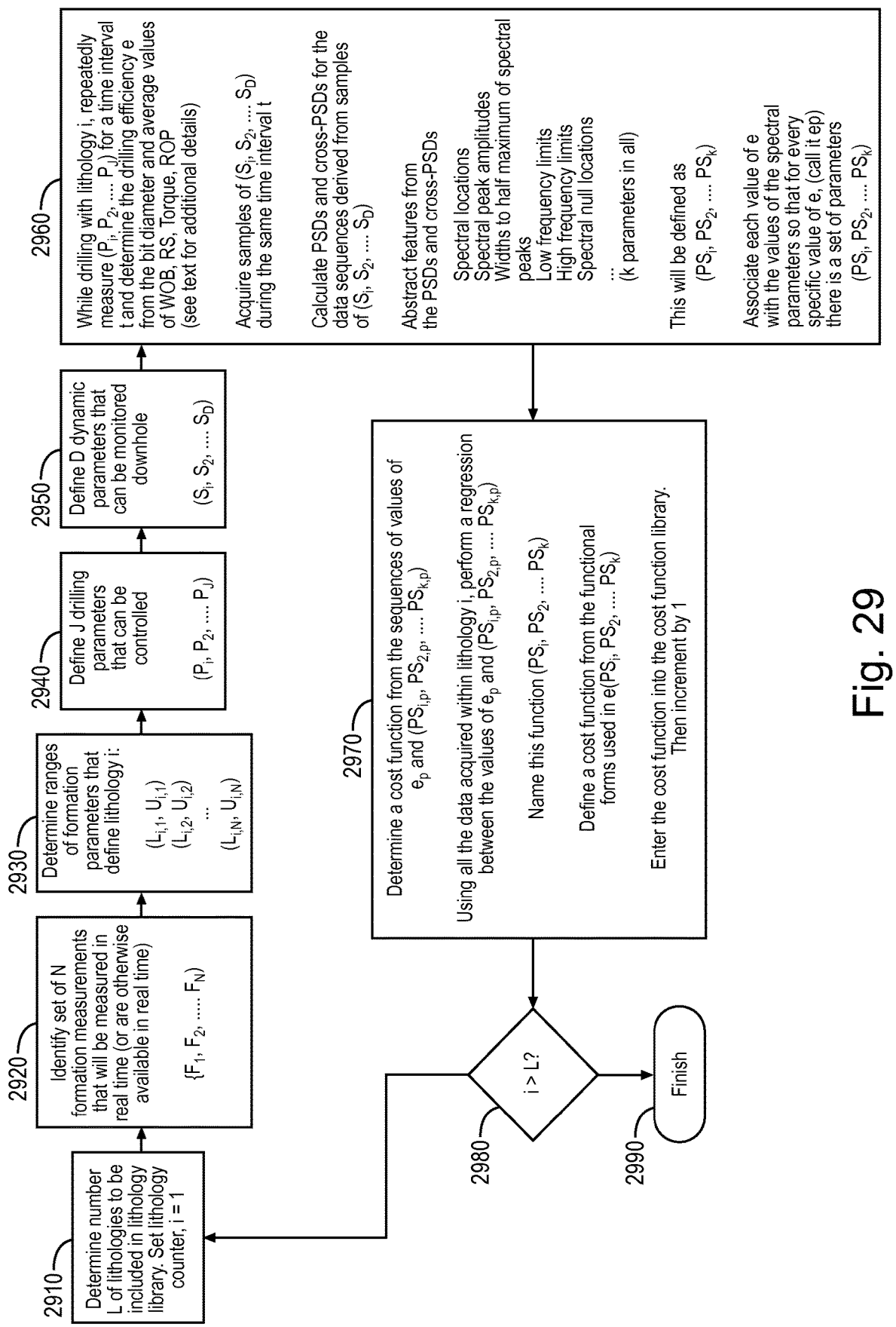
FIG. 29 is a flow diagram of an example method of determination of cost functions for different lithologies, in accordance with various embodiments.

FIG. 29 is a flow diagram of an embodiment of an example method of determining cost functions for different lithologies. The general characteristics of the method can apply to in situ determination of cost functions or to determination of cost functions in laboratory conditions. With respect to in situ, the number of lithologies to be analyzed may not be known in advance, but the loop can be executed as needed when unknown lithologies are encountered. In a laboratory, there may be a schedule of L different lithologies to be examined. The laboratory may include one or more test wells with very well known lithologies, or a test rig equipped to drill on samples of rock with known physical properties. Once the number and types of lithologies to be tested have been determined, a determination can be made of relevant formation properties that may be available downhole via FEWD or wireline measurements. These may be selected from attributes such as natural gamma ray activity, resistivity, etc. (as listed earlier).

Each lithology can be identified by a certain range of formation properties. For example, a certain shale may be characterized by natural radioactivity between 100 and 150 API units, resistivity between 0.5 and 2 Ωm, compressional transit time between 170 and 130 μs/ft, while other parameters may not be relevant to the identification of that particular shale, while a certain standstone may be characterized by natural radioactivity between 20 and 70 API units, resistivity between 1.5 and 40 Ωm, compressional transit time between 90 and 60 μs/ft, neutron porosity between 0.15 and 0.25 PU, gamma-gamma derived density between 2.5 and 2.6 gm/cc, where other parameters may not be relevant to the identification of this particular sandstone. These parameters can be used to identify the lithology while drilling and select the cost function associated with that lithology.

No definition has been given for drilling efficiency to this point, because none was needed. As used in the general approach taught herein, drilling efficiency c can be defined as the inverse of the mechanical specific energy (MSE). From Chapter 5: "Electromagnetic radiation induced in fractured materials" pp. 379-458 of "Tensile Fracturing in Rocks: Tectonofractographic and Electromagnetic Radiation Methods," Bahat, Dov, Rabinovitch, Avinoam, Frid, Vladimir, 2005, XIV, 570 p. 302 illus., Springer-Verlag, the MSE can be given by $$MSE = \left[\frac{40,000 \cdot WOB}{D^2} + \frac{40,000 \cdot RS \cdot T}{D^2 \cdot ROP}\right] \cdot .14504,$$

where WOB is the weight on bit in Klbs, D is the bit diameter in inches, RS is the rotary speed in revolutions/minute, T is the torque in Kft*lbs, and ROP is the rate of penetration in ft/hr.

Thus for this approach, a minimal set of drilling parameters is used to calculate the efficiency, namely the WOB, RS, ROP, D, and T. For a given system making use of the teachings herein, additional drilling parameters can be provided. D is assumed fixed, although variation in D as the bit wears can be taken into account. In laboratory measurements, WOB and either RS or T can be controlled over pre-specified ranges. ROP and either T or RS, whichever wasn't controlled, is measured. When measurements are made in situ (downhole) and in real time, the ranges of these values may be limited to their ranges used in the specific drilling operation in which the cost function is being determined.

Other drilling parameters that can be measured include acceleration or vibration at one or more points and along one or more axes near the drill bit, electric field measurements as described earlier, and magnetic field measurements as described earlier, and bending moments near the bit. When the cost function is being determined in situ and in real time, ROP can be determined by correlating the logs of shallow-reading sensors with a known separation, as was described earlier.

Consider a method for determining a cost function as reflected in FIG. 29. It is assumed that the lithology does not change during a single pass through the process described in FIG. 29. The overall strategy is to measure drilling efficiency over specified time intervals. Only average values of WOB, RS, T, and ROP may be used in these determinations as instantaneous or dynamic values would likely result in a very noisy data sequence. While the data is being acquired for the averages used in calculating the drilling efficiency, time sequences are created for all of the other variables. The formation measurements referred to herein are used to determine the lithology. The J drilling parameters that can be controlled ideally include (WOB, RS) or (WOB,T); Q can also be included in this list, although it does not enter into the calculation of MSE. The dynamic parameters may consist of any or all of vibration or acceleration measurements, E-field measurements, magnetic field measurements, bending moments, real time formation property measurements (resistivity, natural gamma ray, etc., as discussed earlier), and even dynamic values of WOB, RS, T, or Q. When average values of WOB, RS, T, and ROP are available, the efficiency is calculated and power spectra and cross-power spectra are calculated for the dynamic parameters.

A full set of cross-spectra can be calculated if measurements are made in a laboratory and a determination made after testing of the relevance of the cross-spectra. If measurements are made in situ and in real time downhole (as follows when an unfamiliar lithology is encountered), it will not be practical to examine all spectra, and a determination can be made before the system is sent downhole of which cross-spectra will be determined. After the power and cross-power spectral densities are determined, the following features can be extracted from them: the frequency location of spectral peaks, the amplitudes of spectral peaks, the widths to half maximum of spectral peaks, the high frequency limiting values of the spectra or cross-spectra, the low frequency limiting values of the spectra or cross-spectra, and the locations of spectral nulls. Other parameters may be specified based on experience. Note also that instead of power spectra and cross-power spectra, any number of other spectral measures can be used, such as wavelet transforms. Also note that time domain measurements can be used. A brief example of this will be given later.

Drilling in a specific lithology can continue until a predetermined range of controllable drilling parameters has been specified. After this, there is a set of drilling efficiencies associated with spectral properties over the controlled range of drilling parameters. Following this, a regression can be determined between the sequence of efficiency values and sequence of spectral properties. It may be best, instead of performing a single regression, to select a number of forms for the regression, regress to these forms, and select the regression that produces the least squared error to serve as an estimator for the efficiency. For example, one might use a linear regression between the efficiency and the spectral properties and then pair the regression down by performing a second regression only using variables that had statistically significant coefficients in the regression. Nonlinear regressions provide more flexibility and make it possible to express the efficiency in the form $$\varepsilon = \Sum_{p=1}^{D} A_p \cdot PS_p^{B_p}.$$

Regressions can be carried out using well-established techniques using other forms readily available in packages such as Matlab.

Once a suitable regression has been determined, a cost function can be determined from the regression function. This can be carried out by examination of the regression equation. Terms can be selected from the equation and assembled into the cost function so as to create a cost function that increases as the efficiency decreases. In that sense, a simple cost function is the reciprocal of the estimated efficiency. This may not always be the best approach. It may be apparent from the regression that some variables play a much more significant role than others as predictors of drilling efficiency. Suppose instead that the regression is made, not to the efficiency, but to the MSE, and the regression is of the form $$MSE = \sum_{p=1}^{D} A_p \cdot PS_p^{B_p}$$

The variables $PS_p$ have been chosen so they are always positive. The MSE increases (and hence $\varepsilon$ increases) for increases in variables $PS_p$ such that $(A_p, B_p) > 0$ or $(A_p, B_p) < 0$ and decreases otherwise. Since the objective is to minimize the cost function, a suitable cost function may be of the form $$C = \sum_{p=1}^{D} \lambda_p \cdot PS_p^{B_p},$$

where $\lambda_p$ is chosen as a positive number if $(A_p, B_p) > 0$ or $(A_p, B_p) < 0$ and as a negative number otherwise. The magnitudes of the values of can be selected based on the significance of parameter p in the regression. It is clear that one skilled in the art can easily carry out many variations on this technique. For example, an even simpler cost function may be of the form $$C = \sum_{p=1}^{D} \lambda_p \cdot PS_p$$

where the $\lambda_p$ are chosen based on the algebraic signs of the $A_p$ and $B_p$ such that C increases as efficiency decreases (or as MSE increases). It would be better in the above form if at least an exponent with the same algebraic sign as $B_p$ is used.

The method shown in Figure includes at 2910, a number L of lithologies determined to be included in lithology library and a lithology counter, i, set to i=1. At 2920, a set of N formation measurements is identified that will be measured in real time (or are otherwise available in real time) as $\{F_1, F_2, \ldots F_N\}$. At 2930, ranges of formation parameters that define lithology is $(L_{i,1}, (U_{i,1}), (L_{i,2}, U_{i,2}), \ldots (L_{i,N}, U_{i,N})$ are determined. At 2940, J drilling parameters, $(P_1, P_2, \ldots P_J)$, that can be controlled are defined. At 2950, D dynamic parameters, $(S_1, S_2, \ldots S_D)$, that can be monitored downhole are identified.

At 2960, while drilling within lithology i, $(P_1, P_2, \ldots P_J)$ are repeatedly measured for a time interval t and the drilling efficiency e determined from the bit diameter and average values of WOB, RS, Torque, ROP. Sequences of samples of $(S_1, S_2, \ldots S_D)$ are acquire during the same time interval, t. PSDs and cross-PSDs are calculated for the data sequences derived from samples of $(S_1, S_2, \ldots S_D)$. Features are determined from the PSDs and cross-PSDs, where the features can include spectral locations, spectral peak amplitudes, widths to half maximum of spectral peaks, low frequency limits, high frequency limits, spectral null locations, where there are k parameters in all, which can be defined as $(PS_1, PS_2, \ldots PS_k)$. Each value of e is Associated with the values of the spectral parameters so that for every specific value of e, (call it $e_p$), there is a set of parameters $(PS_{1,p}, PS_{2,p}, \ldots PS_{k,p})$.

At 2970, a cost function is determined from the sequences of values of $e_p$ and $(PS_{1,p}, PS_{2,p}, \ldots PS_{k,p})$. A regression is performed between the values of $e_p$ and $(PS_{1,p}, PS_{2,p}, \ldots PS_{k,p})$ using all of the data acquired within lithology i. The regression function is named $e(PS_1, PS_2, \ldots P_k)$. A cost function is defined from the functional forms used in $e(PS_1, PS_2, \ldots PS_k)$. The cost function is entered into the cost function library and the index i is incremented by 1. At 2980, a determination is made as to whether i>L. If so, this procedure finishes at 2990, otherwise the next lithology is considered.

Figure 30:
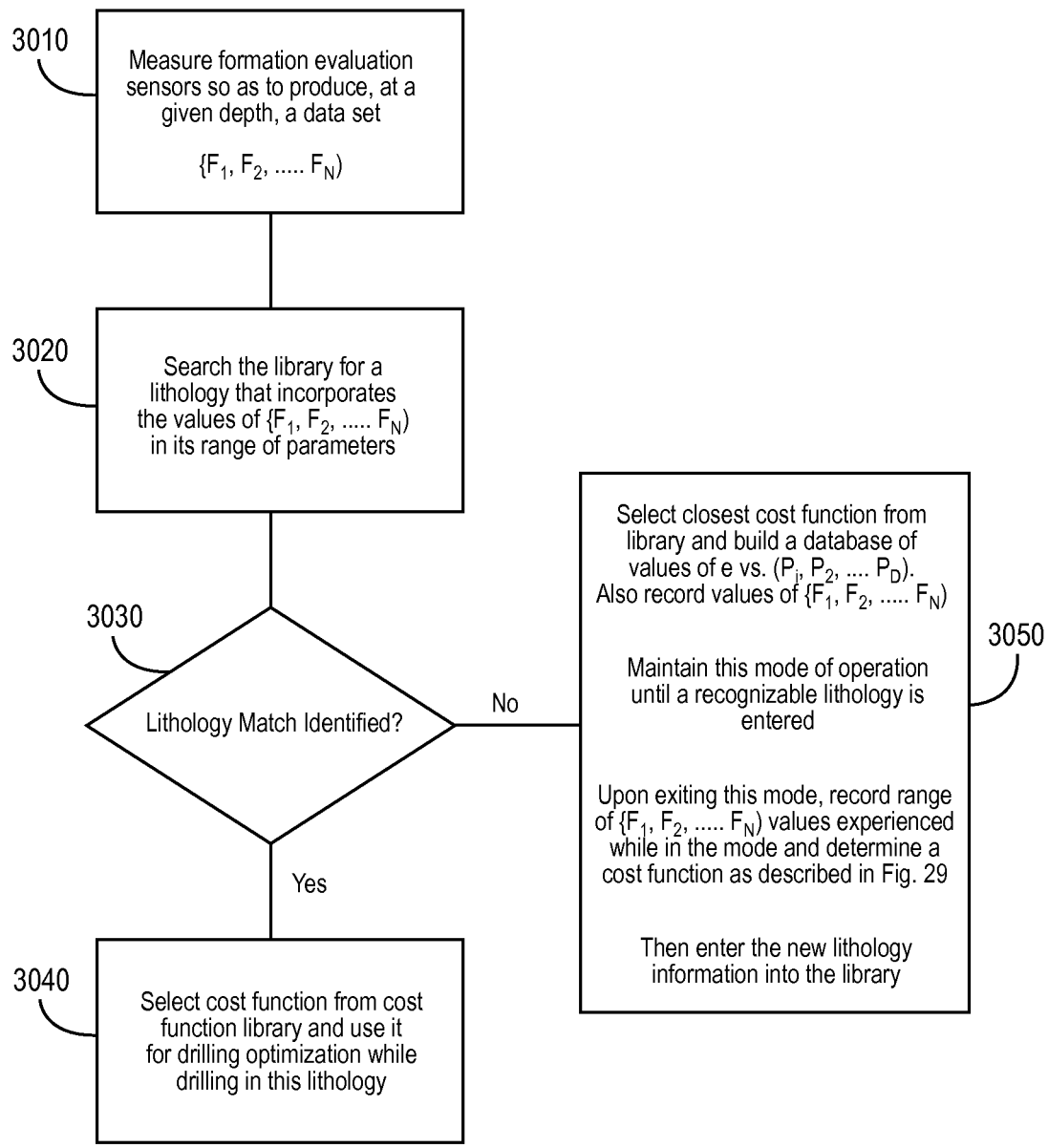
FIG. 30 is a flow diagram of an example method of a downhole use of cost function library, in accordance with various embodiments.

FIG. 30 is a flow diagram of an embodiment of an example method of a downhole use of cost function library. A processing routine is shown for selecting cost functions based on lithology. At 3010, formation evaluation sensors are measured so as to produce, at a given depth, a data set $\{F_1, F_2, \ldots F_N\}$. Lithologies in the lithology library, which can be stored downhole in the MWD drillstring, can be identified by specific ranges of formation evaluation parameters that uniquely identify a lithology. At 3020, the library is searched for a lithology that incorporates the values of $\{F_1, F_2, \ldots F_N\}$ in its range of parameters.

At 3030, a determination is made as to whether a lithology match is identified. If yes, at 3040, the identified cost function is selected from the cost function library and is used for drilling optimization while drilling in this lithology. Measurements from the FEWD sensors can be compared against the limits in the lithology table, such that the appropriate lithology can be identified, and the appropriate cost function for that lithology can be provided to the system. If no from 3030, at 3050 the closest cost function from library is selected and a database of values of e vs. $(P_1, P_2, \ldots P_D)$ built, and values of $\{F_1, F_2, \ldots F_N\}$ are recorded. This mode of operation is maintained until a recognizable lithology is entered. Upon exiting this mode, the range of $\{F_1, F_2, \ldots F_N\}$ values experienced while in the mode is recorded and a cost function is determined as described with respect to FIG. 29. The new lithology information is entered into the library.

As noted above if no lithology can be found that matches the set of FEWD values, then the procedure can be implemented to select the lithology that is the closest to the observed lithology and begin using the cost function that is appropriate for that lithology. A simple metric that can be used to determine "closest" is the metric $I_i$ defined below, although other metrics could be used. $I_i$ is a series of numbers representing $$I_i = \sum_{j=1}^{J} \left( F_j - \frac{L_{i,j} + U_{i,j}}{2} \right)^2$$

the distance between the set of formation measurement values $\{F_i\}$ and the middle of the formation property intervals defining the lithology i. J is the total number of formation properties needed to uniquely identify lithology i, and $L_{i,j}$ and $U_{i,j}$ are used as with respect to FIG. 29. The lithology library may contain more than J formation parameters and the metric defined above may be modified to skip those parameters that are not relevant. The cost function, associated with the value of "i" at which $I_i$ is minimal, can be selected as the initial cost function.

While the system is operating in this mode, formation evaluation, drilling and drilling dynamics data should be acquired continually. Once the system enters a formation that can be identified, the set of formation evaluation measurements should be analyzed as described earlier so as to define a unique lithology. After this, the drilling data and the dynamic drilling data should be used to determine a cost function as described earlier. If sufficient processing power is available downhole, the cost function can be determined downhole. Otherwise, it can be determined when the tool is returned to the earth's surface and its memory is read out. Alternatively, if a high data rate telemetry system is available, the cost function can be determined at the earth's surface while drilling and the appropriate cost function loaded into the downhole system via a telemetry downlink.

The following provides an example of time domain analysis. Though most of the discussion has detailed frequency domain analysis, as noted earlier, the teachings herein can also be carried out using time domain analysis. This section provides a brief example of how this can be performed. It should be understood that this example can be expanded on and generalized in the same way that the frequency domain teachings were.

Figure 31:
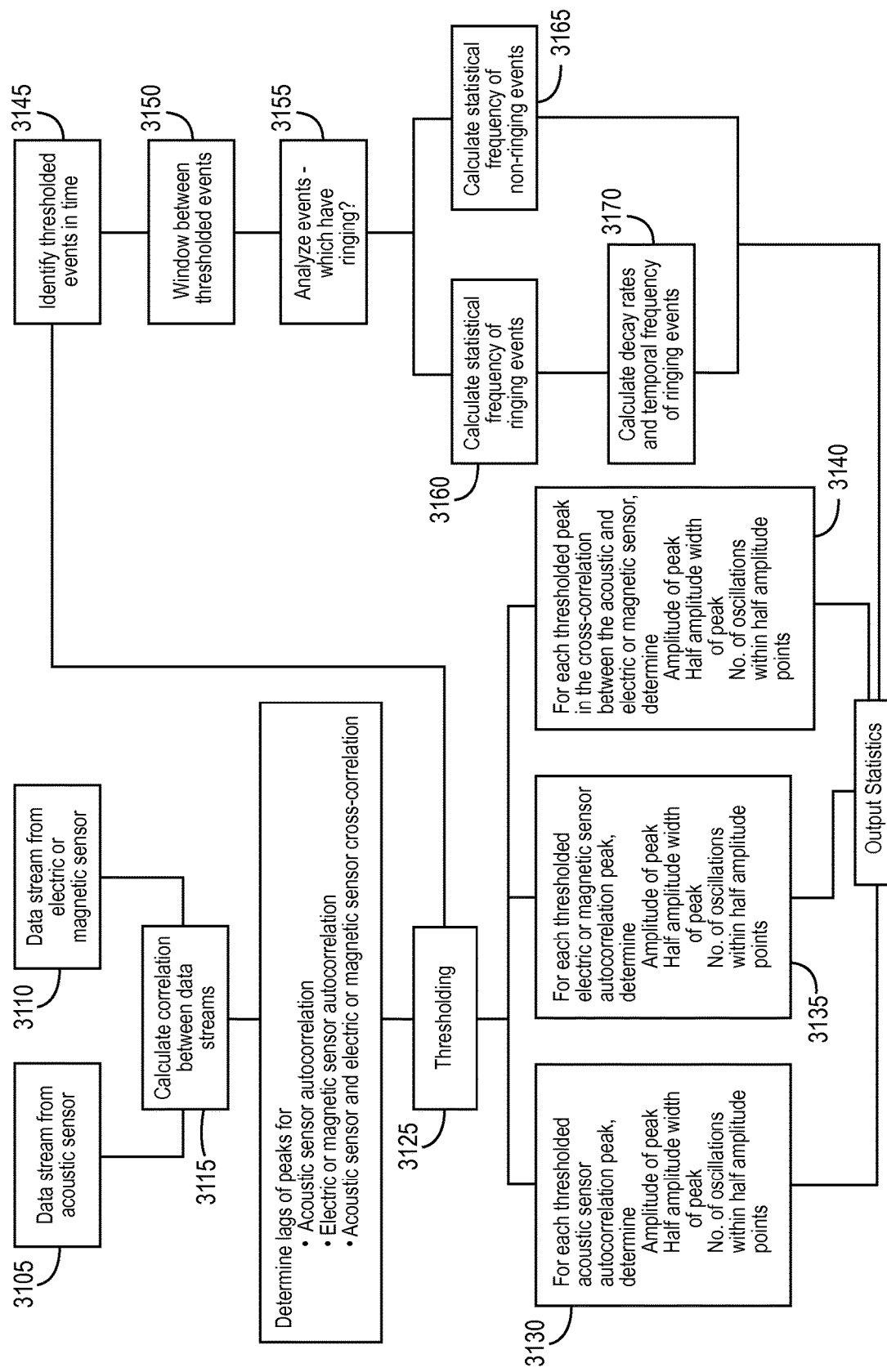
FIG. 31 is a flow diagram of an example analysis of an acoustic and electric or magnetic data stream, in accordance with various embodiments.

FIG. 31 is a flow diagram of an embodiment of an example analysis of an acoustic and electric or magnetic data stream. This general analysis scheme can be used for analyzing data in the time domain, for example, when a single acoustic channel and a single electric or magnetic field channel are correlated. The outputs of this analysis are indicators of bit wear and drilling efficiency. It should be appreciated that similar correlations can be carried out among the sensors of a system. In addition, it is noted that it is not essential to have acoustic sensors in the system.

Consider a continual data stream at some specified sample rate generated by and received from an acoustic sensor, at 3105, and continual data stream at some specified sample rate generated by and received from an electric or magnetic sensor, at 3110. At 3115, correlation between data streams is calculated. The sampled data can be windowed into consecutive (or possibly overlapping) windows of a specified length. After this, the autocorrelation can be calculated for each window of acoustic data and for each window of electric or magnetic sensor data. Cross-correlation can be calculated between windows of the acoustic and electric or magnetic sensor data spanning the same time intervals. The auto and cross-correlations can be carried out using any number of known techniques as, for example, using the xcorr function in Matlab, which provides considerable flexibility in these calculations. In an embodiment, a selected option in the Matlab procedure can be the 'unbiased' option, while a range of lags is selected to be the default value. Use of a windowing function is optional, but a windowing function such as a Hann window, Hamming Window, cosine window, Gaussian window, any of 28 popular window functions, or other window functions can be used. An advantage of using a window is it helps minimize anomalies at the ends of the correlation function created by the process of windowing data.

For a given time interval, the auto and cross-correlations can be examined to identify the correlation peaks. At 3120, Determine lags of peaks for acoustic sensor autocorrelation, electric or magnetic sensor autocorrelation, and acoustic sensor and electric or magnetic sensor cross-correlation are determined. At 3125, thresholding is conducted.

The peaks can then be subjected to a thresholding process in which only peaks with an amplitude above a pre-specified limit are accepted. The pre-specified limit can be based on experience, or as a default, or for autocorrelations, can be selected as 0.25 of the central peak amplitude (every autocorrelation should have a peak at lag 0), while in the cross-correlation, the peak can be set at $$.25 \cdot \sqrt{\frac{(Ampl.\ \text{Acoustic 0 lag peak}) \cdot}{(Ampl.\ \text{electric or magnetic sensor 0 lag peak})}}$$

where "Ampl.Acoustic 0 lag peak" is the amplitude of the 0 lag peak in the acoustic autocorrelation, and "Ampl.electric or magnetic sensor 0 lag peak" is the amplitude of the 0 lag peak in the electric or magnetic sensor autocorrelation. The thresholding operation serves two functions: 1) identify correlation and autocorrelation peaks that may be related to significant events, and 2) identify regions where ringing may occur.

As regarding the first served purpose, the amplitude of each peak is noted along with the time width to half amplitude on each side of each peak and the number of oscillations within the half amplitude points. At 3130, for each thresholded acoustic sensor autocorrelation peak, the amplitude of the peak, the half amplitude width of the peak, and the number of oscillations within the half amplitude points are determined. At 3135, for each thresholded electric or magnetic sensor autocorrelation peak, the amplitude of the peak, the half amplitude width of the peak, and the number of oscillations within the half amplitude points are determined. At 3140, for each thresholded peak in the cross-correlation between the acoustic and electric or magnetic sensor, the amplitude of the peak, the half amplitude width of the peak, and the number of oscillations within the half amplitude points are determined.

As regarding the second served purpose, each thresholded event in an auto or cross-correlation corresponds to a particular time in the time series. At 3145, thresholded events in time are identified. These times can be identified and can be used to define successive intervals that can be examined for ringing and non-ringing events. A ringing event of interest would be characterized by an exponential rise in amplitude followed by an exponentially decaying oscillation, while a non-ringing event would not have this characteristic. At 3150, windows between thresholded events are generated. At 3155, events are analyzed as to which have ringing. At 3160, statistical frequencies of ringing events are calculated. At 3165, statistical frequencies of non-ringing events are calculated. At 3170, decay rates and temporal frequency of ringing events are calculated.

The statistical frequency can be determined for ringing and non-ringing events. Stated differently, for a given window, the number of ringing and non-ringing events can be identified. Techniques familiar to those working with NMR analysis can be used for the identification of ringing events. These techniques (effectively curve fitting) can also be used to estimate the exponential rise and decay constants for ringing components as well as the temporal frequency of the oscillations. Finally, these statistics can be tabulated and associated with the particular time window in which they were observed. At 3175, statistics are output, where the statistics include data from 3130, 3135, 3140, 3160, 3165, and 3170.

As successive windows of data are analyzed, trends in the lags in the correlation peaks, their amplitudes and their widths can be tracked as are trends in the observed exponential rise and decay rates and temporal ringing frequencies and in the statistical frequencies of ringing and non-ringing events. A broadening of a correlation peak, a lessening of its amplitude, or a shortening of an exponential decay rate and an increase in oscillation frequency is an indication that drilling efficiency has decreased. A sharp increase in the number of non-ringing events is an indication of imminent bit failure. The discussion could be continued in complete analogy to the discussion of frequency domain measures.

Specific cost functions and optimization routines have been described herein as well as specific control means. It should be appreciated by those skilled in the art that the theory of optimization via cost functions is quite mature and any number of other techniques could be adopted in accordance with the teachings herein. Similarly, the state of known controllers is quite mature and several types of controllers not specifically identified herein may be used, for example proportional-integral-derivative (PID) controllers. In addition, given patterns similar to or identical to patterns that have been described herein, neural networks can be trained to convert such pattern information into drilling related control parameter such as drilling efficiency.

In various embodiments, the apparatus and methods as taught herein can be related to the determination or identification of formation brittleness. Brittleness is a parameter of interest to both drilling and fraccing and has become especially important in so-called "unconventional" basins and plays (areas in which hydrocarbons have accumulated or which are prospects of accumulation). A material is brittle if it has a linear elastic behavior up to the point of failure. That is, such a material has no ductility. In practice, almost all materials exhibit some ductility. According to "The effect of mechanical rock properties and brittleness on drillability," Olgay Yarali, Eren Soyer, Scientific Research and Essays Vol. 6 (5), pp. 1077-1088, 4 Mar. 2011, referred to herein as the Yarali reference, "brittleness is defined as a property of materials that rupture or fracture with little or no plastic flow." Hence, it is desirable to have a measure of brittleness. There is no industry standard for this at the moment; in "Assessment of some brittleness indexes in rock-drilling efficiency, Rasit Altindag, Rock Mech. Rock Eng (2010) 43;

361-370, referred to herein as the Altindag reference, it is noted that there are 20 proposed definitions. Although there is no general agreement on a definition, the definitions that have been attempted are illuminating. The Altindag reference lists the following:

$$B_1 = \frac{\sigma_c}{\sigma_t} \text{ (dimensionless)}$$

$$B_2 = \frac{\sigma_c - \sigma_t}{\sigma_c + \sigma_t} \text{ (dimensionless)}$$

$$B_3 = \frac{\sigma_c \cdot \sigma_t}{2} \text{ with units of } (Mpa)^2$$

$$B_4 = \sqrt{B_3} \text{ with units of Mpa}$$

The Yarali reference proposed $$B'_4 = (\sigma_c \cdot \sigma_t)^{0.72}$$

where $\sigma_c$ is the uniaxial compressive strength, and $\sigma_t$ is the tensile strength of the material.

A brittleness index can be determined from measurements of compressional velocity, shear velocity and formation density. This index can be given by $$BI = (c_1 \cdot E + c_2 v)/2,$$

where $v$ is Poisson's ratio given by $$v = \frac{V_p^2 - 2 \cdot V_s^2}{2 \cdot (V_p^2 - V_s^2)},$$

E is Young's modulus given by $$E = 2 \cdot \rho \cdot (1+v),$$

where is $\rho$ the density of the rock matrix, $c_1$ and $c_2$ are coefficients that can act as equalizer to the significance of $v$ and E as a brittleness indicator.

Yet another brittleness index is defined as the percentage of material that passes through an 11.2 mm mesh after the aggregate has been crushed by 20 impacts in a specifically designated mortar. See the Yarali reference, where this is identified as $S_{20}$. This may seem a bit ad hoc, but most brittleness indices have been derived based on observations of correlations between very direct measurements of brittleness and other rock mechanical properties. Of particular importance in this regard is the drilling rate index (DRI) provided in the Yarali reference. DRI is derived by cross-plotting measured values of $S_{20}$ with measured values of a parameter known as Sievers' J0Value (SJ), which is a measure of surface hardness. The equation for $B'_4$ was determined empirically from tests with measured values of $S_{20}$ and DRI.

Thus, useful and meaningful parameters, called brittleness indices, related to related to rock failure can be obtained from measurements of such things as Young's modulus, rock compressive strength, rock tensile strength, rock density, compressional wave speed, and shear wave speed. Another material rock property is its piezoelectric constant, or more properly, its piezoelectric tensor, which as noted earlier relates the stress tensor and the electric field displacement vector. For very brittle materials, there is a linear relation between stress and strain until failure. Hence, the displacement vector increases as the strain increases until a brittle rock fails.

Now consider the equations for the piezoelectric effect:

$$S = s*T + \aleph\, T*E$$

$$D = \aleph *T + \varepsilon *E$$

For simplicity, the appropriate tensor and vector notation has been suppressed in these equations because they do not play a significant role in the considerations that follow. In this equation, S is the strain tensor, T is the stress tensor, E is the electric field vector, D is the electric displacement vector, the tensor s the elastic compliance tensor, $\varepsilon$ is the dielectric polarization tensor, and $\aleph$ is the piezoelectric tensor. There seems to be no standard notation for the piezoelectric tensor.

Note that it is the electric displacement vector that is driven by the stress. If a measurement of the electric field is made, the driven field is divided by the dielectric constant. Especially at low frequencies, shales (of particular interest for unconventional plays) tend to have very high dielectric constants (values as high as $10^7$ relative to the dielectric constant of a vacuum have been reported). Hence, it may prove difficult to observe the transient electric field induced via the dielectric effect when shales break. A better approach is to measure the magnetic flux density. After a few manipulations of the dielectric equations and Maxwell's equations, one obtains (working in the frequency domain)

$$\nabla^2 \vec{B} + (\varepsilon*\mu*\omega^2 - i*\mu*\sigma*\omega)* \vec{B} = -i*\omega*\mu* \aleph *\nabla \times \vec{T}$$

Thus, the curl of the stress tensor serves as a source of the magnetic field, and the dielectric constant only figures into the wave vector. In the plane wave limit, the component of the wave vector along the direction of propagation is given by $$k = \omega\sqrt{\frac{\sqrt{\varepsilon^2*\mu^2*\omega^2 + \mu^2*\sigma^2} + \varepsilon*\mu}{2}} - i*\omega\sqrt{\frac{\sqrt{\varepsilon^2*\mu^2*\omega^2 + \mu^2*\sigma^2} - \varepsilon*\mu}{2}}$$

Clearly, via the stress tensor and piezoelectric effect, a correlation not only exists between brittleness and such things as compressional and shear velocity, but also with respect to the electromagnetic signals given off as shale is broken up by a drill bit. In this case, particular attention should be paid to the exponential rise in the signal prior to breakup of the rock. As discussed above, brittleness, compressional wave speed, shear wave speed, and magnetic field measurements can be carried out in a laboratory with a variety of lithologies to identify suitable correlations between brittleness and magnetic field signatures. The measurements may be conducted while the experiments described above with respect to generalization are being conducted. The correlations between brittleness and magnetic field signatures may include magnitude and rise time, as well as low frequency trends and high frequency limits in the power and cross-power spectra. As before, cross-correlations between acoustic and/or vibration measurements and the magnetic field measurements can be included in the analysis. In this case, instead of producing a cost function with the earlier teachings, a brittleness index would be produced.

As taught herein, embodiments of methods and apparatus can include the use of a correlation between acoustic and electromagnetic emission given off by a rock as it is crushed or fractured, which is referred to herein as being "broken," to infer chip size and drill bit dullness and drilling efficiency. Statistical frequency and time domain methods can be employed in such methods and apparatus. In addition as taught herein, embodiments of methods and apparatus can include the use of the determined drilling efficiency with a control mechanism to optimize drilling efficiency. The drilling efficiency data may be acquired in situ, with incorporation of this information into a data base and control model while drilling. Further, as taught herein, embodiments of methods and apparatus can include the use of the correlation of electromagnetic emission given off by a rock as it is crushed or fractured to determine brittleness.

As taught herein, embodiments of methods and apparatus can include the monitoring of acoustic and electromagnetic emissions via sensors that are mounted in, on or near a drill bit. The correlations of these measurements and their associated power spectral and cross power spectral densities can provide enablements to drill bit and formation diagnostics. Such enablements may provide an improved method of determining drill bit dullness that can include simultaneous use of acoustic and electromagnetic signatures and/or their power spectra or cross-power spectra using sensors mounted in, on or near a drill bit. In addition to the acoustic and electromagnetic signatures given off by breaking rock, there are several other sources of acoustic and electromagnetic noise at and near the drill bit. The simultaneous use of both signals aids in clearly identifying the component related to the breaking of rock. The acoustic noise sources of the signals may include, among other noise sources, bit contact with the formation via hitting the side of the borehole, bit bounce, drillstring contact with the borehole, and cuttings impacting the bottomhole assembly. The electromagnetic noise sources of the signals may include, among other noise sources, streaming potential from the bit nozzles, and induced signal via drillstring rotation in the earth's magnetic field, although this induced signal should normally be quite small due to the magnetic properties of the bit and the high electrical conductivity of the bit matrix.

With respect to these methods and apparatus, the acoustic signature, and hence the electromagnetic signature, changes as the bit becomes dull. A signature derived from the correlation of the acoustic and electromagnetic signals also changes as the bit becomes dull. Therefore, variation in the signature can be used as an indication of bit wear and drilling efficiency. The power spectral density of the acoustic signature or of the electromagnetic signature, or the cross-power spectral density between acoustic and electromagnetic signatures can be used to provide an indication of bit wear and drilling efficiency. Statistical time domain techniques, similar to or identical to techniques taught herein can be implemented for analyzing the signatures to determine of bit wear and efficiency.

As taught herein, embodiments of methods and apparatus can include enablements to drill bit and formation diagnostics from correlations of measurements from monitoring acoustic and electromagnetic emissions via sensors that are mounted in, on or near a drill bit and their associated power spectral and cross power spectral densities. Various enablements may provide novel mechanisms of identifying the distribution of drill bit cuttings sizes that are generated as rock is broken. As the bit wears, the mean size of the cuttings broken from the formation, as a borehole is constructed, decreases. This results in a shift in the acoustic and electromagnetic spectra to higher frequencies and a loss in signal amplitude.

Other enablements may provide novel mechanisms of identifying lithology at the bit that may use electromagnetic signatures. The electromagnetic signature has three components. There is a contribution from the piezoelectric effect as rock is stressed and broken. When the rock that is being broken is porous and permeable to fluid transfer, another signature will be given off due to the seismoelectric effect. Since the spectral components from the piezoelectric and seismoelectric effects are different, this signature can be used as a lithology indicator. In addition, due to differences between the piezoelectric and seismoelectric generation of electromagnetic signals, it is possible to further discriminate between these two components by making simultaneous use of electric field sensors and dynamic magnetic antennas. The detection of these signatures is enhanced by correlation with one another and with the acoustic signal. In the case that the PDC cutters are electrical insulators, there is also a contribution from the pyroelectric effect.

Other enablements may provide novel mechanisms for identifying fracture of drill bit teeth. When drill bit teeth fracture, they also give off acoustic and electromagnetic signals. The events are less common than the breaking of rock and have a different signature.

Other enablements may provide novel mechanisms for optimizing drilling efficiency. Information gained via acquisition of acoustic and electromagnetic signatures and via their correlation is communicated to a controller. Through modifying weight on bit, torque on bit or the schedule of send forces/bend angles of a rotary steerable system in response to measured parameters, a condition of optimal drilling efficiency may be obtained.

Other enablements may provide novel mechanisms for identifying rock brittleness, in which use is made of the signature of magnetic field signals that are given off as the formation is broken up by the drilling process.

Apparatus and processes operating the apparatus can provide a number of enhancements to drilling operations. When rate of penetration decreases in a drilling operation, it is often not known if the decrease is due to a change in bit wear or a change in lithology. The apparatus and processes taught herein can provide indicators of both formation wear and of lithological changes. In addition, as taught herein, this knowledge of formation wear and lithological changes can be used to optimize drilling efficiency as a part of an automated process. In addition, such apparatus and processes can be adapted to provide a determination of formation brittleness, which is an important and difficult to determine formation property that is pertinent to unconventional plays.

APPENDIX I. PROPERTIES OF ROCK AND BIT SIGNALS

Both the signal from the rock breakup and the signal from the bit can be represented in the form $$f[t] = A * e^{\frac{t}{\tau}} \quad t \leq 0$$
$$f[t] = A * e^{\frac{-t}{\upsilon}} * \text{Cos}[\omega_0 * t] \quad t > 0$$

where A is an amplitude, where depending on the signal measured, A could be m/s$^2$, m/s, pascals, volts, volts/meter, nanoteslas or Oersted units; t is the time in seconds. The term τ is a characteristic time for buildup of stress. Constants of this nature are often called "decay constants." For clarity, when a rock is referenced, the symbol $\tau_R$ is used, and when a bit is referenced, the symbol $\tau_B$ is be used. The term υ is a characteristic time for decay of ringing after rock fracture. It may be applicable to the drill bit as well, but if it is, it is thought to be very short. Nevertheless, for clarity, the symbol $\upsilon_R$ can be used as needed to identify the rock component of the signal. The term $\omega_0$ is a characteristic frequency for ringing after the breakup of a rock or a bit. Because bit oscillations are thought to be at a very high frequency and negligible, the symbols $\omega_0$ and $\omega_R$ may be used interchangeably, where the subscript "R" refers specifically to rock. $\omega_0$ is in units of reciprocal seconds and is $2\pi$ times the characteristic frequency in Hz. Impulses due to rock or bit breakup at times other than t=0 can be handled via time shift.

The following convention is used for the Fourier Transform:

$$F[\omega] \equiv \frac{1}{\sqrt{2\pi}} \int_{-\infty}^{+\infty} e^{-i*\omega*t} * f[t] * dt$$

$$F[t] \equiv \frac{1}{\sqrt{2\pi}} \int_{-\infty}^{+\infty} e^{-i*\omega*t} * f[\omega] * d\omega$$

For the rock or bit impulses $$F[\omega] = R[\omega] * e^{i*\phi[\omega]}$$

where $$R[\omega] = \frac{A}{\sqrt{2\pi}} * \sqrt{\frac{(\upsilon^2 + \upsilon^4\omega^2 + 2\tau(\upsilon + \upsilon^3(\omega^2 + \omega_0^2)) + \tau^2(1 + \upsilon^4\omega_0^4 + \upsilon^2(\omega^2 + 2\omega_0^2)))}{(1 + \tau^2\omega^2)(1 + \upsilon^4(\omega^2 - \omega_0^2)^2 + 2\upsilon^2(\omega^2 + \omega_0^2))}}$$

and $$\phi[\omega] = \text{ArcTan}\left[\frac{\omega\left(\begin{array}{c}-\upsilon^2 + \upsilon^4(-\omega^2 + \omega_0^2) + \\ \tau^2(1 + \upsilon^4(\omega^2 + 2\omega_0^2) + \upsilon^4(-\omega^2\omega_0^2 + \omega_0^4))\end{array}\right)}{\upsilon + \upsilon^3(\omega^2 + \omega_0^2) + \tau^2\upsilon\omega^2(1 + \upsilon^2(\omega^2 + \omega_0^2)) +} \\ \tau(1 + \upsilon^4(\omega^2 - \omega_0^2)^2 + 2\upsilon^2(\omega^2 + \omega_0^2))\right]$$

The phase will not be of interest in subsequent analyses since it plays no part in the power spectral density. If more than one impulse is present in a given time interval, it is assumed that the phases (on average) add randomly.

$$R[0] = \frac{A}{\sqrt{2\pi}} \frac{\sqrt{\upsilon^2 + 2\tau(\upsilon + \upsilon^3\omega_0^2) + \tau^2(1 + 2\upsilon^2\omega_0^2 + \upsilon^4\omega_0^4)}}{1 + \upsilon^2\omega_0^2}$$

$$R[\omega_0] = \frac{A}{\sqrt{2\pi}} \frac{\sqrt{\upsilon^2 + \upsilon^4\omega_0^2 + 2\tau(\upsilon + 2\upsilon^3\omega_0^2) + \tau^2(1 + 3\upsilon^2\omega_0^2 + \upsilon^4\omega_0^4)}}{(1 + \tau^2\omega_0^2)(1 + 4\upsilon^2\omega_0^2)}$$

$$\text{Lim}[R[\omega], \omega \to \infty] = \frac{A}{\sqrt{2\pi}} \frac{(\tau + \upsilon)}{\tau\upsilon\omega^2}$$

Two independent processes are posited to exist as follows: 1) rock breakup and 2) breakup of bit teeth. With respect to rock breakup, the breakup of rock occurs at random times. This randomizes the phase of the events. The distributions of the parameters may be taken as follows: $A_R$ has a normal distribution with mean $A_{R0}$ and standard deviation of $\sigma AR$; $\tau R$ has a normal distribution with mean $\tau R0$ and standard deviation of $\sigma_\tau R$; $\upsilon R$ has a normal distribution with mean $\upsilon R0$ and standard deviation of $\sigma_\upsilon R$; $\omega R$ has a normal distribution with mean $\omega R0$ and standard deviation of $\sigma_\omega R$.

Note that the distributions cannot be strictly normal since negative values of $A_R$, $\tau R$, $\upsilon R$, and $\omega R$ are inadmissible. It is therefore assumed that the standard deviations are small enough compared to their respective means that the probability of a negative value of a variable can be neglected.

Events of rock breakup are statistically independent of each other and of events pertaining to bit breakup. The parameter $\upsilon$ is such that $\upsilon>>\tau$. Events of rock breakup obey Poisson statistics with rate parameter $\rho R$ With respect to the breakup of bit teeth, the breakup of bit teeth occurs at random times. This randomizes the phase of the events. The distributions of the parameters can be taken as follows: $A_B$ has a normal distribution with mean $A_{B0}$ and standard deviation of $AB$; $\tau B$ has a normal distribution with mean $\tau B0$ and standard deviation of $\sigma_1 B$; $\upsilon B=0$, which is an approximation, but due to the conductivity of and near drill bit teeth, no oscillations are expected; and no assumption is necessary about $\omega B$, because of the assumption about $\upsilon B$. Note that the distributions cannot be strictly normal since negative values of $A_B$ and $\tau B$ are inadmissible. It is therefore assumed that the standard deviations are small enough compared to their respective means that the probability of a negative value of a variable can be neglected.

Events of the breakup of bit teeth are statistically independent of each other and of events pertaining to bit breakup. Events of the breakup of bit teeth obey Poisson statistics with rate parameter $\rho B$, where $\rho B<<\rho R$. If this is not the case, then there is a severe malfunction of the bit.

For the purpose of calculating spectral densities, assume as a first approximation that all of the listed variables can be treated by using their mean values. Without reproducing the details of the derivation, which are straightforward, with these assumptions, the power spectral density of a drilling process, as viewed by either an E-field or an acoustic field sensor, is given by $$PSD[\omega] = \frac{\rho_R * A_R^2}{2\pi} * \frac{\left(\begin{array}{c}\upsilon_R^2 + \upsilon_R^4\omega^2 + 2\tau_R\upsilon_R(1 + \upsilon_R^2(\omega^2 + \omega_R^2)) + \\ \tau_R^2(1 + \upsilon_R^4\omega_R^4 + \upsilon_R^2(\omega^2 + 2\omega_R^2))\end{array}\right)}{(1 + \tau_R^2\omega^2)(1 + \upsilon_R^4(\omega^2 - \omega_R^2)^2 + 2\upsilon_R^2(\omega^2 + \omega_R^2))} + \frac{\rho_B * A_B^2}{2\pi} * \frac{\tau_B^2}{1 + \tau_B^2 * \omega^2}$$

At a resonant peak $$PSD[\omega_R] = \frac{\rho_R * A_R^2}{2\pi} *$$

$$\frac{\upsilon_R^2 + \upsilon_R^4\omega_R^2 + 2\tau_R * \upsilon_R(1 + 2\upsilon_R^2\omega_r^2) + \tau_R^2(1 + 3\upsilon_R^2\omega_R^2) + \upsilon_R^4(\omega_R^4)}{(1 + \tau_R^2\omega_R^2)(1 + 4\upsilon_R^2\omega_R^2)} +$$

$$\frac{\rho_B * A_B^2}{2\pi} * \frac{\tau_B^2}{1 + \tau_B^2 * \omega_R^2}$$

A useful approximation can be made by noting that the contribution from the breakup of bit teeth should be small in this part of the spectrum compared to the contribution due to rock breakup.

Far above resonance, that is, when w>>wR, and including the bit contribution $$PSD[\omega]_{\omega \gg \omega_r} = \frac{\rho_R * A_R^2}{2\pi} * \frac{(\tau_R + \upsilon_R)^2}{\upsilon_R^2\tau_R^2\omega^4} + \frac{\rho_B * A_B^2}{2\pi} * \frac{1}{\omega^2}$$

If the bit term truly has no oscillation, then it may dominate at very high frequencies, but the relative magnitudes of the amplitudes and probabilities are taken into account. In the low frequency limit, $\omega \ll \omega R$, $$PSD[\omega]_{\omega \ll \omega_R} = \frac{\rho_R * A_R^2}{2\pi} * \frac{\left(v_R^2(1+v_R^2\omega^2) + 2\tau_R v_R(1+v_R^2*\omega_R^2) + \tau_R^2(1+v_R^2*\omega_R^2)^2\right)}{(1+\tau_R^2\omega^2)(1+v_R^2*\omega_R^2)^2} + \frac{\rho_B * A_B^2}{2\pi} * \frac{\tau_B^2}{1+\tau_B^2*\omega^2}$$

At 0 frequency $$PSD[0] = \rho_R \frac{A_R}{2\pi} \frac{v_R^2 + 2\tau_R * v_R * (1+v_R^2\omega_R^2) + \tau_R^2(1+v_R^2\omega_R^2)^2}{(1+v_R^2\omega_R^2)^2} + \frac{\rho_B * A_B^2}{2\pi} * \tau_B^2$$

$$PSD[0] = \rho_R \frac{A_R^2}{2\pi}\left(\frac{v_R^2}{(1+v_R^2\omega_R^2)^2} + \frac{2\tau_R * v_R}{(1+v_R^2\omega_R^2)^2} + \tau_R^2\right) + \frac{\rho_B * A_B^2}{2\pi} * \tau_B^2$$

Examining these limits, it does not appear that there is a clean way of picking out the bit contribution from the frequency behavior, except possibly from the very high frequency behavior. With $\rho B$ small, $\tau B$ is expected to be considerably less than $\tau R$. It may turn out that $A_B > A_R$, and the first two rock terms may be small compared to the third, though this is not known. If that is the case, then $$PSD[0] = \rho_R \frac{A_R^2}{2\pi}\tau_R^2 + \frac{\rho_B * A_B^2}{2\pi} * \tau_B^2$$

If the rock parameters can be well known, the bit parameter can be known from this, but it is anticipated that the errors in the rock parameters and the relative size of the terms will preclude such a determination.

APPENDIX II. ANALYSIS OF THE SPREADING OF SPECTRAL PEAKS FROM ROCK BREAKUP DUE TO THE STATISTICAL DISTRIBUTION OF THE CHARACTERISTIC FREQUENCY OF A BREAKUP

As stated earlier, it is assumed that the breakup of rock occurs at random times. This randomizes the phase of the events. It is further assumed that $\omega_R$ has a normal distribution with mean $\omega_{R0}$ and standard deviation of $\sigma_{\omega R}$. For the purpose of this analysis, the statistical nature of the other parameters is neglected.

Ignoring the overall factor of $\rho_R * A^2/(2\pi)$, and dealing only with the rock component, the squared modulus of the Fourier transform of a rock breakup signature is given by $$S[\omega, \omega_R] = \frac{\left(\begin{array}{c}v_R^2 + v_R^4\omega^2 + 2\tau_R(v_R + v_R^3(\omega^2 + \omega_R^2)) + \\ \tau_R^2(1+v_R^4\omega_R^4 + v_R^2(\omega^2+2\omega_R^2))\end{array}\right)}{(1+\tau_R^2\omega^2)(1+v_R^4(\omega^2-\omega_R^2)^2 + 2v_R^2(\omega^2+\omega_R^2))}$$

The normal distribution of the breakup frequencies $\omega_R$ will be assumed to be distributed around a frequency $\omega_0$ with a standard deviation of $\gamma$ as follows:

$$F[\omega_0, \omega_R] = \frac{1}{\gamma * \sqrt{2\pi}} * e^{-\frac{(\omega_0-\omega_R)^2}{2\gamma^2}}$$

The expected value of the modulus squared of the Fourier transform, that is, the power spectrum, is given by $$P[\omega] = \frac{1}{\gamma * \sqrt{2\pi}} \int_{-\infty}^{\infty} \frac{\left(\begin{array}{c}v_R^2 + v_R^4\omega^2 + 2\tau_R(v_R + v_R^3(\omega^2+\omega_R^2)) + \\ \tau_R^2(1+v_R^4\omega_R^4 + v_R^2(\omega^2+2\omega_R^2))\end{array}\right)}{(1+\tau_R^2\omega^2)(1+v_R^4(\omega^2-\omega_R^2)^2 + 2v_R^2(\omega^2+\omega_R^2))} * e^{-\frac{(\omega_0-\omega_R)^2}{2\gamma^2}} * d\omega_R$$

It doesn't appear possible to evaluate this or any reasonable approximation to it in closed form. Furthermore, numerical integration is hampered by the extremely slow convergence of the integral; though the integral can be evaluated, it takes a considerable amount of processing time.

Figure 32:
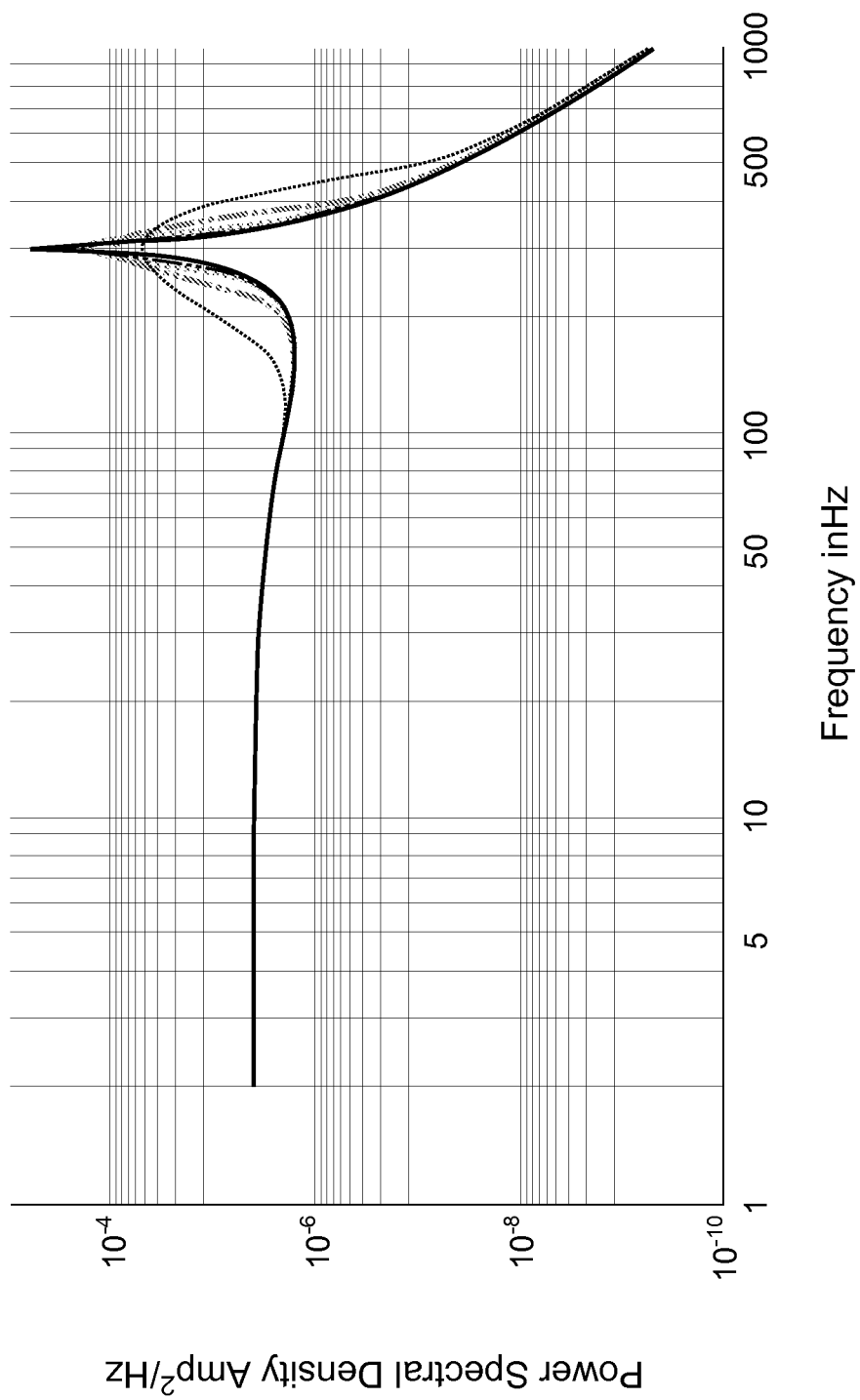
FIG. 32 is a set of example plots of power spectral density for rock breakup with normally distributed characteristic frequencies centered around a characteristic frequency of 300 Hz for different standard deviations, in accordance with various embodiments.

FIG. 32 is a set of plots of PSD for rock breakup with normally distributed characteristic frequencies centered around a characteristic frequency of 300 Hz for different standard deviations. The different standard deviations are 3.125 Hz, 6.25 Hz, 12.5 Hz, 25 Hz and 50 Hz. The sharpest curve is the value obtained with no variation in the characteristic frequency. In all of the curves, $\tau_R = 0.002$ s, $\upsilon_R = 0.05$ s. For comparison, the power spectrum when all of the parameters are essentially constant is shown in FIG. 33 for a range of values of $\upsilon_R$.

Figure 33:
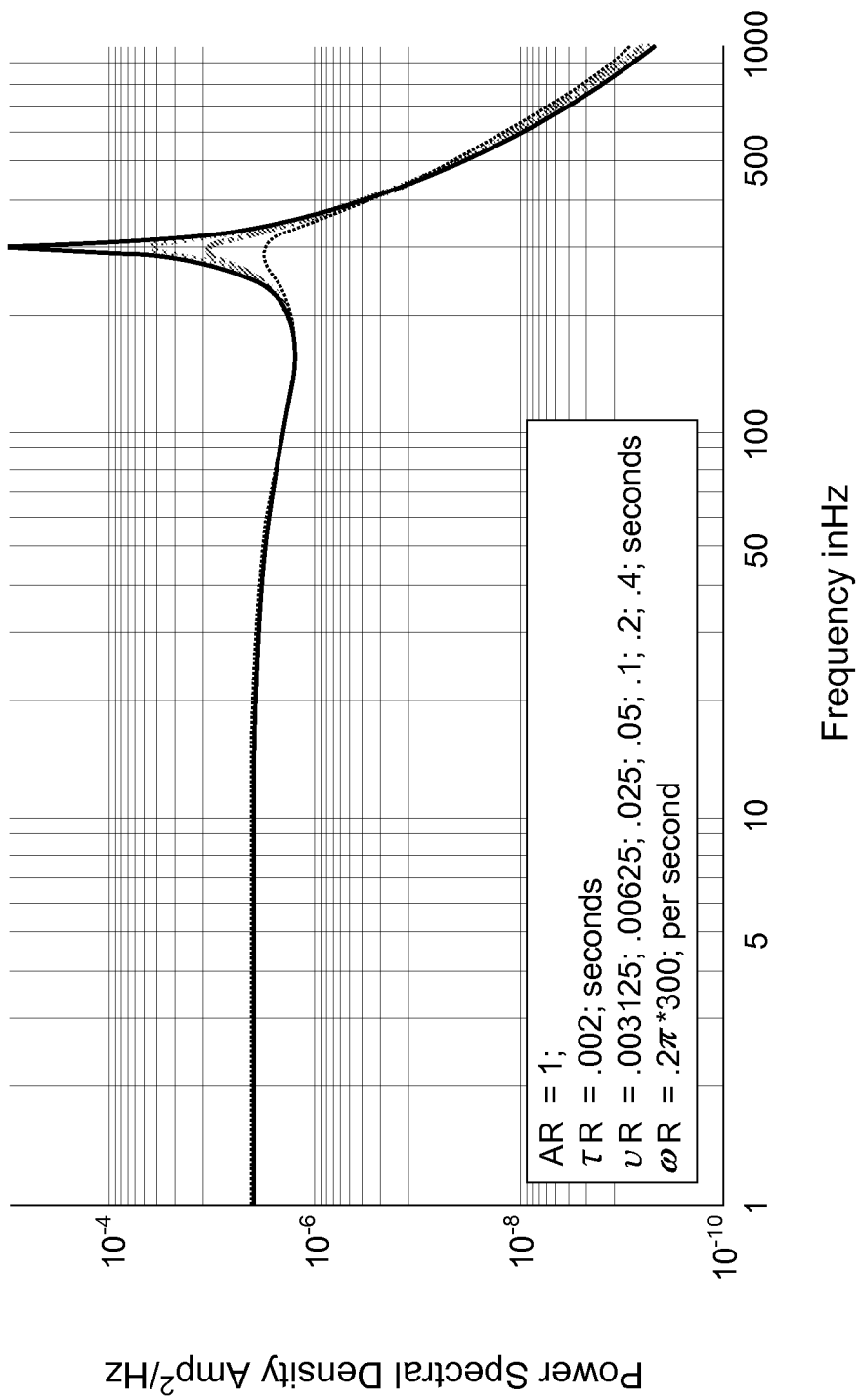
FIG. 33 is a set of example plots of power spectral density for rock breakup with no variance of breakup parameters, for different values of the characteristic decay time, in accordance with various embodiments.

FIG. 33 is a set of plots of PSD for rock breakup with no variance of breakup parameters, for different values of the characteristic decay time, $\upsilon_R$. For large values of $\upsilon_R$, the distributions have a sharp spectral peak. The peak is reduced as $\upsilon_R$ is decreased, but note that all of the spectral peaks remain within the same envelope. By way of comparison, in FIG. 32, the spectral peaks reduce somewhat in amplitude and broaden considerably as the standard deviation of the characteristic frequency increases. For the same range of variation of the parameters, the effect of frequency variation in reducing the height of a spectral peak is significantly less than the effect of variation in the characteristic decay time. Not surprisingly, the broadening of the spectral peaks as a function of standard deviation in the expected characteristic frequency results in curves that are not contained within a single envelope, but broaden beyond the envelope corresponding to a lower standard deviation. The significance of this is as follows: as $\upsilon_R$ decreases, the drilling efficiency decreases and the size of the cuttings decreases. As drilling efficiency becomes progressively less, the spectral peak drops, but stays within its original envelope. On the other hand, a broadening of the spectral peak with little drop in amplitude corresponds to a condition in which the characteristic frequency varies more as rock is destroyed. As noted earlier, an increase in variation of this frequency is an indication of an improvement in drilling efficiency, and vice/versa.

Without carrying out detailed Monte-Carlo type syntheses, when the parameters $\upsilon_R$ and $\gamma$ are random variables, it is only possible to make a few generalizations from these observations. Combining the results involving the variation with $\gamma$ with those in which the PSD is plotted for individual values of $\upsilon_R$ with all other variables constant, it is safe to conclude that a reduction in drilling efficiency is always accompanied by a drop in the amplitude of the resonant peak without a broadening of the peak.

Further analysis is possible via Monte-Carlo types of simulation. FIGS. 34 through 40 were derived using Monte-Carlo simulation. All statistical parameters except for the rock and bit breakup rates were assumed to be normally distributed. The rock and bit breakup rates were assumed to be Poisson distributed. Signals were "sampled" at a rate of 10 KHz for a period of 50 seconds. The individual traces tend to look like noise, although there is enough difference in the final simulation that this is displayed in FIG. 41 as a series of displaced traces. The Walsh power spectral density was used to produce the power spectral densities. In the Fourier transforms, 16,384 points were used, while 8,192 windows were used. This generated a very fine spectral resolution.

Figure 34:
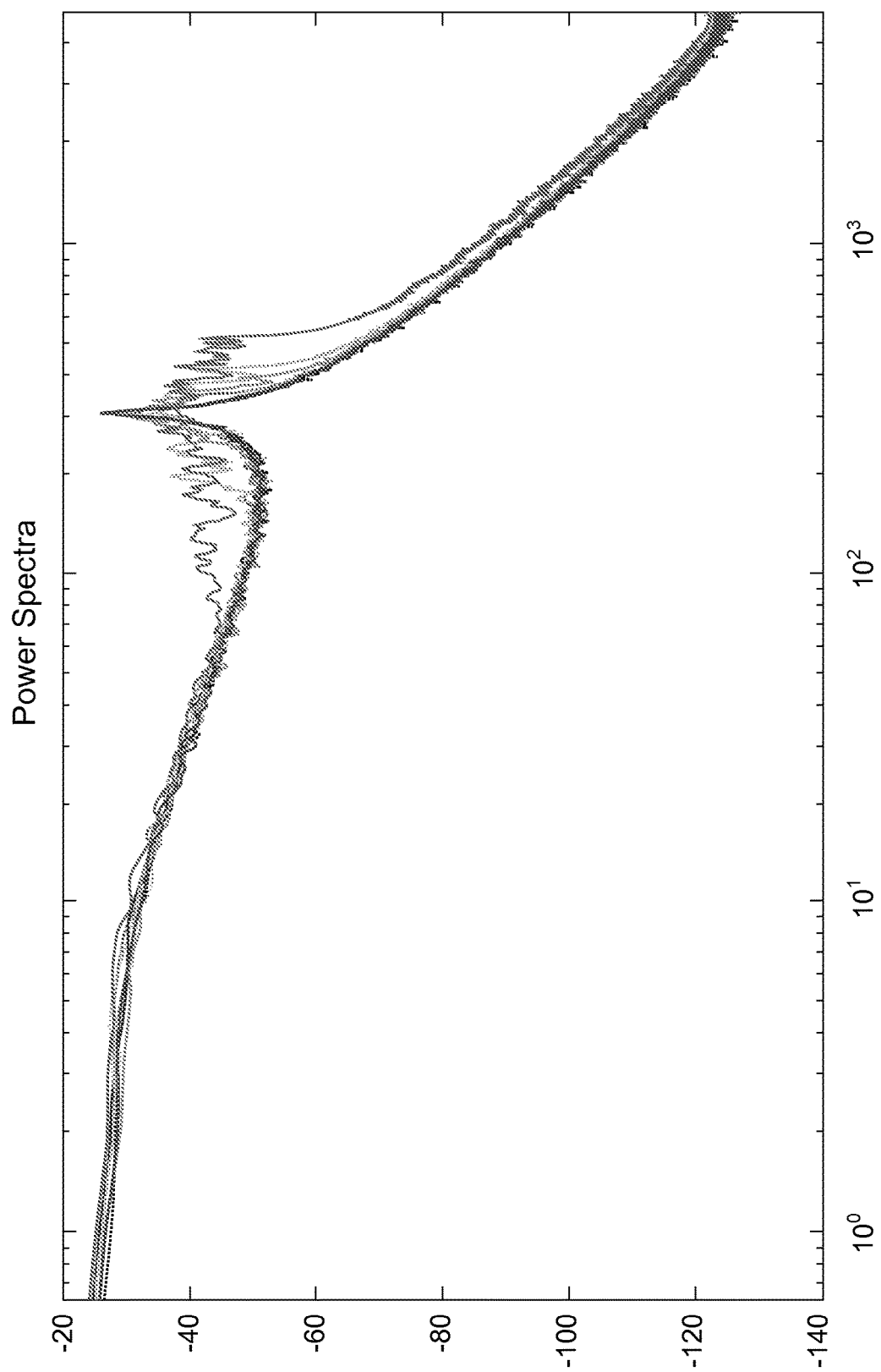
FIG. 34 is a set of example plots from Monte Carlo simulation for rock breakup with a distribution of center frequency spreads, in accordance with various embodiments.

FIG. 34 is a set of plots from Monte Carlo simulation for rock breakup with a distribution of center frequency spreads. The frequencies were normally distributed about with standard deviations in $\omega_R$ that varied in nine steps from $100*\pi/128$ to $200*\pi/\text{second}$. FIG. 34 should be compared against FIG. 32. Both are on log-log scales, but FIG. 34 is in decibel units. In addition, there are amplitude differences due to the nature of the Fourier Transform used. However, it can be seen that the trends identified in FIG. 32 are also evident in FIG. 34. A wider spectral distribution of rock breakup frequencies results in a spread of the peak in the power spectrum, but has little effect on the low or high frequency response.

Figure 35:
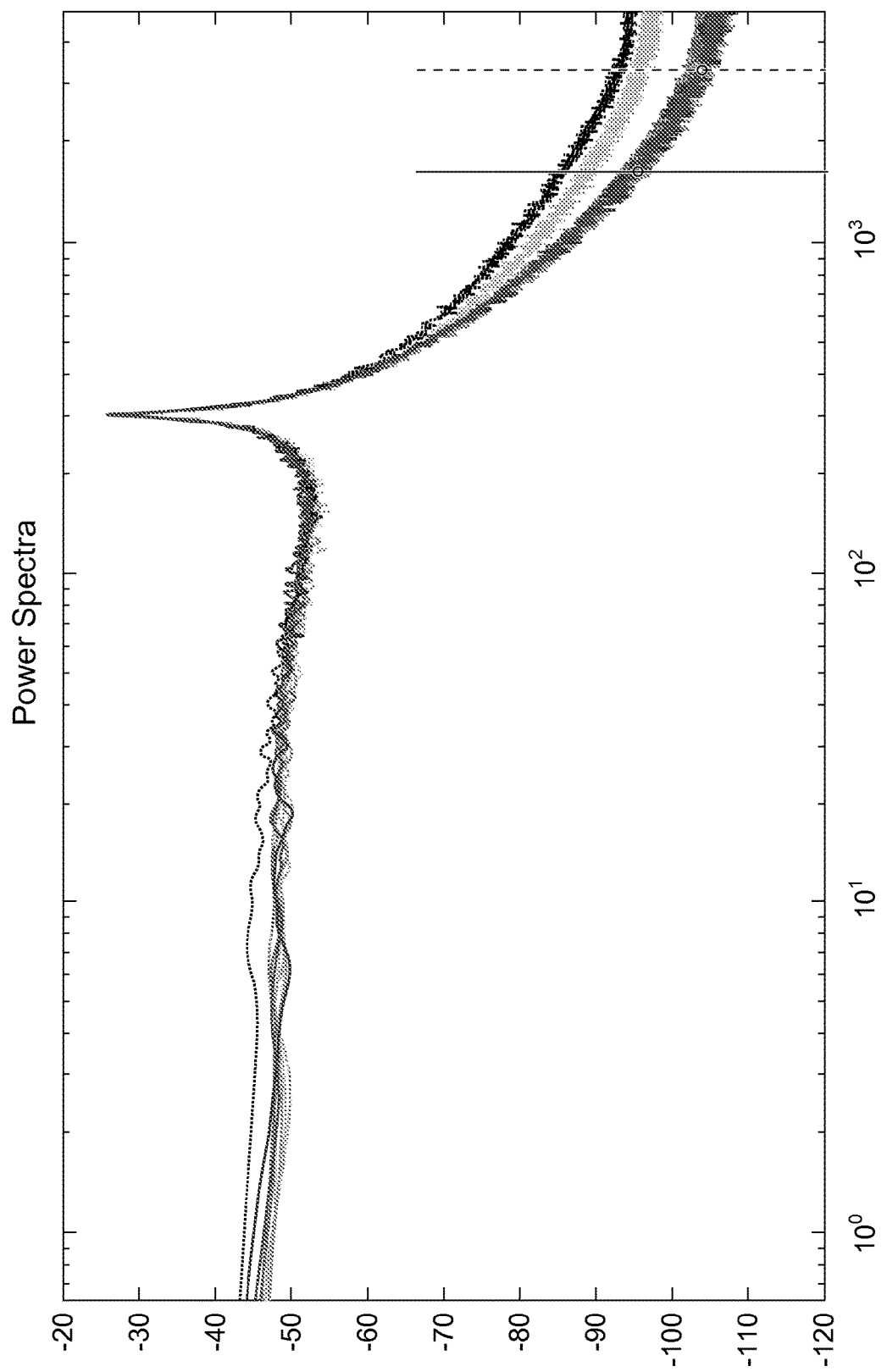
FIG. 35 is a set of example plots from Monte Carlo simulation for rock breakup with a distribution of standard deviations of characteristic times associated with the buildup of stress in the rock, in accordance with various embodiments.

FIG. 35 is a set of plots from Monte Carlo simulation for rock breakup with a distribution of standard deviations, $\sigma_{\tau R}$, of characteristic times associated with the buildup of stress in the rock. FIG. 35 does not correspond to a case that was worked out analytically. In this case, the characteristic buildup time to rock failure was varied over the nine traces. It is not possible to make definitive statements about the effects of this variation. The variation is similar to that observed in FIG. 38, where the nine traces were all simulated using the same parameters.

Figure 36:
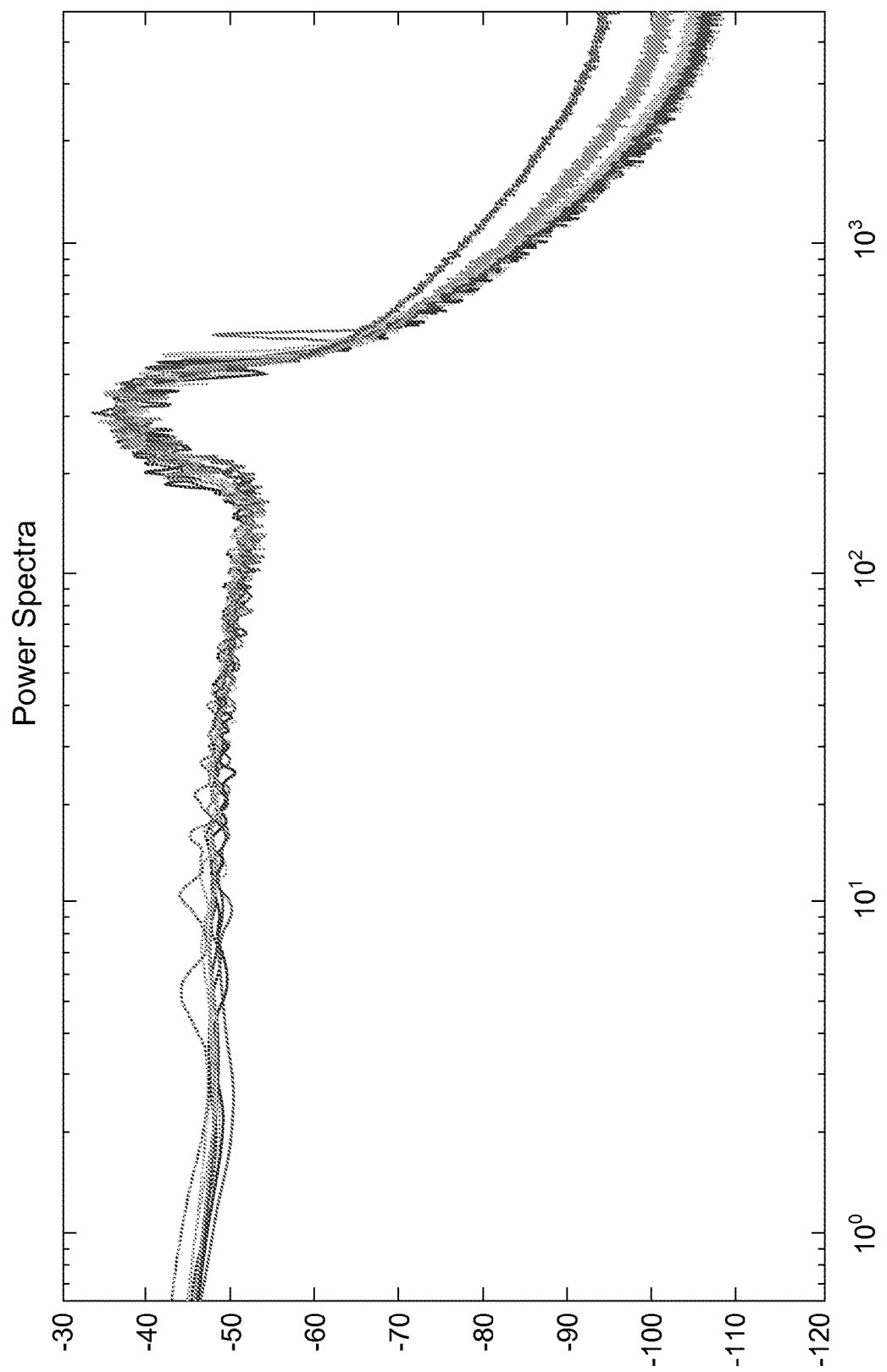
FIG. 36 is a set of example plots from Monte Carlo simulation for rock breakup with a distribution of standard deviations of characteristic times associated with the buildup of stress in the rock, in accordance with various embodiments.

FIG. 36 is a set of plots from Monte Carlo simulation for rock breakup with a distribution of standard deviations, $\sigma_{\tau R}$, of characteristic times associated with the buildup of stress in the rock. FIG. 36 also shows variation in the spectral behavior as a function of various values of the buildup time to rock failure. In this case, a much wider variation of the characteristic frequency was used than in FIG. 35. A very tentative conclusion, especially given the variation in FIG. 28 where all 9 traces were obtained using the same parameters, is that the low and high frequency components are enhanced by an increase in the buildup time to rock failure. This is counter-intuitive for the high frequency behavior.

Figure 37:
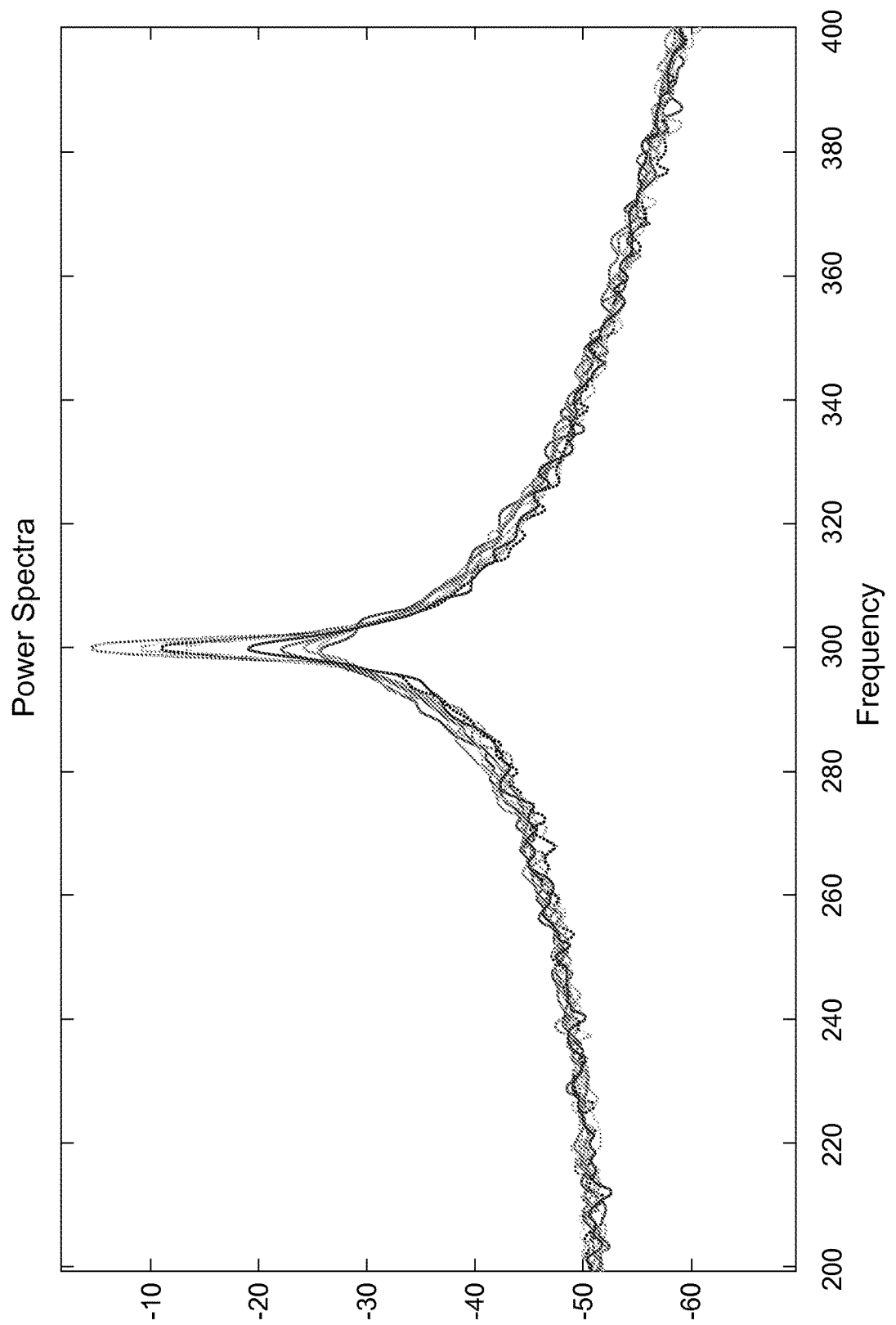
FIG. 37 is a set of example plots from Monte Carlo simulation for rock breakup with a distribution of standard deviations of characteristic times for decay of ringing after rock fracture, in accordance with various embodiments.

FIG. 37 is a set of plots from Monte Carlo simulation for rock breakup with a distribution of standard deviations, $\sigma_{\upsilon R}$, characteristic times for decay of ringing after rock fracture. In FIG. 37, the characteristic decay time is the only variable that is changed from trace to trace. For clarity, this is shown with a linear frequency scale. The behavior is substantively the same as that shown in FIG. 33.

Figure 38:
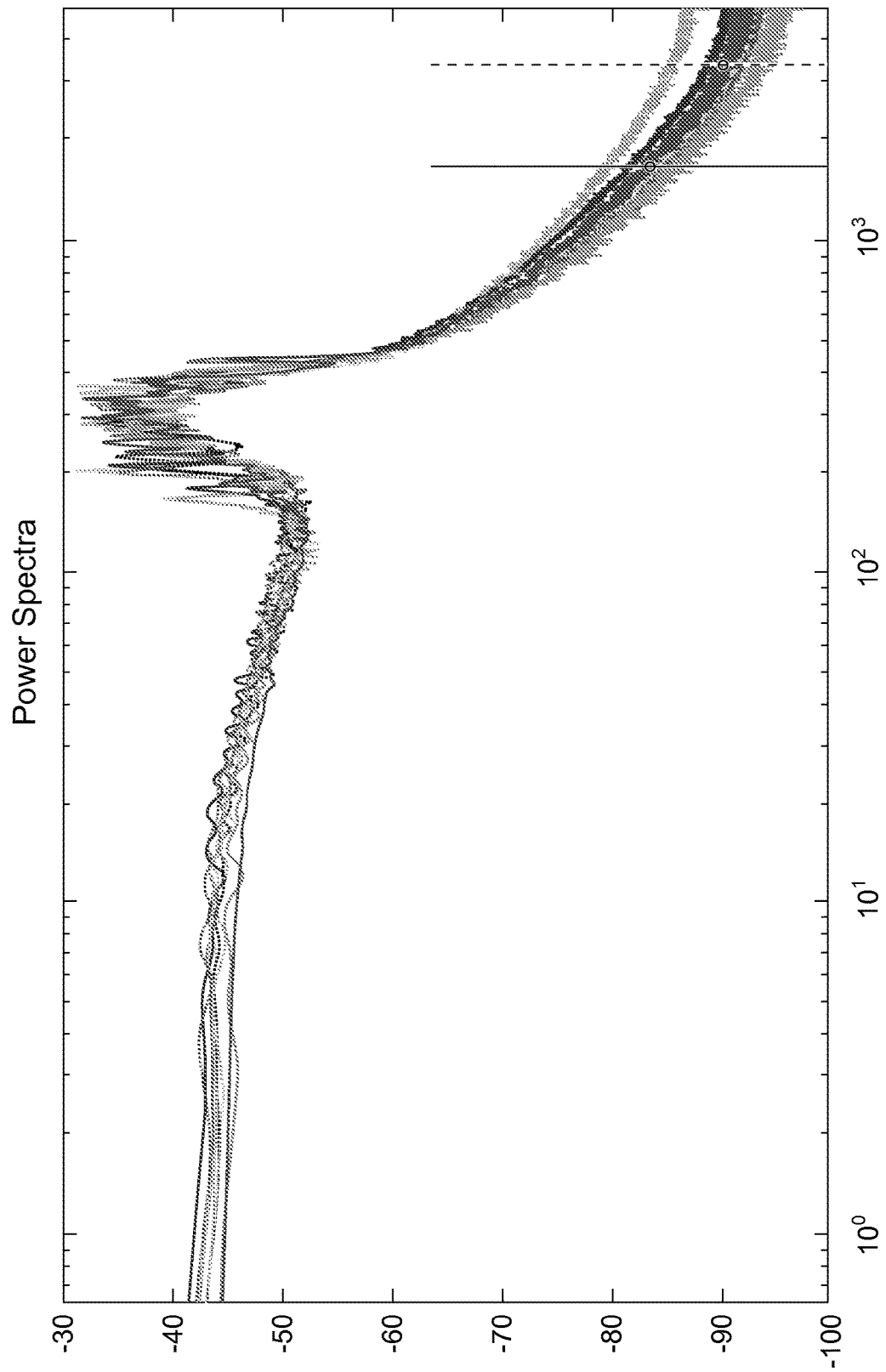
FIG. 38 is a set of example plots from Monte Carlo simulation for rock breakup in which bit breakup is not included in the analysis, in accordance with various embodiments.

FIG. 38 is a set of plots from Monte Carlo simulation for rock breakup in which bit breakup is not included in the analysis. In FIG. 38, all of the parameters pertaining to rock breakup are varied with a fixed set of standard deviations. However, each plot is for the same range of parameters. The spread between the spectra is an indicator of the effect of the overall randomness of the variables. This is to be taken into consideration when analyzing actual (as compared to synthetic) spectra.

Figure 39:
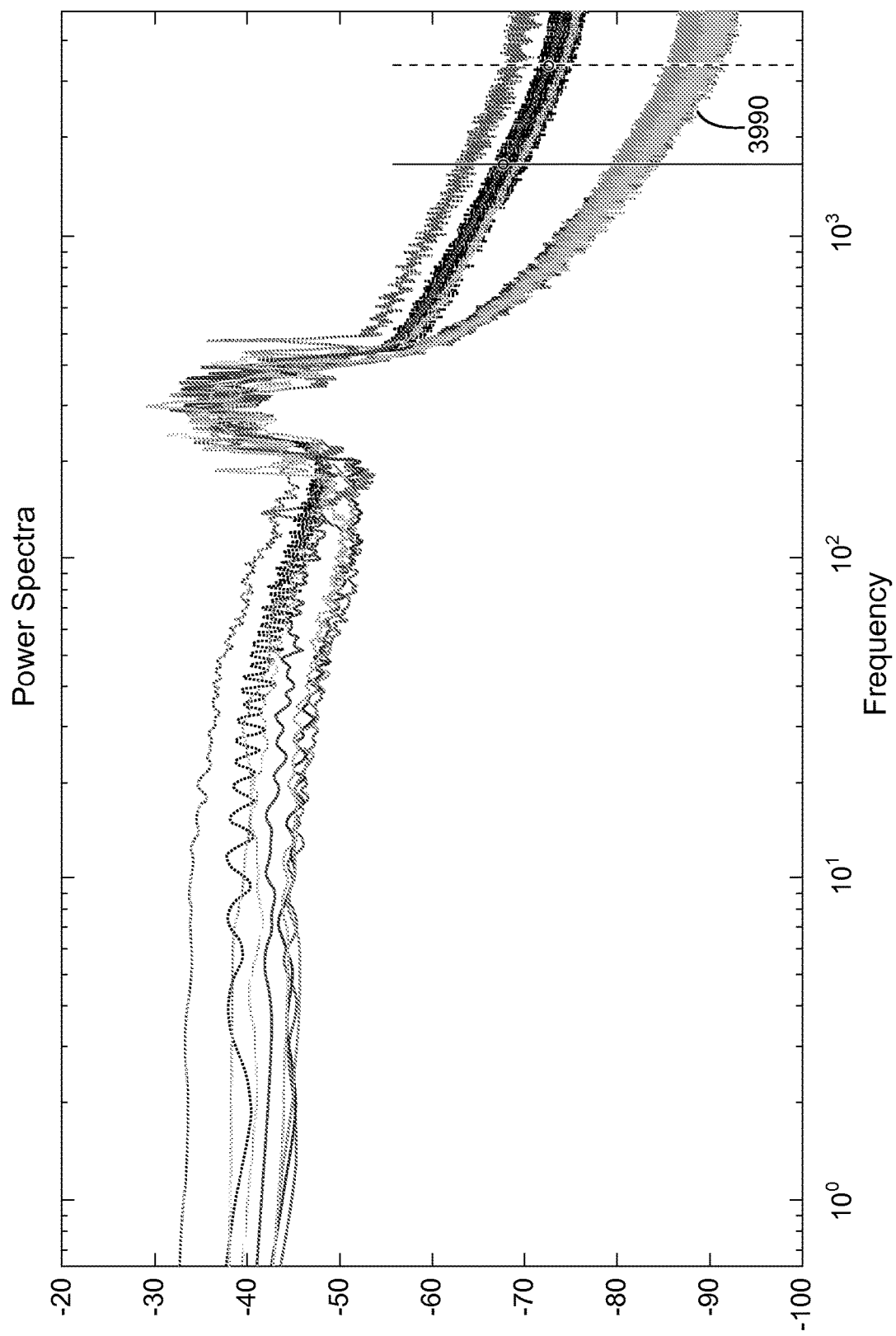
FIG. 39 is a set of example plots from Monte Carlo simulation for rock breakup in which bit breakup is included in the analysis, in accordance with various embodiments.

FIG. 39 is a set of plots from Monte Carlo simulation for rock breakup in which bit breakup is included in the analysis. The rock parameters are the same as in FIG. 38, but the Poisson rate parameters of rock breakup relative to bit breakup are varied from one plot to another. Instead of increasing the overall bit Poisson rate parameter, the ratio between the bit to the rock breakup rate parameter was increased. In the final plot 3990, the bit and rock are breaking up, on average, at the same rate (a catastrophic bit failure). The low frequency response is significantly enhanced as bit breakup increases. The high frequency behavior does not appear to be a systematic function of the bit breakup frequency.

Figure 40:
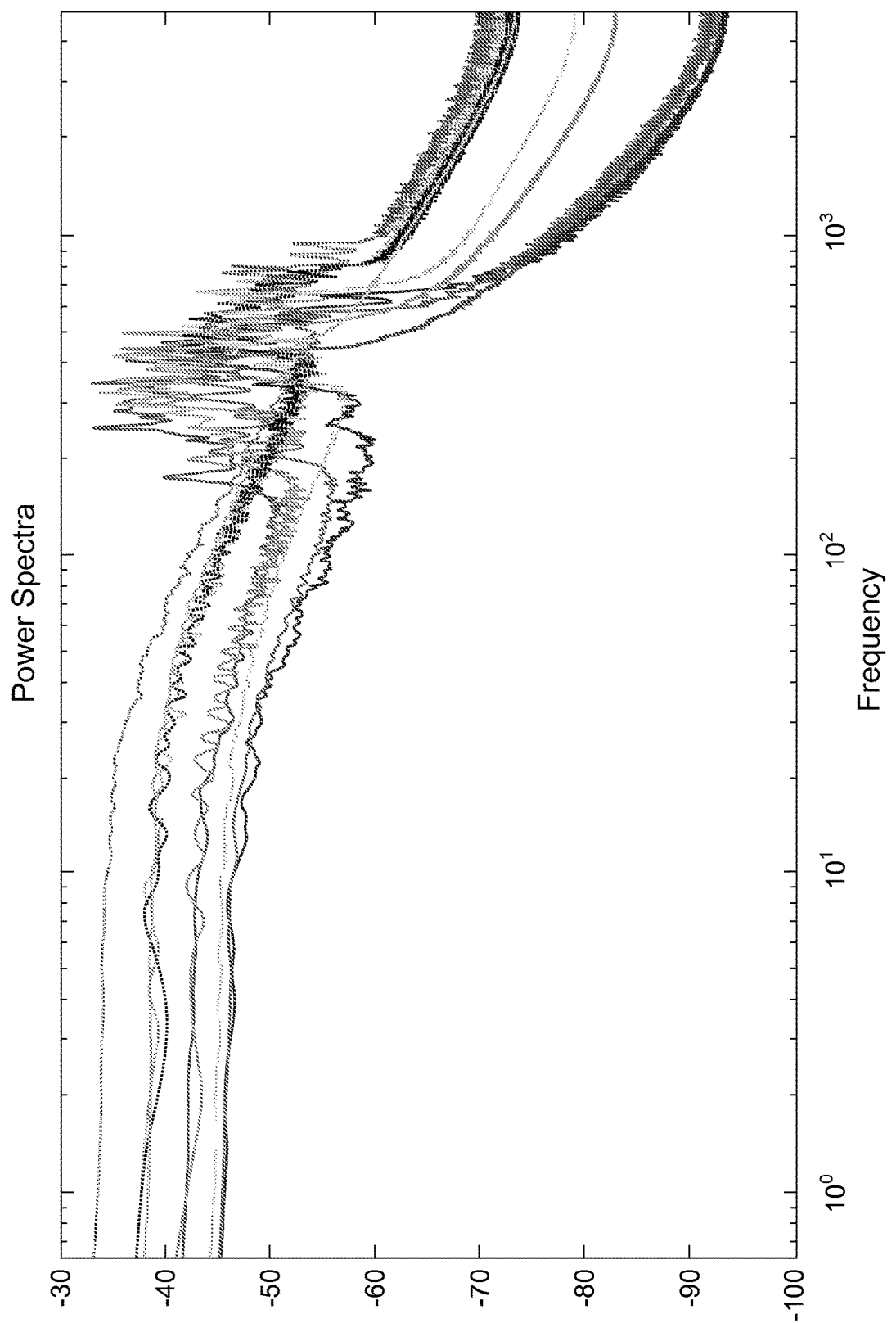
FIG. 40 is a set of example plots from Monte Carlo simulation for rock breakup in which bit breakup is included in the analysis, in accordance with various embodiments.

FIG. 40 is a set of plots from Monte Carlo simulation for rock breakup in which bit breakup is included in the analysis. In FIG. 40, an attempt has been made to track bit performance taking into account variation of the rock/bit interaction as bit performance decreases. Consistent with the literature, it was assumed that the characteristic frequency increases as bit performance degrades, the characteristic decay time decreases as bit performance degrades, and it was assumed that the buildup time to rock failure and bit failure increase as bit performance degrades. The individual traces may be considered to be separated in time by several hours of drilling. The resultant behavior is the blend of behaviors observed earlier and provides no surprises.

Figure 41:
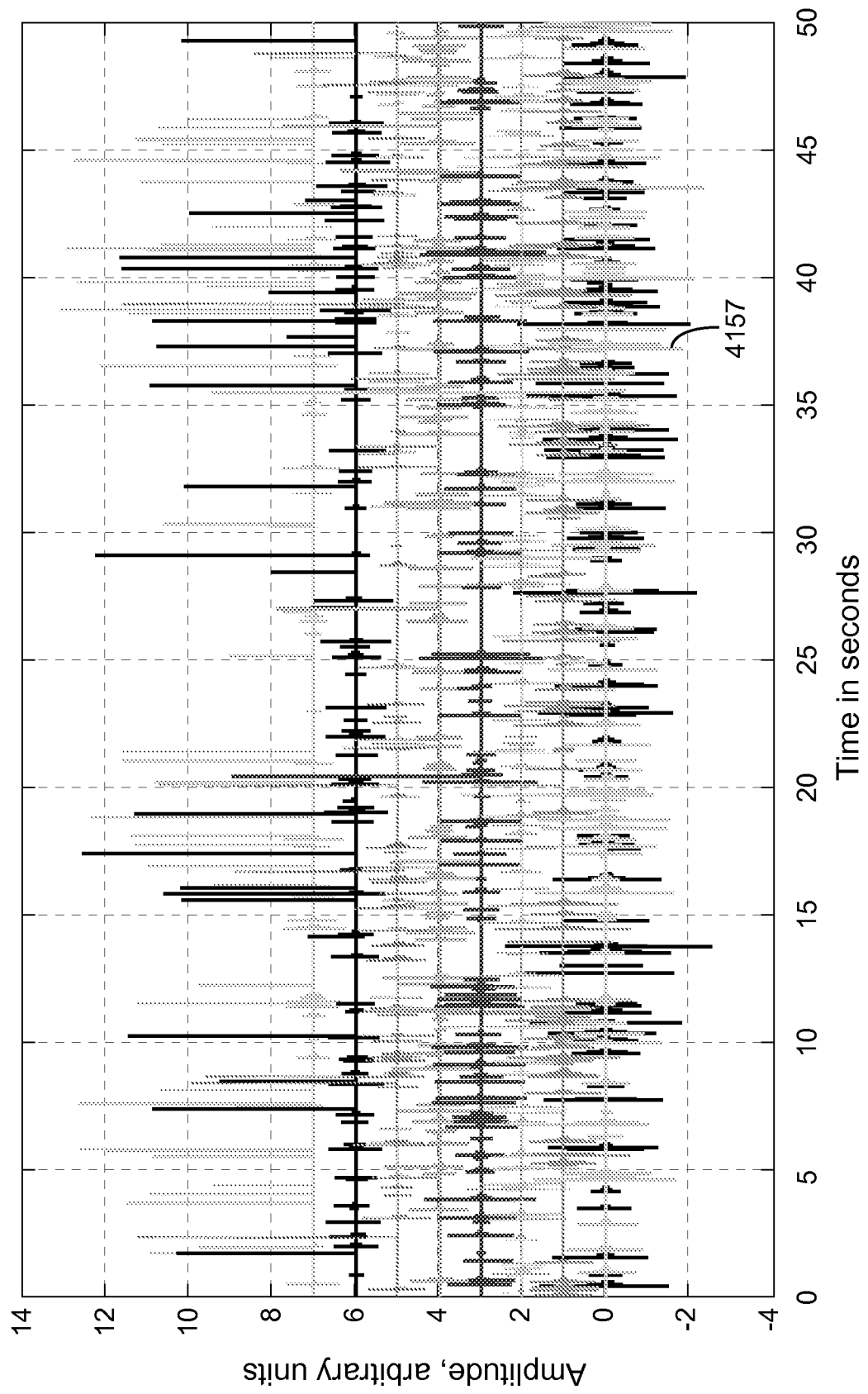
FIG. 41 is a set of example plots of time signatures that were analyzed to produce the power spectra in FIG. 40, in accordance with various embodiments.

FIG. 41 illustrates the time signatures that were analyzed to produce the power spectra in FIG. 40. Sharp exponential peaks with no subsequent oscillations are virtually not present in the first several traces, but increase as the bit continues to fail. The characteristic decay times of the oscillations also clearly decrease. Not as evident is the general trend to longer buildup to rock or bit failure, although detailed examination of the traces also demonstrates this.

The expected values and variances of all parameters will vary with time and lithology as well as drilling efficiency. To break a given mass of rock, a different amount of energy is required as a function of lithology. For a given bit sharpness, this means that the characteristic time $\tau_R$ and its distribution are a function of lithology.

In various embodiments as taught herein, apparatus and method can be structured to provide a measurement of drill bit cutter dullness and measurement of the distribution of the size of formation cuttings as a drill bit advances. This can pertain directly to assessing the efficiency of a drilling operation and can be used to optimize that efficiency.

Figure 42:
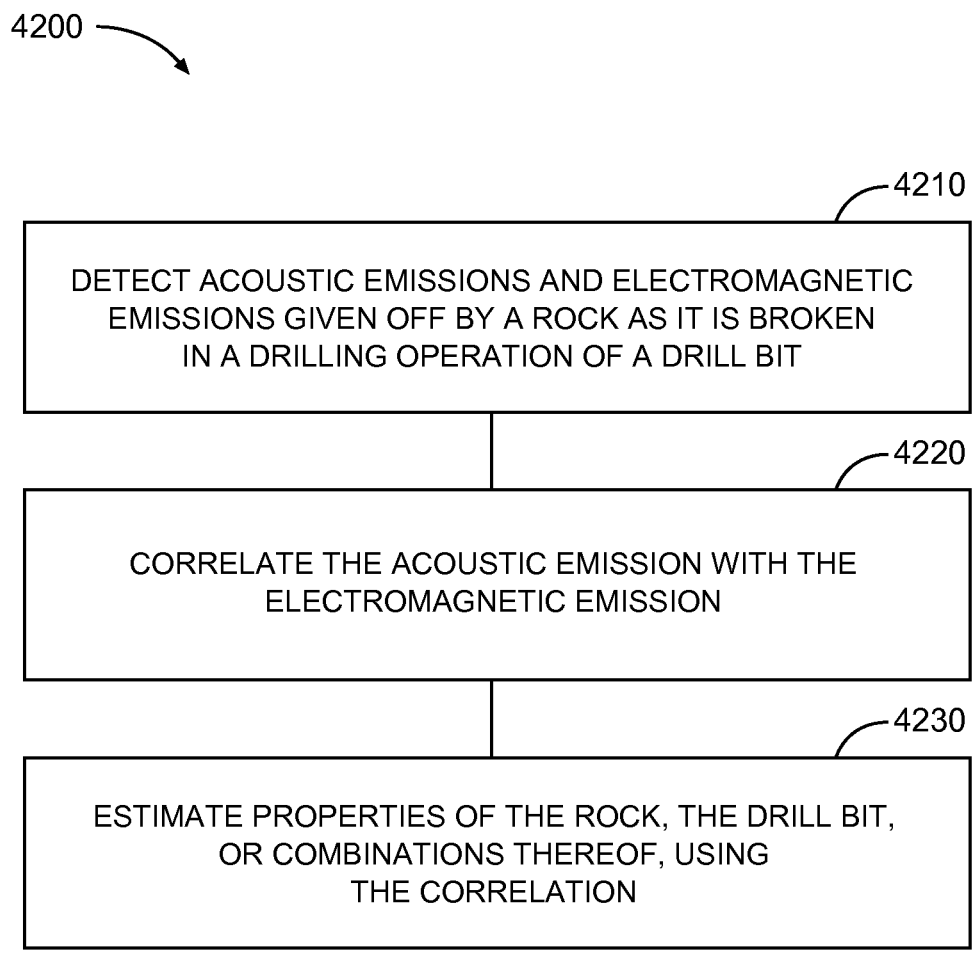
FIG. 42 is a flow diagram of features of an example method using acoustic emissions and electromagnetic emissions given off by a rock as it is broken in a drilling operation of a drill bit, in accordance with various embodiments.

FIG. 42 is a flow diagram of features of an embodiment of example method 4200 using acoustic emissions and electromagnetic emissions given off by a rock as it is broken in a drilling operation of a drill bit. At 4210, acoustic emission and electromagnetic emission given off by a rock as it is broken in a drilling operation of a drill bit is detected. At 4220, the acoustic emission is correlated with the electromagnetic emission.

At 4230, properties of the rock, the drill bit, or combinations thereof are estimated using the correlation. The estimated properties can include, but are not limited to, rock chip size or drill bit dullness or drilling efficiency or a combination selected from rock chip size, drill bit dullness, and drilling efficiency. The correlating, the estimating, or the correlating and the estimating may employ statistical frequency domain analysis, statistical time domain analysis, or both statistical frequency domain analysis and statistical time domain analysis. The drilling efficiency may be estimated and the estimated drilling efficiency may be used with a controller to control drilling operations relative to an optimization of the drilling efficiency.

The method 4200 or a similar method may include acquiring drilling efficiency data downhole in a drilling operation, and incorporating the drilling efficiency data into a database and a control model while drilling. The method 4200 or a similar method may include determining brittleness of the rock by correlating the electromagnetic emission to brittleness.

The method 4200 or a similar method may include detecting acoustic emission and electromagnetic emission by monitoring the acoustic and electromagnetic emissions via sensors mounted in a drill bit, on the drill bit, near the drill bit, or a combination thereof. Such methods may include determining drill bit dullness based on, via the sensors, simultaneous use of acoustic and electromagnetic signatures or power spectra of the acoustic and electromagnetic signatures, or cross-power spectra of the acoustic and electromagnetic signatures, or a combination thereof. Such methods may include using, via the sensors, variation in a signature derived from correlating the acoustic emission with the electromagnetic emission as an indication of bit wear and drilling efficiency. Such methods may include providing an indication of bit wear and drilling efficiency by using, via the sensors, power spectral density of an acoustic signature, power spectral density of an electromagnetic signature, or cross-power spectral density between the acoustic and electromagnetic signatures. Such methods may include identifying a distribution of drill bit cuttings sizes that are generated as the rock is broken by monitoring, via the sensors, shifts in acoustic spectra and electromagnetic spectra to higher frequencies and losses in signal amplitude. Such methods may include generating a lithology indicator based on a difference between spectral components from a piezoelectric effect and a seismoelectric effect. Such methods may include identifying acoustic and electromagnetic emissions that are a signature of fracture of drill bit teeth.

The method 4200 or a similar method may detect acoustic emission and electromagnetic emission by monitoring the acoustic and electromagnetic emissions via sensors mounted in a drill bit, on the drill bit, near the drill bit, or a combination thereof, communicating, to a controller, data gained via detection of acoustic and electromagnetic signatures and via their correlation; and modifying weight on bit or torque on bit, or a schedule of sending forces/bend angles to a rotary steerable system in response to measured parameters, or a combination thereof to attain a condition of optimal drilling efficiency, the modifying conducted via the controller operating on the data.

The method 4200 or a similar method may include simultaneously using the detected acoustic emission and the detected electromagnetic emission to identify a component of acoustic noise and/or a component of electromagnetic noise. The component of acoustic noise may be identified from acoustic noise sources including bit contact with a formation via hitting a side of a borehole, bit bounce, drillstring contact with the borehole, and cuttings impacting a bottomhole assembly of the drillstring. The component of electromagnetic noise may be identified from electromagnetic noise sources including streaming potential from drill bit nozzles and induced signals via drillstring rotation in the earth's magnetic field.

The method 4200 or a similar method may include calculating an acoustic power spectrum from windowed samples of the acoustic emissions; calculating an electromagnetic power spectrum from windowed samples of the electromagnetic emissions; calculating cross-power spectrum from windowed samples of the acoustic emissions and the electromagnetic emissions; estimating spectral parameters based on the acoustic power spectrum, the electromagnetic power spectrum, and the cross-power spectrum; providing selected ones of the spectral parameters to a hunt module; and generating settings of weight on bit, rotary speed, and flow rate through the drill bit by operating the hunt module based on the selected ones of the spectral parameters. Such methods may include dynamically modifying settings of weight on bit (WOB), rotary speed (RS), and flow rate through the drill bit (Q) downhole to control drilling efficiency in real time relative to an optimization of the drilling efficiency. Operating the hunt module includes conducting a gradient search, using a cost function, to determine direction in (WOB, RS, Q) space in which rate of increase of the drilling efficiency is a maximum. Features of any of the various processing techniques as taught herein, or other combinations of features may be combined into a method according to the teachings herein.

In various embodiments, a machine-readable storage device can comprise instructions stored thereon, which, when performed by a machine, cause the machine to perform operations, the operations comprising one or more features similar to or identical to features of methods and techniques described herein. The physical structures of such instructions may be operated on by one or more processors. Executing these physical structures can cause the machine to perform operations to: detect acoustic emissions and electromagnetic emissions given off by a rock as it is broken in a drilling operation of a drill bit; correlate the acoustic emission with the electromagnetic emission; and estimate properties of the rock, the drill bit, or combinations thereof, using the correlation. The properties may include, but are not limited to, rock chip size or drill bit dullness or drilling efficiency or a combination selected from rock chip size, drill bit dullness, and drilling efficiency. The instructions may include instructions controlling the drilling operation.

The operations can include operations to: calculate an acoustic power spectrum from the acoustic emissions, an electromagnetic power spectrum from the electromagnetic emissions, and a cross-power spectrum from the acoustic emissions and the electromagnetic emissions; estimate spectral parameters based on the acoustic power spectrum, the electromagnetic power spectrum, and the cross-power spectrum; and dynamically modify, based on the spectral parameters, settings of weight on bit (WOB), rotary speed (RS), and flow rate through the drill bit (Q) and determine direction in (WOB, RS, Q) space in which rate of increase of the drilling efficiency is a maximum.

Further, a machine-readable storage device, herein, is a physical device that stores data represented by physical structure within the device. Such a physical device is a non-transitory device. Examples of machine-readable storage devices can include, but are not limited to, read only memory (ROM), random access memory (RAM), a magnetic disk storage device, an optical storage device, a flash memory, and other electronic, magnetic, and/or optical memory devices.

Figure 43:
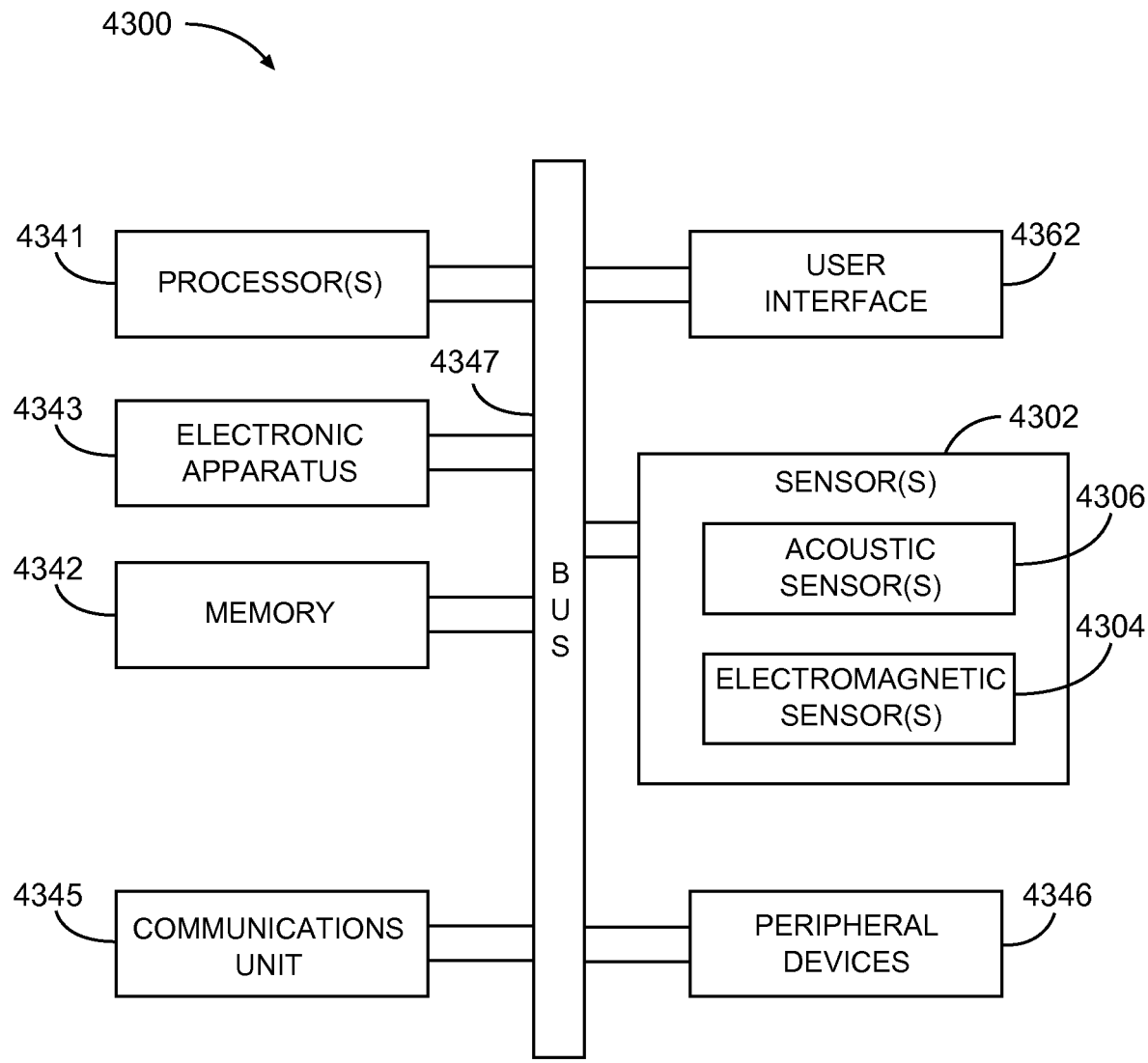
FIG. 43 is a block diagram of features of an example system operable to control operation of acoustic and electromagnetic sensors at or near a drill bit in a drilling activity, to conduct measurements in a borehole, to implement a processing scheme to correlate acoustic emission with electromagnetic emission detected by the acoustic and electromagnetic sensors, and to estimate one or more of rock chip size, drill bit dullness, or drilling efficiency, and/or determinate or identify formation brittleness, in accordance with various embodiments.

FIG. 43 is a block diagram of an embodiment of an example system 4300 that can be implemented at a drilling site to operate with enhanced drilling efficiency through the use of acoustic emissions and electromagnetic emissions from a drilling operation of a drill bit. The components of system 4300 may be distributed throughout the drilling site such as on the surface and downhole. System 4300 may be arranged similar to or identical to systems associated with FIGS. 23-31. The system 4300 can be arranged to perform various operation on acoustic data and electromagnetic data, in a manner similar or identical to any of the processing techniques discussed herein. The system 4300 can include sensors 4302, a processor 4341, and a memory 4342 operatively coupled with the processor 4341. The sensors 4302 can include acoustic sensors 4306 and electromagnetic sensors 4304 and can be configured to detect acoustic emission and electromagnetic emission given off by a rock as it is broken in a drilling operation of a drill bit. The processor 4341 operatively coupled with the memory 4342 can be arranged to correlate the acoustic emission with the electromagnetic emission acquired by the sensors 4302 and to estimate rock chip size, drill bit dullness, drilling efficiency, or a combination of rock chip size, drill bit dullness, and drilling efficiency from the correlation.

The system 4300 may also include an electronic apparatus 4343 and a communications unit 4345. The communications unit 4345 can include combinations of different communication technologies, which may include wired communication technologies and wireless technologies.

The processor 4341, the memory 4342, and the communications unit 4345 can be arranged to operate as a processing unit to control the drilling operation. In various embodiments, the processor 4341 can be realized as a processor or a group of processors that may operate independently depending on an assigned function. The processor 4341 can be structured on a drillstring and can be structured to acquire drilling efficiency data downhole in the drilling operation. Memory 4342 may be realized as one or more databases.

The processor 4341 and the memory 4342 can be arranged to correlate sensed electromagnetic emission to brittleness and to determine brittleness of the rock. The processor 4341 or the processor 4341 and the memory 4342 can include an efficiency calculation module and a hunt module to dynamically modify, based on spectral parameters, settings of weight on bit (WOB), rotary speed (RS), and flow rate through the drill bit (Q) and to determine direction in (WOB, RS, Q) space in which rate of increase of the drilling efficiency is a maximum. The efficiency calculation module and the hunt module can be structured to calculate an acoustic power spectrum from the acoustic emissions, an electromagnetic power spectrum from the electromagnetic emissions, and a cross-power spectrum from the acoustic emissions and the electromagnetic emissions, and to estimate the spectral parameters based on the acoustic power spectrum, the electromagnetic power spectrum, and the cross-power spectrum.

The sensors 4302 can include sensors mounted in the drill bit of the drilling operation, on the drill bit, near the drill bit, or a combination thereof. The processor 4341 and the memory 4342 can be arranged to generate acoustic and electromagnetic signatures or power spectra of the acoustic and electromagnetic signatures, or cross-power spectra of the acoustic and electromagnetic signatures, or a combination thereof, via emissions received at the drill bit, on the drill bit, near the drill bit, or a combination thereof. The processor 4341 and memory 4342 are arranged to determine variation in a signature derived from correlating the acoustic emission with the electromagnetic emission as an indication of bit wear and drilling efficiency, the emissions received at the drill bit, on the drill bit, near the drill bit, or a combination thereof.

The system 4300 can include a bus 4347, where the bus 4347 provides electrical conductivity among the components of the system 4300. The bus 4347 can include an address bus, a data bus, and a control bus, each independently configured. The bus 4347 can be realized using a number of different communication mediums that allows for the distribution of components of the system 4300. The bus 4347 can include instrumentality for network communication. The use of bus 4347 can be regulated by the processor 4341.

The system 4300 may also include peripheral devices 4346. The peripheral devices 4346 can include displays, additional storage memory, or other control devices that may operate in conjunction with the processor 4341 or the memory 4342. The peripheral devices 4346 can be arranged with a display, as a distributed component, that can be used with instructions stored in the memory 4342 to implement a user interface 4362 to manage the operation of the system 4300 according to its implementation in the system architecture. Such a user interface 4362 can be operated in conjunction with the communications unit 4345 and the bus 4347.

The peripheral devices 4346 may include a controller, where the controller can be arranged to direct drilling operation relative to an optimization of drilling efficiency based on drilling efficiency data estimated from the processor 4341. The controller can be arranged to receive data gained via detection of acoustic and electromagnetic signatures and via their correlation and to operate on the data to modify weight on bit, or torque on bit, or a schedule of sending forces/bend angles to a rotary steerable system in response to measured parameters.

A system 1 can comprise: sensors arranged to detect acoustic emission and electromagnetic emission given off by a rock as it is broken in a drilling operation; a processor; and a memory operatively coupled with the processor, the processor and memory arranged to correlate the acoustic emission with the electromagnetic emission acquired by the sensors and to estimate properties of the rock, the drill bit, or combinations thereof. The properties can include, but are not limited to, rock chip size, drill bit dullness, drilling efficiency, or a combination of rock chip size, drill bit dullness, and drilling efficiency from the correlation.

A system 2 can include the structure of system 1 and can include a controller arranged to direct drilling operation relative to an optimization of drilling efficiency based on drilling efficiency data estimated from the processor.

A system 3 can include the structure of any of systems 1-2 and can include the processor structured on a drillstring and is structured to acquire drilling efficiency data downhole in the drilling operation.

A system 4 can include the structure of any of systems 1-3 and can include the processor and memory arranged to correlate the electromagnetic emission to brittleness and to determine brittleness of the rock.

A system 5 can include the structure of any of systems 1-4 and can include the sensors mounted in a drill bit, on the drill bit, near the drill bit, or a combination thereof.

A system 6 can include the structure of any of systems 1-5 and can include the processor and memory arranged to generate acoustic and electromagnetic signatures or power spectra of the acoustic and electromagnetic signatures, or cross-power spectra of the acoustic and electromagnetic signatures, or a combination thereof.

A system 7 can include the structure of any of systems 1-6 and can include the processor and memory arranged to determine variation in a signature derived from correlating the acoustic emission with the electromagnetic emission as an indication of bit wear and drilling efficiency.

A system 8 can include the structure of any of systems 1-7 and can include a controller arranged to receive data gained via detection of acoustic and electromagnetic signatures and via their correlation and to operate on the data to modify weight on bit, or torque on bit, or a schedule of sending forces/bend angles to a rotary steerable system in response to measured parameters.

A system 9 can include the structure of any of systems 1-8 and can include the processor structured to include an efficiency calculation module and a hunt module to dynamically modify, based on spectral parameters, settings of weight on bit (WOB), rotary speed (RS), and flow rate through the drill bit (Q) and to determine direction in (WOB, RS, Q) space in which rate of increase of the drilling efficiency is a maximum, the efficiency calculation module and the hunt module structured to calculate an acoustic power spectrum from the acoustic emissions, an electromagnetic power spectrum from the electromagnetic emissions, and a cross-power spectrum from the acoustic emissions and the electromagnetic emissions, and to estimate the spectral parameters based on the acoustic power spectrum, the electromagnetic power spectrum, and the cross-power spectrum.

A method 1 can comprise: detecting acoustic emission and electromagnetic emission given off by a rock as it is broken in a drilling operation of a drill bit; correlating the acoustic emission with the electromagnetic emission; and estimating, using the correlation, properties of the rock, the drill bit, or combinations thereof. The properties can include, but are not limited to, rock chip size or drill bit dullness or drilling efficiency or a combination selected from rock chip size, drill bit dullness, and drilling efficiency.

A method 2 can include the elements of method 1 and can include the correlating, the estimating, or the correlating and the estimating employs statistical frequency domain analysis, statistical time domain analysis, or both statistical frequency domain analysis and statistical time domain analysis A method 3 can include the elements of any of methods 1-2 and can include the drilling efficiency being estimated and the estimated drilling efficiency being used with a controller to control drilling operations relative to an optimization of the drilling efficiency.

A method 4 can include the elements of any of methods 1-3 and can include acquiring drilling efficiency data downhole in a drilling operation, and incorporating the drilling efficiency data into a database and a control model while drilling.

A method 5 can include the elements of any of methods 1-4 and can include determining brittleness of the rock by correlating the electromagnetic emission to brittleness.

A method 6 can include the elements of any of methods 1-5 and can include detecting acoustic emission and electromagnetic emission to include monitoring the acoustic and electromagnetic emissions via sensors mounted in a drill bit, on the drill bit, near the drill bit, or a combination thereof.

A method 7 can include the elements of any of methods 1-6 and can include determining drill bit dullness based on, via the sensors, simultaneous use of acoustic and electromagnetic signatures or power spectra of the acoustic and electromagnetic signatures, or cross-power spectra of the acoustic and electromagnetic signatures, or a combination thereof.

A method 8 can include the elements of any of methods 1-7 and can include using, via the sensors, variation in a signature derived from correlating the acoustic emission with the electromagnetic emission as an indication of bit wear and drilling efficiency.

A method 9 can include the elements of any of methods 1-8 and can include providing an indication of bit wear and drilling efficiency by using, via the sensors, power spectral density of an acoustic signature, power spectral density of an electromagnetic signature, or cross-power spectral density between the acoustic and electromagnetic signatures.

A method 10 can include the elements of any of methods 1-9 and can include identifying a distribution of drill bit cuttings sizes that are generated as the rock is broken by monitoring, via the sensors, shifts in acoustic spectra and electromagnetic spectra to higher frequencies and losses in signal amplitude.

A method 11 can include the elements of any of methods 1-10 and can include generating a lithology indicator based on a difference between spectral components from a piezoelectric effect and a seismoelectric effect.

A method 12 can include the elements of any of methods 1-11 and can include the monitoring to include identifying acoustic and electromagnetic emissions that are a signature of fracture of drill bit teeth.

A method 13 can include the elements of any of methods 1-12 and can include communicating, to a controller, data gained via detection of acoustic and electromagnetic signatures and via their correlation; and modifying weight on bit or torque on bit, or a schedule of sending forces/bend angles to a rotary steerable system in response to measured parameters, or a combination thereof to attain a condition of optimal drilling efficiency, the modifying conducted via the controller operating on the data.

A method 14 can include the elements of any of methods 1-13 and can include simultaneously using the detected acoustic emission and the detected electromagnetic emission to identify a component of acoustic noise and/or a component of electromagnetic noise and discriminating against the component of acoustic noise and/or a component of electromagnetic noise.

A method 15 can include the elements of any of methods 1-15 and can include a component of acoustic noise being identified from acoustic noise sources including bit contact with a formation via hitting a side of a borehole, bit bounce, drillstring contact with the borehole, and cuttings impacting a bottomhole assembly of the drillstring.

A method 16 can include the elements of any of methods 1-15 and can include a component of electromagnetic noise identified from electromagnetic noise sources including streaming potential from drill bit nozzles and induced signals via drillstring rotation in the earth's magnetic field.

A method 17 can include the elements of any of methods 1-16 and can include calculating an acoustic power spectrum from windowed samples of the acoustic emissions; calculating an electromagnetic power spectrum from windowed samples of the electromagnetic emissions; calculating cross-power spectrum from windowed samples of the acoustic emissions and the electromagnetic emissions; estimating spectral parameters based on the acoustic power spectrum, the electromagnetic power spectrum, and the cross-power spectrum; providing selected ones of the spectral parameters to a hunt module; and generating settings of weight on bit, rotary speed, and flow rate through the drill bit by operating the hunt module based on the selected ones of the spectral parameters.

A method 18 can include the elements of any of methods 1-17 and can include dynamically modifying settings of weight on bit (WOB), rotary speed (RS), and flow rate through the drill bit (Q) downhole to control drilling efficiency in real time relative to an optimization of the drilling efficiency.

A method 19 can include the elements of any of methods 1-18 and can include operating a hunt module to include conducting a gradient search, using a cost function, to determine direction in (WOB, RS, Q) space in which rate of increase of the drilling efficiency is a maximum.

A machine-readable storage device 1 having instructions stored thereon, which, when performed by a machine, cause the machine to perform operations, the operations comprising: detecting acoustic emission and electromagnetic emission given off by a rock as it is broken in a drilling operation of a drill bit; correlating the acoustic emission with the electromagnetic emission; and estimating, using the correlation, properties of the rock, the drill bit, or combinations thereof. The properties including, but not limited to, rock chip size or drill bit dullness or drilling efficiency or a combination selected from rock chip size, drill bit dullness, and drilling efficiency.

A machine-readable storage device 2 can include the structure of machine-readable storage device 1 and can include operations comprising: calculating an acoustic power spectrum from the acoustic emissions, an electromagnetic power spectrum from the electromagnetic emissions, and a cross-power spectrum from the acoustic emissions and the electromagnetic emissions; estimating spectral parameters based on the acoustic power spectrum, the electromagnetic power spectrum, and the cross-power spectrum; and dynamically modifying, based on the spectral parameters, settings of weight on bit (WOB), rotary speed (RS), and flow rate through the drill bit (Q) and determining direction in (WOB, RS, Q) space in which rate of increase of the drilling efficiency is a maximum.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A system comprising:
    sensors arranged to detect acoustic emission and electromagnetic emission given off by a rock as it is broken in a drilling operation of a drill bit;
    a processor;
    a memory operatively coupled with the processor, the processor and memory arranged to calculate a cross-correlation between the acoustic emission and the electromagnetic emission acquired by the sensors for distinguishing against sources of noise using a threshold value of the cross-correlation and to estimate rock chip size, drill bit dullness, drilling efficiency, or a combination of rock chip size, drill bit dullness, and drilling efficiency from the cross-correlation; and
    a controller operable to direct drilling operation based on the cross-correlation.

2. The system of claim 1, wherein the controller is operable to direct drilling operation relative to an optimization of drilling efficiency based on drilling efficiency data estimated from the processor.

3. The system of claim 1, wherein the processor is structured on a drillstring and is structured to acquire drilling efficiency data downhole in the drilling operation.

4. The system of claim 1, wherein the processor and memory are arranged to calculate a correlation between the electromagnetic emission and brittleness and to determine brittleness of the rock.

5. The system of claim 1, wherein the sensors include sensors mounted in a drill bit, on the drill bit, near the drill bit, or a combination thereof.

6. The system of claim 5, wherein the processor and memory are arranged to generate acoustic and electromagnetic signatures or power spectra of the acoustic and electromagnetic signatures, or cross-power spectra of the acoustic and electromagnetic signatures, or a combination thereof.

7. The system of claim 5, wherein the processor and memory are arranged to determine variation in a signature derived from calculating the cross-correlation between the acoustic emission and the electromagnetic emission as an indication of bit wear and drilling efficiency.

8. The system of claim 1, wherein the controller is arranged to receive data gained via detection of acoustic and electromagnetic signatures and via the calculated cross-correlation and to operate on the data to modify weight on bit, or torque on bit, or a schedule of sending forces/bend angles to a rotary steerable system in response to measured parameters.

9. The system of claim 1, wherein the processor includes an efficiency calculation module and a hunt module to dynamically modify, based on spectral parameters, settings of weight on bit (WOB), rotary speed (RS), and flow rate through the drill bit (Q) and to determine direction in (WOB, RS, Q) space in which rate of increase of the drilling efficiency is a maximum, the efficiency calculation module and the hunt module structured to calculate an acoustic power spectrum from the acoustic emissions, an electromagnetic power spectrum from the electromagnetic emissions, and a cross-power spectrum from the acoustic emissions and the electromagnetic emissions, and to estimate the spectral parameters based on the acoustic power spectrum, the electromagnetic power spectrum, and the cross-power spectrum.

10. A method comprising:
    detecting acoustic emission and electromagnetic emission given off by a rock as it is broken in a drilling operation of a drill bit with sensors;
    calculating, with one or more processors, a cross-correlation between the acoustic emission and the electromagnetic emission for distinguishing against sources of noise using a threshold value of the cross-correlation;
    estimating, with one or more processors and using the cross-correlation, rock chip size or drill bit dullness or drilling efficiency or a combination selected from rock chip size, drill bit dullness, and drilling efficiency; and
    controlling, with a controller, drilling operations based on the cross-correlation.

11. The method of claim 10, wherein the calculating, the estimating, or the calculating and the estimating employs statistical frequency domain analysis, statistical time domain analysis, or both statistical frequency domain analysis and statistical time domain analysis.

12. The method of claim 10, wherein the drilling efficiency is estimated and the estimated drilling efficiency is used with the controller to control drilling operations relative to an optimization of the drilling efficiency.

13. The method of claim 12, wherein the method includes acquiring drilling efficiency data downhole in a drilling operation, and incorporating the drilling efficiency data into a database and a control model while drilling.

14. The method of claim 10, wherein the method includes determining brittleness of the rock by calculating a correlation between the electromagnetic emission and brittleness.

15. The method of claim 10, wherein detecting acoustic emission and electromagnetic emission includes monitoring the acoustic and electromagnetic emissions via sensors mounted in a drill bit, on the drill bit, near the drill bit, or a combination thereof.

16. The method of claim 15, wherein the method includes determining drill bit dullness based on, via the sensors, simultaneous use of acoustic and electromagnetic signatures or power spectra of the acoustic and electromagnetic signatures, or cross-power spectra of the acoustic and electromagnetic signatures, or a combination thereof.

17. The method of claim 15, wherein the method includes using, via the sensors, variation in a signature derived from calculating the cross-correlation between the acoustic emission and the electromagnetic emission as an indication of bit wear and drilling efficiency.

18. The method of claim 15, wherein the method includes providing an indication of bit wear and drilling efficiency by using, via the sensors, power spectral density of an acoustic signature, power spectral density of an electromagnetic signature, or cross-power spectral density between the acoustic and electromagnetic signatures.

19. The method of claim 15, wherein the method includes identifying a distribution of drill bit cuttings sizes that are generated as the rock is broken by monitoring, via the sensors, shifts in acoustic spectra and electromagnetic spectra to higher frequencies and losses in signal amplitude.

20. The method of claim 15, wherein the method includes generating a lithology indicator based on a difference between spectral components from a piezoelectric effect and a seismoelectric effect.

21. The method of claim 15, wherein the monitoring includes identifying acoustic and electromagnetic emissions that are a signature of fracture of drill bit teeth.

22. The method of claim 15, wherein the method includes communicating, to the controller, data gained via detection of acoustic and electromagnetic signatures and via their cross-correlation; and modifying weight on bit or torque on bit, or a schedule of sending forces/bend angles to a rotary steerable system in response to measured parameters, or a combination thereof to attain a condition of optimal drilling efficiency, the modifying conducted via the controller operating on the data.

23. The method of claim 10, wherein the method includes simultaneously using the detected acoustic emission and the detected electromagnetic emission to identify a component of acoustic noise and/or a component of electromagnetic noise and discriminating against the component of acoustic noise and/or the component of electromagnetic noise.

24. The method of claim 23, wherein the component of acoustic noise is identified from acoustic noise sources including bit contact with a formation via hitting a side of a borehole, bit bounce, drillstring contact with the borehole, and cuttings impacting a bottomhole assembly of the drillstring.

25. The method of claim 23, wherein the component of electromagnetic noise is identified from electromagnetic noise sources including streaming potential from drill bit nozzles and induced signals via drillstring rotation in the earth's magnetic field.

26. The method of claim 10, wherein the method includes:
calculating an acoustic power spectrum from windowed samples of the acoustic emissions;
calculating an electromagnetic power spectrum from windowed samples of the electromagnetic emissions;
calculating cross-power spectrum from windowed samples of the acoustic emissions and the electromagnetic emissions;
estimating spectral parameters based on the acoustic power spectrum, the electromagnetic power spectrum, and the cross-power spectrum;
providing selected ones of the spectral parameters to a hunt module; and
generating settings of weight on bit, rotary speed, and flow rate through the drill bit by operating the hunt module based on the selected ones of the spectral parameters.

27. The method of claim 26, wherein the method includes dynamically modifying settings of weight on bit (WOB), rotary speed (RS), and flow rate through the drill bit (Q) downhole to control drilling efficiency in real time relative to an optimization of the drilling efficiency.

28. The method of claim 27, wherein operating the hunt module includes conducting a gradient search, using a cost function, to determine direction in (WOB, RS, Q) space in which rate of increase of the drilling efficiency is a maximum.

29. A machine-readable storage device having instructions stored thereon, which, when performed by a machine, cause the machine to perform operations, the operations comprising:
detecting acoustic emission and electromagnetic emission given off by a rock as it is broken in a drilling operation of a drill bit;
calculating a cross-correlation between the acoustic emission and the electromagnetic emission for distinguishing against sources of noise using a threshold value of the cross-correlation;
estimating, using the cross-correlation, rock chip size or drill bit dullness or drilling efficiency or a combination selected from rock chip size, drill bit dullness, and drilling efficiency; and
controlling drilling operations using a controller based on the cross-correlation.

30. The machine-readable storage device of claim 29, wherein the operations include:
calculating an acoustic power spectrum from the acoustic emissions, an electromagnetic power spectrum from the electromagnetic emissions, and a cross-power spectrum from the acoustic emissions and the electromagnetic emissions;
estimating spectral parameters based on the acoustic power spectrum, the electromagnetic power spectrum, and the cross-power spectrum; and
dynamically modifying, based on the spectral parameters, settings of weight on bit (WOB), rotary speed (RS), and flow rate through the drill bit (Q) and determining direction in (WOB, RS, Q) space in which rate of increase of the drilling efficiency is a maximum.

* * * * *